(12) United States Patent
Xu et al.

(10) Patent No.: US 12,522,846 B2
(45) Date of Patent: Jan. 13, 2026

(54) ADENO-ASSOCIATED VIRUS CAPSID

(71) Applicant: SHANGHAI VITALGEN BIOPHARMA CO., LTD., Shanghai (CN)

(72) Inventors: Kai Xu, Shanghai (CN); Jiabao Han, Shanghai (CN); Wei Li, Shanghai (CN); Shin-Shay Tian, Shanghai (CN); Xiaoping Zhao, Shanghai (CN)

(73) Assignee: SHANGHAI VITALGEN BIOPHARMA CO., LTD., Shanghai (CN)

( * ) Notice: Subject to any disclaimer, the term of this patent is extended or adjusted under 35 U.S.C. 154(b) by 0 days.

(21) Appl. No.: 18/646,835

(22) Filed: Apr. 26, 2024

(65) Prior Publication Data

US 2024/0327868 A1   Oct. 3, 2024

Related U.S. Application Data

(63) Continuation of application No. PCT/CN2022/127893, filed on Oct. 27, 2022.

(30) Foreign Application Priority Data

Oct. 28, 2021   (WO) ................ PCT/CN2021/127182

(51) Int. Cl.
*C12N 15/86* (2006.01)
*C07K 14/005* (2006.01)

(52) U.S. Cl.
CPC ............ *C12N 15/86* (2013.01); *C07K 14/005* (2013.01); *C12N 2750/14122* (2013.01); *C12N 2750/14143* (2013.01)

(58) Field of Classification Search
None
See application file for complete search history.

(56) References Cited

U.S. PATENT DOCUMENTS

| 11,028,131 | B2 | 6/2021 | Okada et al. |
| 2019/0345203 | A1* | 11/2019 | Agbandje-McKenna .................. C07K 14/005 |
| 2020/0002384 | A1 | 1/2020 | Okada et al. |
| 2020/0282077 | A1* | 9/2020 | Kirn ..................... C07K 14/005 |
| 2022/0403414 | A1* | 12/2022 | Ji ............................. A61P 1/16 |
| 2024/0131093 | A1* | 4/2024 | Sah .......................... C12N 7/00 |
| 2024/0269322 | A1* | 8/2024 | Schaffer ................. C12N 15/86 |

FOREIGN PATENT DOCUMENTS

| CN | 104592364 | 5/2015 |
| CN | 105408486 | 3/2016 |
| CN | 107864653 | 3/2018 |

OTHER PUBLICATIONS

Jiabao Han, et al., "Rational Engineering of Adeno-Associated Virus Capsid Enhances Human Hepatocyte Tropism and Reduces Immunogenicity", *Cell Proflieration*, vol. 55, No. 12, Sep. 22, 2022 pp. 1-14.

* cited by examiner

*Primary Examiner* — Maria Marvich
(74) *Attorney, Agent, or Firm* — Merchant & Gould P.C.; Daniel J. Pereira

(57) ABSTRACT

The present disclosure relates to an AAV capsid having improved liver tissue tropism and stronger exogenous gene expression, and/or improved ability in escaping from neutralizing antibody. The present disclosure further relates to a nucleic acid encoding the AAV capsid, an AAV particle containing the AAV capsid. The present disclosure further relates to a pharmaceutical formulation, which contains (1) the AAV capsid, the nucleic acid, or the AAV particle, and (2) a pharmaceutically acceptable carrier. The present disclosure further relates to the use of the AAV capsid, the nucleic acid, the AAV particle, or the pharmaceutical formulation in the manufacture of a drug for delivering a target gene to mammalian cells. The present disclosure further relates to a method for treating disease, including administration of the pharmaceutical formulation to a subject in need thereof. The present disclosure further relates to a cell containing the nucleic acid.

12 Claims, 46 Drawing Sheets

Specification includes a Sequence Listing.

```
                            SEQUENCE LISTING

Sequence total quantity: 51
SEQ ID NO: 1            moltype = AA   length = 738
FEATURE                 Location/Qualifiers
source                  1..738
                        mol_type = protein
                        organism = synthetic construct
SEQUENCE: 1
MAADGYLPDW LEDNLSEGIR EWWALKPGAP KPKANQQKQD DGRGLVLPGY KYLGPFNGLD    60
KGEPVNAADA AALEHDKAYD QQLQAGDNPY LRYNHADAEF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GTKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTANT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
QGALPGMVWQ NRDVYLQGPI WAKIPHTDGN FHPSPLMGGF GLKHPPPQIL IKNTPVPADP   660
PTTFNQSKLN SFITQYSTGQ VSVEIEWELQ KENSKRWNPE IQYTSNYYKS TSVDFAVNTE   720
GVYSEPRPIG TRYLTRNL                                                 738
```

```
SEQ ID NO: 2            moltype = AA   length = 738
FEATURE                 Location/Qualifiers
source                  1..738
                        mol_type = protein
                        organism = synthetic construct
SEQUENCE: 2
MAADGYLPDW LEDNLSEGIR EWWALKPGAP KPKANQQKQD DGRGLVLPGY KYLGPFNGLD    60
KGEPVNAADA AALEHDKAYD QQLQAGDNPY LRYNHADAEF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GNKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTANT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
QGALPGMVWQ NRDVYLQGPI WAKIPHTDGN FHPSPLMGGF GLKHPPPQIL IKNTPVPADP   660
PTTFNQSKLN SFITQYSTGQ VSVEIEWELQ KENSKRWNPE IQYTSNYYKS TSVDFAVNTE   720
GVYSEPRPIG TRYLTRNL                                                738

SEQ ID NO: 3            moltype = AA   length = 738
FEATURE                 Location/Qualifiers
source                  1..738
                        mol_type = protein
                        organism = synthetic construct
SEQUENCE: 3
MAADGYLPDW LEDNLSEGIR EWWALKPGAP KPKANQQKQD DGRGLVLPGY KYLGPFNGLD    60
KGEPVNAADA AALEHDKAYD QQLQAGDNPY LRYNHADAEF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GTKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTANT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
QGALPGMVWQ NRDVYLQGPI WAKIPHTDGN FHPSPLMGGF GLKHPPPQIL IKNTPVPADP   660
PTTFNQSKLN SFITQYSTGQ VSVEIEWELQ KENSKRWNPE IQYTSNYYKS TSVDFAVNTE   720
GVYSEPRPIG TRYLTRNL                                                738

SEQ ID NO: 4            moltype = AA   length = 738
FEATURE                 Location/Qualifiers
source                  1..738
                        mol_type = protein
                        organism = synthetic construct
SEQUENCE: 4
MAADGYLPDW LEDNLSEGIR EWWALKPGAP KPKANQQKQD DGRGLVLPGY KYLGPFNGLD    60
KGEPVNAADA AALEHDKAYD QQLQAGDNPY LRYNHADAEF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GTKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTANT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
QGALPGMVWQ NRDVYLQGPI WAKIPHTDGN FHPSPLMGGF GLKHPPPQIL IKNTPVPADP   660
PTTFQQSKLN SFITQYSTGQ VSVEIEWELQ KENSKRWNPE IQYTSNYYKS TSVDFAVNTE   720
GVYSEPRPIG TRYLTRNL                                                738

SEQ ID NO: 5            moltype = AA   length = 738
FEATURE                 Location/Qualifiers
source                  1..738
                        mol_type = protein
                        organism = synthetic construct
SEQUENCE: 5
MAADGYLPDW LEDNLSEGIR EWWALKPGAP KPKANQQKQD DGRGLVLPGY KYLGPFNGLD    60
KGEPVNAADA AALEHDKAYD QQLQAGDNPY LRYNHADREF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GTKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTANT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
QGALPGMVWQ NRDVYLQGPI WAKIPHTDGN FHPSPLMGGF GLKHPPPQIL IKNTPVPADP   660
```

```
PTTFNQSKLN SFITQYSTGQ VSVEIEWELQ KENSKRWNPE IQYTSNYYKS TSVDFAVNTE   720
GVYSEPRPIG TRYLTRNL                                                 738

SEQ ID NO: 6            moltype = AA  length = 738
FEATURE                 Location/Qualifiers
source                  1..738
                        mol_type = protein
                        organism = synthetic construct
SEQUENCE: 6
MAADGYLPDW LEDNLSEGIR EWWALKPGAP KPKANQQKQD DGRGLVLPGY KYLGPFNGLD    60
KGEPVNAADA AALEHDKAYD QQLQAGDNPY LRYNHADEEF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GTKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTANT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
QGALPGMVWQ NRDVYLQGPI WAKIPHTDGN FHPSPLMGGF GLKHPPPQIL IKNTPVPADP   660
PTTFQQSKLN SFITQYSTGQ VSVEIEWELQ KENSKRWNPE IQYTSNYYKS TSVDFAVNTE   720
GVYSEPRPIG TRYLTRNL                                                 738

SEQ ID NO: 7            moltype = AA  length = 738
FEATURE                 Location/Qualifiers
source                  1..738
                        mol_type = protein
                        organism = synthetic construct
SEQUENCE: 7
MAADGYLPDW LEDNLSEGIR EWWALKPGAP KPKANQQKQD DGRGLVLPGY KYLGPFNGLD    60
KGEPVNAADA AALEHDKAYD QQLQAGDNPY LRYNHADEEF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GTKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTANT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
QGALPGMVWQ NRDVYLQGPI WAKIPHTDGN FHPSPLMGGF GLKHPPPQIL IKNTPVPADP   660
PTTFNQSKLN SFITQYSTGQ VSVEIEWELQ KENSKRWNPE VQYTSNYYKS TSVDFAVNTE   720
GVYSEPRPIG TRYLTRNL                                                 738

SEQ ID NO: 8            moltype = AA  length = 738
FEATURE                 Location/Qualifiers
source                  1..738
                        mol_type = protein
                        organism = synthetic construct
SEQUENCE: 8
MAADGYLPDW LEDTLSEGIR EWWALKPGAP KPKANQQKQD DGRGLVLPGY KYLGPFNGLD    60
KGEPVNAADA AALEHDKAYD QQLQAGDNPY LRYNHADAEF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GTKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTANT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
QGALPGMVWQ NRDVYLQGPI WAKIPHTDGN FHPSPLMGGF GLKHPPPQIL IKNTPVPADP   660
PTTFNQSKLN SFITQYSTGQ VSVEIEWELQ KENSKRWNPE VQYTSNYYKS TSVDFAVNTE   720
GVYSEPRPIG TRYLTRNL                                                 738

SEQ ID NO: 9            moltype = AA  length = 738
FEATURE                 Location/Qualifiers
source                  1..738
                        mol_type = protein
                        organism = synthetic construct
SEQUENCE: 9
MAADGYLPDW LEDNLSEGIR EWWALKPGAP KPKANQQKQD DGRGLVLPGY KYLGPFNGLD    60
KGEPVNAADA AALEHDKAYD QQLQAGDNPY LRYNHADEEF QERLQEDTSF GGNLGRAVFQ   120
AKKRVLEPLG LVEEGAKTAP GKKRPVEPSP QRSPDSSTGI GKKGQQPARK RLNFGQTGDS   180
ESVPDPQPLG EPPAAPSGVG PNTMAAGGGA PMADNNEGAD GVGSSSGNWH CDSTWLGDRV   240
ITTSTRTWAL PTYNNHLYKQ ISNGTSGGAT NDNTYFGYST PWGYFDFNRF HCHFSPRDWQ   300
RLINNNWGFR PKRLSFKLFN IQVKEVTQNE GTKTIANNLT STIQVFTDSE YQLPYVLGSA   360
HQGCLPPFPA DVFMIPQYGY LTLNNGSQAV GRSSFYCLEY FPSQMLRTGN NFQFTYTFED   420
VPFHSSYAHS QSLDRLMNPL IDQYLYYLSR TQTTGGTAGT QTLGFSQGGP NTMANQAKNW   480
LPGPCYRQQR VSTTTGQNNN SNFAWTAGTK YHLNGRNSLA NPGIAMATHK DDEERFFPSN   540
GILIFGKQNA ARDNADYSDV MLTSEEEIKT TNPVATEEYG IVADNLQQQN TAPQIGTVNS   600
```

```
QGALPGMVWQ NRDVYLQGPI WAKIPHTDGN FHPSPLMGGF GLKHPPPQIL IKNTPVPADP  660
PTTFNQSKLN SFITQYSTGQ VSVEIEWELQ KENSKRWNPE VQYTSNYYKS TSVDFAVNTE  720
GVYSEPRPIG TRYLTRNL                                                738

SEQ ID NO: 10           moltype = AA   length = 739
FEATURE                 Location/Qualifiers
source                  1..739
                        mol_type = protein
                        organism = synthetic construct
SEQUENCE: 10
MAADGYLPDW LEDTLSEGIR EWWALKPGAP KPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVEPSP QRSPDSSTGI GKKGQQPARK RLNFGQTGDS  180
ESVPDPQPLG EPPAAPSGVG PNTMAAGGGA PMADNNEGAD GVGSSSGNWH CDSTWLGDRV  240
ITTSTRTWAL PTYNNHLYKQ ISNGTSGGAT NDNTYFGYST PWGYFDFNRF HCHFSPRDWQ  300
RLINNNWGFR PKRLSFKLFN IQVKEVTQNE GTKTIANNLT STIQVFTDSE YQLPYVLGSA  360
HQGCLPPFPA DVFMIPQYGY LTLNNGSQAV GRSSFYCLEY FPSQMLRTGN NFQFTYTFED  420
VPFHSSYAHS QSLDRLMNPL IDQYLYYLSR TQSTTGGTAN TQTLGFSQGG PNTMANQAKN  480
WLPGPCYRQQ RVSTTTSQNN NSNFAWTAGT KYHLNGRNSL ANPGIAMATH KDDEERFFPS  540
NGILIFGKQN AARDNADYSD VMLTSEEEIK TTNPVATEEY GIVADNLQQQ NTAPQIGVVN  600
SQGALPGMVW QNRDVYLQGP IWAKIPHTDG NFHPSPLMGG FGLKHPPPQI LIKNTPVPAD  660
PPTTFNQSKL NSFITQYSTG QVSVEIEWEL QKENSKRWNP EVQYTSNYYK STSVDFAVNT  720
EGVYSEPRPI GTRYLTRNL                                              739

SEQ ID NO: 11           moltype = AA   length = 739
FEATURE                 Location/Qualifiers
source                  1..739
                        mol_type = protein
                        organism = synthetic construct
SEQUENCE: 11
MAADGYLPDW LEDTLSEGIR EWWALKPGAP KPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVEPSP QRSPDSSTGI GKKGQQPARK RLNFGQTGDS  180
ESVPDPQPLG EPPAAPSGVG PNTMAAGGGA PMADNNEGAD GVGSSSGNWH CDSTWLGDRV  240
ITTSTRTWAL PTYNNHLYKQ ISNGTSGGAT NDNTYFGYST PWGYFDFNRF HCHFSPRDWQ  300
RLINNNWGFR PKRLSFKLFN IQVKEVTQNE GTKTIANNLT STIQVFTDSE YQLPYVLGSA  360
HQGCLPPFPA DVFMIPQYGY LTLNNGSQAV GRSSFYCLEY FPSQMLRTGN NFQFTYTFED  420
VPFHSSYAHS QSLDRLMNPL IDQYLYYLSR TQSTTGGTAN TQTLGFSQGG PNTMANQAKN  480
WLPGPCYRQQ RVSTTTSQNN NSNFAWTAGT KYHLNGRNSL ANPGIAMATH KDDEERFFPS  540
NGILIFGKQN AAKDNADYSD VMLTSEEEIK TTNPVATEEY GIVADNLQQQ NTAPQIGVVN  600
SQGALPGMVW QNRDVYLQGP IWAKIPHTDG NFHPSPLMGG FGLKHPPPQI LIKNTPVPAD  660
PPTTFNQSKL NSFITQYSTG QVSVEIEWEL QKENSKRWNP EVQYTSNYYK STSVDFAVNT  720
EGVYSEPRPI GTRYLTRNL                                              739

SEQ ID NO: 12           moltype = AA   length = 739
FEATURE                 Location/Qualifiers
source                  1..739
                        mol_type = protein
                        organism = synthetic construct
SEQUENCE: 12
MAADGYLPDW LEDTLSEGIR EWWALKPGAP KPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVEPSP QRSPDSSTGI GKKGQQPARK RLNFGQTGDS  180
ESVPDPQPLG EPPAAPSGVG PNTMAAGGGA PMADNNEGAD GVGSSSGNWH CDSTWLGDRV  240
ITTSTRTWAL PTYNNHLYKQ ISNGTSGGAT NDNTYFGYST PWGYFDFNRF HCHFSPRDWQ  300
RLINNNWGFR PKRLSFKLFN IQVKEVTQNE GTKTIANNLT STIQVFTDSE YQLPYVLGSA  360
HQGCLPPFPA DVFMIPQYGY LTLNNGSQAV GRSSFYCLEY FPSQMLRTGN NFQFTYTFED  420
VPFHSSYAHS QSLDRLMNPL IDQYLYYLSR TQSTTGGTAN TQTLGFSQGG PNTMANQAKN  480
WLPGPCYRQQ RVSTTTSQNN NSNFAWTAGT KYHLNGRNSL ANPGIAMATH KDDEERFFPS  540
NGILIFGKQN AARDNADYSD VMLTSEEEIK TTNPVATEEY GIVSDNLQQQ NTAPQIGVVN  600
SQGALPGMVW QNRDVYLQGP IWAKIPHTDG NFHPSPLMGG FGLKHPPPQI LIKNTPVPAD  660
PPTTFNQSKL NSFITQYSTG QVSVEIEWEL QKENSKRWNP EVQYTSNYYK STSVDFAVNT  720
EGVYSEPRPI GTRYLTRNL                                              739

SEQ ID NO: 13           moltype = AA   length = 736
FEATURE                 Location/Qualifiers
source                  1..736
                        mol_type = protein
                        organism = synthetic construct
SEQUENCE: 13
MAADGYLPDW LEDNLSEGIR EWWALKPGAP KPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVDQSP QEPDSSSGVG KSGKQPARKR LNFGQTGDSE  180
SVPDPQPLGE PPAAPTSLGS NTMASGGGAP MADNNEGADG VGNSSGNWHC DSQWLGDRVI  240
TTSTRTWALP TYNNHLYKQI SSQSGASNDN HYFGYSTPWG YFDFNRFHCH FSPRDWQRLI  300
NNNWGFRPKK LSFKLFNIQV KEVTQNDGTT TIANNLTSTV QVFTDSEYQL PYVLGSAHQG  360
CLPPFPADVF MVPQYGYLTL NNGSQAVGRS FYCLEYFPS QMLRTGNNFQ FSYTFEDVPF  420
HSSYAHSQSL DRLMNPLIDQ YLYYLNRTQT TTSGTTNQSR LLFSQAGPQS MSLQARNWLP  480
GPCYRQQRLS KTANDNNNSN FPWTAASKYH LNGRDSLVNP GPAMASHKDD EEKFFPMHGN  540
```

```
LIFGKEGTTA SNAELDNVMI TDEEEIRTTN PVATEQYGTV ANNLQSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                   736

SEQ ID NO: 14           moltype = AA   length = 736
FEATURE                 Location/Qualifiers
source                  1..736
                        mol_type = protein
                        organism = synthetic construct
SEQUENCE: 14
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG NTSGTTNQSR LLFSQAGPQS MSLQARNWLP    480
GPCYRQQRLS KTANDNNNSN FPWTAASKYH LNGRDSLVNP GPAMASHKDD EEKFFPMHGN    540
LIFGKEGTTA SNAELDNVMI TDEEEIRTTN PVATEQYGTV ANNLQSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                   736

SEQ ID NO: 15           moltype = AA   length = 736
FEATURE                 Location/Qualifiers
source                  1..736
                        mol_type = protein
                        organism = synthetic construct
SEQUENCE: 15
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG TTSGTTNQSR LLFSQAGPQS MSLQARNWLP    480
GPCYRQQRLS KTANDNNNSN FPWTAASKYH LNGRDSLVNP GPAMASHKDD EEKFFPMHGN    540
LIFGKEGTTA SNAELDNVMI TDEEEIRTTN PVATEQYGTV ANNLNSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                   736

SEQ ID NO: 16           moltype = AA   length = 736
FEATURE                 Location/Qualifiers
source                  1..736
                        mol_type = protein
                        organism = synthetic construct
SEQUENCE: 16
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG TTSGTTNQSR LLFSQAGPQS MSLQARNWLP    480
GPCYRQQRLS KTANDNQNSN FPWTAASKYH LNGRDSLVNP GPAMASHKDD EEKFFPMHGN    540
LIFGKEGTTA SNAELDNVMI TDEEEIRTTN PVATEQYGTV ANNLQSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                   736

SEQ ID NO: 17           moltype = AA   length = 736
FEATURE                 Location/Qualifiers
source                  1..736
                        mol_type = protein
                        organism = synthetic construct
SEQUENCE: 17
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADREF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG TTSGTTQQSR LLFSQAGPQS MSLQARNWLP    480
```

```
GPCYRQQRLS KTANDNNNSN FPWTAASKYH LNGRDSLVNP GPAMASHKDD EEKFFPMHGN    540
LIFGKEGTTA SNAELDNVMI TDEEEIRTTN PVATEQYGTV ANNLQSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                    736

SEQ ID NO: 18          moltype = AA   length = 736
FEATURE                Location/Qualifiers
source                 1..736
                       mol_type = protein
                       organism = synthetic construct
SEQUENCE: 18
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS GTMASGGGAP MADNNEGADG VGNSSGNWHC DSQWLGDRVI    240
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG TTSGTTNQSR LLFSQAGPQS MSLQARNWLP    480
GPCYRQQRLS KTANDNNNSN FPWTAASKYH LNGRDSLVNP GPAMASHKDD EEKFFPMHGN    540
LIFGKEGTTA SNAELDNVMI TDEEEIRTTN PVATEQYGTV ANNLQSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                    736

SEQ ID NO: 19          moltype = AA   length = 736
FEATURE                Location/Qualifiers
source                 1..736
                       mol_type = protein
                       organism = synthetic construct
SEQUENCE: 19
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMAAGGGAP MADNNEGADG VGNSSGNWHC DSQWLGDRVI    240
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG TTSGTTNQSR LLFSQAGPQS MSLQARNWLP    480
GPCYRQQRLS KTANDNNNSN FPWTAASKYH LNGRDSLVNP GPAMASHKDD EEKFFPMHGN    540
LIFGKEGTTA SNAELDNVMI TDEEEIRTTN PVATEQYGTV ANNLQSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                    736

SEQ ID NO: 20          moltype = AA   length = 737
FEATURE                Location/Qualifiers
source                 1..737
                       mol_type = protein
                       organism = synthetic construct
SEQUENCE: 20
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGGASND NHYFGYSTPW GYFDFNRFHC HFSPRDWQRL    300
INNNWGFRPK KLSFKLFNIQ VKEVTQNDGT TTIANNLTST VQVFTDSEYQ LPYVLGSAHQ    360
GCLPPFPADV FMVPQYGYLT LNNGSQAVGR SSFYCLEYFPS QMLRTGNNF QFSYTFEDVP    420
FHSSYAHSQS LDRLMNPLID QYLYYLNRTQ GTTSGTTNQS RLLFSQAGPQ SMSLQARNWL    480
PGPCYRQQRL SKTANDNNNS NFPWTAASKY HLNGRDSLVN PGPAMASHKD DEEKFFPMHG    540
NLIFGKEGTT ASNAELDNVM ITDEEEIRTT NPVATEQYGT VANNLQSSNT APTTRTVNDQ    600
GALPGMVWQD RDVYLQGPIW AKIPHTDGHF HPSPLMGGFG LKHPPPQIMI KNTPVPANPP    660
TTFSPAKFAS FITQYSTGQV SVEIEWELQK ENSKRWNPEI QYTSNYNKSV NVDFTVDTNG    720
VYSEPRPIGT RYLTRNL                                                   737

SEQ ID NO: 21          moltype = AA   length = 736
FEATURE                Location/Qualifiers
source                 1..736
                       mol_type = protein
                       organism = synthetic construct
SEQUENCE: 21
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFT FSYTFEDVPF    420
```

```
HSSYAHSQSL DRLMNPLIDQ YLYYLNRTQG TTSGTTNQSR LLFSQAGPQS MSLQARNWLP  480
GPCYRQQRLS KTANDNNNSN FPWTAASKYH LNGRDSLVNP GPAMASHKDD EEKFFPMHGN  540
LIFGKEGTTA SNAELDNVMI TDEEEIRTTN PVATEQYGTV ANNLQSSNTA PTTRTVNDQG  600
ALPGMVWQDR DVYLQGPIWA KIPHTDGHFH PSPLMGGFGL KHPPPQIMIK NTPVPANPPT  660
TFSPAKFASF ITQYSTGQVS VEIEWELQKE NSKRWNPEIQ YTSNYNKSVN VDFTVDTNGV  720
YSEPRPIGTR YLTRNL                                                 736

SEQ ID NO: 22          moltype = AA  length = 736
FEATURE                Location/Qualifiers
source                 1..736
                       mol_type = protein
                       organism = synthetic construct
SEQUENCE: 22
MAADGYLPDW LEDNLSEGIR EWWALKPGAP KPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVDQSP QEPDSSSGVG KSGKQPARKR LNFGQTGDSE  180
SVPDPQPLGE PPAAPTSLGS NTMASGGGAP MADNNEGADG VGNSSGNWHC DSQWLGDRVI  240
TTSTRTWALP TYNNHLYKQI SSQSGASNDN HYFGYSTPWG YFDFNRFHCH FSPRDWQRLI  300
NNNWGFRPKK LSFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFE FSYTFEDVPF  420
HSSYAHSQSL DRLMNPLIDQ YLYYLNRTQG TTSGTTNQSR LLFSQAGPQS MSLQARNWLP  480
GPCYRQQRLS KTANDNNNSN FPWTAASKYH LNGRDSLVNP GPAMASHKDD EEKFFPMHGN  540
LIFGKEGTTA SNAELDNVMI TDEEEIRTTN PVATEQYGTV ANNLQSSNTA PTTRTVNDQG  600
ALPGMVWQDR DVYLQGPIWA KIPHTDGHFH PSPLMGGFGL KHPPPQIMIK NTPVPANPPT  660
TFSPAKFASF ITQYSTGQVS VEIEWELQKE NSKRWNPEIQ YTSNYNKSVN VDFTVDTNGV  720
YSEPRPIGTR YLTRNL                                                 736

SEQ ID NO: 23          moltype = AA  length = 736
FEATURE                Location/Qualifiers
source                 1..736
                       mol_type = protein
                       organism = synthetic construct
SEQUENCE: 23
MAADGYLPDW LEDNLSEGIR EWWALKPGAP KPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVDQSP QEPDSSSGVG KSGKQPARKR LNFGQTGDSE  180
SVPDPQPLGE PPAAPTSLGS NTMASGGGAP MADNNEGADG VGNSSGNWHC DSQWLGDRVI  240
TTSTRTWALP TYNNHLYKQI SSQSGASNDN HYFGYSTPWG YFDFNRFHCH FSPRDWQRLI  300
NNNWGFRPKK LSFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFQ FSYTFEEVPF  420
HSSYAHSQSL DRLMNPLIDQ YLYYLNRTQG TTSGTTNQSR LLFSQAGPQS MSLQARNWLP  480
GPCYRQQRLS KTANDNNNSN FPWTAASKYH LNGRDSLVNP GPAMASHKDD EEKFFPMHGN  540
LIFGKEGTTA SNAELDNVMI TDEEEIRTTN PVATEQYGTV ANNLQSSNTA PTTRTVNDQG  600
ALPGMVWQDR DVYLQGPIWA KIPHTDGHFH PSPLMGGFGL KHPPPQIMIK NTPVPANPPT  660
TFSPAKFASF ITQYSTGQVS VEIEWELQKE NSKRWNPEIQ YTSNYNKSVN VDFTVDTNGV  720
YSEPRPIGTR YLTRNL                                                 736

SEQ ID NO: 24          moltype = AA  length = 734
FEATURE                Location/Qualifiers
source                 1..734
                       mol_type = protein
                       organism = synthetic construct
SEQUENCE: 24
MAADGYLPDW LEDNLSEGIR EWWALKPGAP KPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVDQSP QEPDSSSGVG KSGKQPARKR LNFGQTGDSE  180
SVPDPQPLGE PPAAPTSLGS NTMASGGGAP MADNNEGADG VGNSSGNWHC DSQWLGDRVI  240
TTSTRTWALP TYNNHLYKQI SSQSGASNDN HYFGYSTPWG YFDFNRFHCH FSPRDWQRLI  300
NNNWGFRPKK LSFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFQ FSYTFEDVPF  420
HSSYAHSQSL DRLMNPLIDQ YLYYLNRTQT SGGAGTSRLL FSQAGPQSMS LQARNWLPGP  480
CYRQQRLSKT ANDNNNSNFP WTAASKYHLN GRDSLVNPGP AMASHKDDEE KFFPMHGNLI  540
FGKEGTTASN AELDNVMITD EEEIRTTNPV ATEQYGTVAN NLQSSNTAPT TRTVNDQGAL  600
PGMVWQDRDV YLQGPIWAKI PHTDGHFHPS PLMGGFGLKH PPPQIMIKNT PVPANPPTTF  660
SPAKFASFIT QYSTGQVSVE IEWELQKENS KRWNPEIQYT SNYNKSVNVD FTVDTNGVYS  720
EPRPIGTRYL TRNL                                                   734

SEQ ID NO: 25          moltype = AA  length = 736
FEATURE                Location/Qualifiers
source                 1..736
                       mol_type = protein
                       organism = synthetic construct
SEQUENCE: 25
MAADGYLPDW LEDNLSEGIR EWWALKPGAP KPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVDQSP QEPDSSSGVG KSGKQPARKR LNFGQTGDSE  180
SVPDPQPLGE PPAAPTSLGS NTMASGGGAP MADNNEGADG VGNSSGNWHC DSQWLGDRVI  240
TTSTRTWALP TYNNHLYKQI SSQSGASNDN HYFGYSTPWG YFDFNRFHCH FSPRDWQRLI  300
NNNWGFRPKK LSFKLFNIQV KEVTQNDGTT TIANNLTSTV QVFTDSEYQL PYVLGSAHQG  360
```

```
CLPPFPADVF MVPQYGYLTL NNGSQAVGRS SFYCLEYFPS QMLRTGNNFQ FSYTFEDVPF     420
HSSYAHSQSL DRLMNPLIDQ YLYYLNRTQG TTSGTTNQSR LLFSQAGPQS MSLQARNWLP     480
GPCYRQQRLS KTANDNNNSN FPWTAASKYH LNGRDSLVNP GPAMASHKDD EEKFFPSHGN     540
LIFGKEGTTA SNAELDNVMI TDEEEIRTTN PVATEQYGTV ANNLQSSNTA PTTRTVNDQG     600
ALPGMVWQDR DVYLQGPIWA KIPHTDGHFH PSPLMGGFGL KHPPPQIMIK NTPVPANPPT     660
TFSPAKFASF ITQYSTGQVS VEIEWELQKE NSKRWNPEIQ YTSNYNKSVN VDFTVDTNGV     720
YSEPRPIGTR YLTRNL                                                    736

SEQ ID NO: 26         moltype = AA   length = 736
FEATURE               Location/Qualifiers
source                1..736
                      mol_type = protein
                      organism = synthetic construct
SEQUENCE: 26
MAADGYLPDW LEDNLSEGIR EWWALKPGAP KPKANQQKQD DGRGLVLPGY KYLGPFNGLD      60
KGEPVNAADA AALEHDKAYD QQLQAGDNPY LRYNHADAEF QERLQEDTSF GGNLGRAVFQ     120
AKKRVLEPLG LVEEGAKTAP GKKRPVDQSP QEPDSSSGVG KSGKQPARKR LNFGQTGDSE     180
SVPDPQPLGE PPAAPTSLGS NTMASGGGAP MADNNEGADG VGNSSGNWHC DSQWLGDRVI     240
TTSTRTWALP TYNNHLYKQI SSQSGASNDN HYFGYSTPWG YFDFNRFHCH FSPRDWQRLI     300
NNNWGFRPKK LSFKLFNIQV KEVTQNDGTT TIANNLTSTV QVFTDSEYQL PYVLGSAHQG     360
CLPPFPADVF MVPQYGYLTL NNGSQAVGRS SFYCLEYFPS QMLRTGNNFQ FSYTFEDVPF     420
HSSYAHSQSL DRLMNPLIDQ YLYYLNRTQG TTSGTTNQSR LLFSQAGPQS MSLQARNWLP     480
GPCYRQQRLS KTANDNNNSN FPWTAASKYH LNGRDSLVNP GPAMASHKDD EEKFFPMHGV     540
LIFGKEGTTA SNAELDNVMI TDEEEIRTTN PVATEQYGTV ANNLQSSNTA PTTRTVNDQG     600
ALPGMVWQDR DVYLQGPIWA KIPHTDGHFH PSPLMGGFGL KHPPPQIMIK NTPVPANPPT     660
TFSPAKFASF ITQYSTGQVS VEIEWELQKE NSKRWNPEIQ YTSNYNKSVN VDFTVDTNGV     720
YSEPRPIGTR YLTRNL                                                    736

SEQ ID NO: 27         moltype = AA   length = 736
FEATURE               Location/Qualifiers
source                1..736
                      mol_type = protein
                      organism = synthetic construct
SEQUENCE: 27
MAADGYLPDW LEDNLSEGIR EWWALKPGAP KPKANQQKQD DGRGLVLPGY KYLGPFNGLD      60
KGEPVNAADA AALEHDKAYD QQLQAGDNPY LRYNHADAEF QERLQEDTSF GGNLGRAVFQ     120
AKKRVLEPLG LVEEGAKTAP GKKRPVDQSP QEPDSSSGVG KSGKQPARKR LNFGQTGDSE     180
SVPDPQPLGE PPAAPTSLGS NTMASGGGAP MADNNEGADG VGNSSGNWHC DSQWLGDRVI     240
TTSTRTWALP TYNNHLYKQI SSQSGASNDN HYFGYSTPWG YFDFNRFHCH FSPRDWQRLI     300
NNNWGFRPKK LSFKLFNIQV KEVTQNDGTT TIANNLTSTV QVFTDSEYQL PYVLGSAHQG     360
CLPPFPADVF MVPQYGYLTL NNGSQAVGRS SFYCLEYFPS QMLRTGNNFQ FSYTFEDVPF     420
HSSYAHSQSL DRLMNPLIDQ YLYYLNRTQG TTSGTTNQSR LLFSQAGPQS MSLQARNWLP     480
GPCYRQQRLS KTANDNNNSN FPWTAASKYH LNGRDSLVNP GPAMASHKDD EEKFFPMHGN     540
LIFGKEGTTA SNAELDNVMI TDEEEIRTTN PVATEQYGTV ANNLQSSNTA PTTRTVNDQG     600
ALPGMVWQDR DVYLQGPIWA KIPHTDGHFH PSPLMGGFGL KHPPPQIMIK NTPVPANPPT     660
TFSPAKFASF ITQYSTGQVS VEIEWELQKE NSKRWNPEVQ YTSNYNKSVN VDFTVDTNGV     720
YSEPRPIGTR YLTRNL                                                    736

SEQ ID NO: 28         moltype = AA   length = 736
FEATURE               Location/Qualifiers
source                1..736
                      mol_type = protein
                      organism = synthetic construct
SEQUENCE: 28
MAADGYLPDW LEDNLSEGIR EWWALKPGAP KPKANQQKQD DGRGLVLPGY KYLGPFNGLD      60
KGEPVNAADA AALEHDKAYD QQLQAGDNPY LRYNHADAEF QERLQEDTSF GGNLGRAVFQ     120
AKKRVLEPLG LVEEGAKTAP GKKRPVDQSP QEPDSSSGVG KSGKQPARKR LNFGQTGDSE     180
SVPDPQPLGE PPAAPTSLGS NTMASGGGAP MADNNEGADG VGNSSGNWHC DSQWLGDRVI     240
TTSTRTWALP TYNNHLYKQI SSQSGASNDN HYFGYSTPWG YFDFNRFHCH FSPRDWQRLI     300
NNNWGFRPKK LSFKLFNIQV KEVTQNDGTT TIANNLTSTV QVFTDSEYQL PYVLGSAHQG     360
CLPPFPADVF MVPQYGYLTL NNGSQAVGRS SFYCLEYFPS QMLRTGNNFQ FSYTFEDVPF     420
HSSYAHSQSL DRLMNPLIDQ YLYYLNRTQG TTSGTTNQSR LLFSQAGPQS MSLQARNWLP     480
GPCYRQQRLS KTANDNNNSN FPWTAASKYH LNGRDSLVNP GPAMASHKDD EEKFFPMHGN     540
LIFGKEGTTA SNAELDNVMI TDEEEIRTTN PVATEQYGTV ANNLQSSNTA PTTRTVNDQG     600
ALPGMVWQDR DVYLQGPIWA KIPHTDGHFH PSPLMGGFGL KHPPPQIMIK NTPVPANPPT     660
TFSPAKFASF ITQYSTGQVS VEIEWELQKE NSKRWNPEIQ YTSNYNKSVN VDFTVDTNGV     720
YSEPRPIGTR YLTRPL                                                    736

SEQ ID NO: 29         moltype = AA   length = 736
FEATURE               Location/Qualifiers
source                1..736
                      mol_type = protein
                      organism = synthetic construct
SEQUENCE: 29
MAADGYLPDW LEDTLSEGIR EWWALKPGAP QPKANQQKQD DGRGLVLPGY KYLGPFNGLD      60
KGEPVNAADA AALEHDKAYD QQLQAGDNPY LRYNHADAEF QERLQEDTSF GGNLGRAVFQ     120
AKKRVLEPLG LVEEGAKTAP GKKRPVDQSP QEPDSSSGVG KSGKQPARKR LNFGQTGDSE     180
SVPDPQPLGE PPAAPTSLGS NTMASGGGAP MADNNEGADG VGNSSGNWHC DSQWLGDRVI     240
TTSTRTWALP TYNNHLYKQI SSQSGASNDN HYFGYSTPWG YFDFNRFHCH FSPRDWQRLI     300
```

```
NNNWGFRPKK LSFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFQ FSYTFEDVPF  420
HSSYAHSQSL DRLMNPLIDQ YLYYLNRTQG TTSGTTNQSR LLFSQAGPQS MSLQARNWLP  480
GPCYRQQRLS KTANDNNNSN FPWTAASKYH LNGRDSLVNP GPAMASHKDD EEKFFPMHGN  540
LIFGKEGTTA SNAELDNVMI TDEEEIRTTN PVATEQYGTV ANNLQSSNTA PTTRTVNDQG  600
ALPGMVWQDR DVYLQGPIWA KIPHTDGHFH PSPLMGGFGL KHPPPQIMIK NTPVPANPPT  660
TFSPAKFASF ITQYSTGQVS VEIEWELQKE NSKRWNPEIQ YTSNYNKSVN VDFTVDTNGV  720
YSEPRPIGTR YLTRNL                                                 736

SEQ ID NO: 30           moltype = AA   length = 736
FEATURE                 Location/Qualifiers
source                  1..736
                        mol_type = protein
                        organism = synthetic construct
SEQUENCE: 30
MAADGYLPDW LEDNLSEGIR EWWALKPGAP QPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVDQSP QEPDSSSGVG KSGKQPARKR LNFGQTGDSE  180
SVPDPQPLGE PPAAPTSLGS NTMASGGGAP MADNNEGADG VGNSSGNWHC DSQWLGDRVI  240
TTSTRTWALP TYNNHLYKQI SSQSGASNDN HYFGYSTPWG YFDFNRFHCH FSPRDWQRLI  300
NNNWGFRPKK LSFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFQ FSYTFEDVPF  420
HSSYAHSQSL DRLMNPLIDQ YLYYLNRTQG TTSGTTNQSR LLFSQAGPQS MSLQARNWLP  480
GPCYRQQRLS KTLNDNNNSN FPWTAASKYH LNGRDSLVNP GPAMASHKDD EEKFFPMHGN  540
LIFGKEGTTA SNAELDNVMI TDEEEIRTTN PVATEQYGTV ANNLQSSNTA PTTRTVNDQG  600
ALPGMVWQDR DVYLQGPIWA KIPHTDGHFH PSPLMGGFGL KHPPPQIMIK NTPVPANPPT  660
TFSPAKFASF ITQYSTGQVS VEIEWELQKE NSKRWNPEIQ YTSNYNKSVN VDFTVDTNGV  720
YSEPRPIGTR YLTRNL                                                 736

SEQ ID NO: 31           moltype = AA   length = 736
FEATURE                 Location/Qualifiers
source                  1..736
                        mol_type = protein
                        organism = synthetic construct
SEQUENCE: 31
MAADGYLPDW LEDNLSEGIR EWWALKPGAP QPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVDQSP QEPDSSSGVG KSGKQPARKR LNFGQTGDSE  180
SVPDPQPLGE PPAAPTSLGS NTMASGGGAP MADNNEGADG VGNSSGNWHC DSQWLGDRVI  240
TTSTRTWALP TYNNHLYKQI SSQSGASNDN HYFGYSTPWG YFDFNRFHCH FSPRDWQRLI  300
NNNWGFRPKK LSFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFQ FSYTFEDVPF  420
HSSYAHSQSL DRLMNPLIDQ YLYYLNRTQG TTSGTTNQSR LLFSQAGPQS MSLQARNWLP  480
GPCYRQQRLS KTANDNNNSN FPWTAASKYH LNGRDSLVNP GPAMASHKDD EEKFFPMHGN  540
LIFGKEGTTA SNVELDNVMI TDEEEIRTTN PVATEQYGTV ANNLQSSNTA PTTRTVNDQG  600
ALPGMVWQDR DVYLQGPIWA KIPHTDGHFH PSPLMGGFGL KHPPPQIMIK NTPVPANPPT  660
TFSPAKFASF ITQYSTGQVS VEIEWELQKE NSKRWNPEIQ YTSNYNKSVN VDFTVDTNGV  720
YSEPRPIGTR YLTRNL                                                 736

SEQ ID NO: 32           moltype = AA   length = 736
FEATURE                 Location/Qualifiers
source                  1..736
                        mol_type = protein
                        organism = synthetic construct
SEQUENCE: 32
MAADGYLPDW LEDNLSEGIR EWWALKPGAP QPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVDQSP QEPDSSSGVG KSGKQPARKR LNFGQTGDSE  180
SVPDPQPLGE PPAAPTSLGS NTMASGGGAP MADNNEGADG VGNSSGNWHC DSQWLGDRVI  240
TTSTRTWALP TYNNHLYKQI SSQSGASNDN HYFGYSTPWG YFDFNRFHCH FSPRDWQRLI  300
NNNWGFRPKK LSFKLFNIQV KEVTQNDGTT TIANNLTSTV QVFTDSEYQL PYVLGSAHQG  360
CLPPFPADVF MVPQYGYLTL NNGSQAVGRS SFYCLEYFPS QMLRTGNNFQ FSYTFEDVPF  420
HSSYAHSQSL DRLMNPLIDQ YLYYLNRTQG TTSGTTNQSR LLFSQAGPQS MSLQARNWLP  480
GPCYRQQRLS KTANDNNNSN FPWTAASKYH LNGRDSLVNP GPAMASHKDD EEKFFPMHGN  540
LIFGKEGTTA SNADLDNVMI TDEEEIRTTN PVATEQYGTV ANNLQSSNTA PTTRTVNDQG  600
ALPGMVWQDR DVYLQGPIWA KIPHTDGHFH PSPLMGGFGL KHPPPQIMIK NTPVPANPPT  660
TFSPAKFASF ITQYSTGQVS VEIEWELQKE NSKRWNPEIQ YTSNYNKSVN VDFTVDTNGV  720
YSEPRPIGTR YLTRNL                                                 736

SEQ ID NO: 33           moltype = AA   length = 736
FEATURE                 Location/Qualifiers
source                  1..736
                        mol_type = protein
                        organism = synthetic construct
SEQUENCE: 33
MAADGYLPDW LEDNLSEGIR EWWALKPGAP QPKANQQKQD DGRGLVLPGY KYLGPFNGLD   60
KGEPVNAADA AALEHDKAYD QQLQAGDNPY LRYNHADAEF QERLQEDTSF GGNLGRAVFQ  120
AKKRVLEPLG LVEEGAKTAP GKKRPVDQSP QEPDSSSGVG KSGKQPARKR LNFGQTGDSE  180
SVPDPQPLGE PPAAPTSLGS NTMASGGGAP MADNNEGADG VGNSSGNWHC DSQWLGDRVI  240
```

```
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG TTSGTTNQSR LLFSQAGPQS MSLQARNWLP    480
GPCYRQQRLS KTANDNNSN FPWTAASKYH LNGRDSLVNP GPAMASHKDD EEKFFPMHGN     540
LIFGKEGTTA SNAELDNVMI TDEEEIRTTN PVATEQYGVV ANNLQSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                   736

SEQ ID NO: 34           moltype = AA   length = 736
FEATURE                 Location/Qualifiers
source                  1..736
                        mol_type = protein
                        organism = synthetic construct
SEQUENCE: 34
MAADGYLPDW LEDNLSEGIR EWWALKPGAP QPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG TTSGTTNQSR LLFSQAGPQS MSLQARNWLP    480
GPCYRQQRLS KTANDNNSN FPWTAASKYH LNGRDSLVNP GPAMASHKDD EEKFFPMHGN     540
LIFGKEGTTA SNAELDNVMI TDEEEIRTTN PVATEQYGVV ANNLQSSNTA PITRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                   736

SEQ ID NO: 35           moltype = AA   length = 736
FEATURE                 Location/Qualifiers
source                  1..736
                        mol_type = protein
                        organism = synthetic construct
SEQUENCE: 35
MAADGYLPDW LEDNLSEGIR EWWALKPGAP QPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG TTSGTTNQSR LLFSQAGPQS MSLQARNWLP    480
GPCYRQQRLS KTANDNNSN FPWTAASKYH LNGRDSLVNP GPAMASHKDD EEKFFPMHGN     540
LIFGKEGTTA SNAELDNVMI TDEEEIRTTN PVATEQYGTV ANNLQSSNTA PTTRDVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                   736

SEQ ID NO: 36           moltype = AA   length = 736
FEATURE                 Location/Qualifiers
source                  1..736
                        mol_type = protein
                        organism = synthetic construct
SEQUENCE: 36
MAADGYLPDW LEDNLSEGIR EWWALKPGAP QPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWVLP TYNNHLYKQI SSQSGASNDN HYFGYSTPWG YFDFNRFHCH FSPRDWQRLI    300
NNNWGFRPKK LSFKLFNIQV KEVTQNDGTT TIANNLTSTV QVFTDSEYQL PYVLGSAHQG    360
CLPPFPADVF MVPQYGYLTL NNGSQAVGRS SFYCLEYFPS QMLRTGNNFQ FSYTFEDVPF    420
HSSYAHSQSL DRLMNPLIDQ YLYYLNRTQG TTSGTTNQSR LLFSQAGPQS MSLQARNWLP    480
GPCYRQQRLS KTANDNNSN FPWTAASKYH LNGRDSLVNP GPAMASHKDD EEKFFPMHGN     540
LIFGKEGTTA SNAELDNVMI TDEEEIRTTN PVATEQYGTV ANNLQSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRNL                                                   736

SEQ ID NO: 37           moltype = AA   length = 735
FEATURE                 Location/Qualifiers
source                  1..735
                        mol_type = protein
                        organism = synthetic construct
SEQUENCE: 37
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
```

```
SVPDPQPLGE PPAAPTSLGS NTMASGGGAP MADNNEGADG VGNSSGNWHC DSQWLGDRVI    240
TTSTRTWALP TYNNHLYKQI SSQSGGASND NHYFGYSTPW GYFDFNRFHC HFSPRDWQRL    300
INNNWGFRPK KLSFKLFNIQ VKEVTQNDGT TTIANNLTST VQVFTDSEYQ LPYVLGSAHQ    360
GCLPPFPADV FMVPQYGYLT LNNGSQAVGR SSFYCLEYFP SQMLRTGNNF QFSYTFEDVP    420
FHSSYAHSQS LDRLMNPLID QYLYYLNRTQ TSGGAGTSRL LFSQAGPQSM SLQARNWLPG    480
PCYRQQRLSK TANDNNNSNF PWTAASKYHL NGRDSLVNPG PAMASHKDDE EKFFPMHGNL    540
IFGKEGTTAS NAELDNVMIT DEEEIRTTNP VATEQYGTVA NNLQSSNTAP TTRTVNDQGA    600
LPGMVWQDRD VYLQGPIWAK IPHTDGHFHP SPLMGGFGLK HPPPQIMIKN TPVPANPPTT    660
FSPAKFASFI TQYSTGQVSV EIEWELQKEN SKRWNPEIQY TSNYNKSVNV DFTVDTNGVY    720
SEPRPIGTRY LTRPL                                                    735

SEQ ID NO: 38          moltype = AA  length = 735
FEATURE                Location/Qualifiers
source                 1..735
                       mol_type = protein
                       organism = synthetic construct
SEQUENCE: 38
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMAAGGGAP MADNNEGADG VGNSSGNWHC DSQWLGDRVI    240
TTSTRTWALP TYNNHLYKQI SSQSGGASND NHYFGYSTPW GYFDFNRFHC HFSPRDWQRL    300
INNNWGFRPK KLSFKLFNIQ VKEVTQNDGT TTIANNLTST VQVFTDSEYQ LPYVLGSAHQ    360
GCLPPFPADV FMVPQYGYLT LNNGSQAVGR SSFYCLEYFP SQMLRTGNNF QFSYTFEDVP    420
FHSSYAHSQS LDRLMNPLID QYLYYLNRTQ TSGGAGTSRL LFSQAGPQSM SLQARNWLPG    480
PCYRQQRLSK TANDNNNSNF PWTAASKYHL NGRDSLVNPG PAMASHKDDE EKFFPMHGNL    540
IFGKEGTTAS NAELDNVMIT DEEEIRTTNP VATEQYGTVA NNLQSSNTAP TTRTVNDQGA    600
LPGMVWQDRD VYLQGPIWAK IPHTDGHFHP SPLMGGFGLK HPPPQIMIKN TPVPANPPTT    660
FSPAKFASFI TQYSTGQVSV EIEWELQKEN SKRWNPEVQY TSNYNKSVNV DFTVDTNGVY    720
SEPRPIGTRY LTRPL                                                    735

SEQ ID NO: 39          moltype = AA  length = 737
FEATURE                Location/Qualifiers
source                 1..737
                       mol_type = protein
                       organism = synthetic construct
SEQUENCE: 39
MAADGYLPDW LEDNLSEGIR EWWALKPGAP KPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGGASND NHYFGYSTPW GYFDFNRFHC HFSPRDWQRL    300
INNNWGFRPK KLSFKLFNIQ VKEVTQNDGT TTIANNLTST VQVFTDSEYQ LPYVLGSAHQ    360
GCLPPFPADV FMVPQYGYLT LNNGSQAVGR SSFYCLEYFP SQMLRTGNNF QFSYTFEDVP    420
FHSSYAHSQS LDRLMNPLID QYLYYLNRTQ GTTSGTTNQS RLLFSQAGPQ SMSLQARNWL    480
PGPCYRQQRL SKTANDNNNS NFPWTAASKY HLNGRDSLVN PGPAMASHKD DEEKFFPMHG    540
NLIFGKEGTT ASNAELDNVM ITDEEEIRTT NPVATEQYGT VANNLQSSNT APTTRTVNDQ    600
GALPGMVWQD RDVYLQGPIW AKIPHTDGHF HPSPLMGGFG LKHPPPQIMI KNTPVPANPP    660
TTFSPAKFAS FITQYSTGQV SVEIEWELQK ENSKRWNPEI QYTSNYNKSV NVDFTVDTNG    720
VYSEPRPIGT RYLTRPL                                                  737

SEQ ID NO: 40          moltype = AA  length = 735
FEATURE                Location/Qualifiers
source                 1..735
                       mol_type = protein
                       organism = synthetic construct
SEQUENCE: 40
MAADGYLPDW LEDNLSEGIR EWWALKPGAP QPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGGASND NHYFGYSTPW GYFDFNRFHC HFSPRDWQRL    300
INNNWGFRPK KLSFKLFNIQ VKEVTQNDGT TTIANNLTST VQVFTDSEYQ LPYVLGSAHQ    360
GCLPPFPADV FMVPQYGYLT LNNGSQAVGR SSFYCLEYFP SQMLRTGNNF QFSYTFEDVP    420
FHSSYAHSQS LDRLMNPLID QYLYYLNRTQ TSGGAGTSRL LFSQAGPQSM SLQARNWLPG    480
PCYRQQRLSK TANDNNNSNF PWTAASKYHL NGRDSLVNPG PAMASHKDDE EKFFPMHGNL    540
IFGKEGTTAS NADLDNVMIT DEEEIRTTNP VATEQYGVVA NNLQSSNTAP TTRTVNDQGA    600
LPGMVWQDRD VYLQGPIWAK IPHTDGHFHP SPLMGGFGLK HPPPQIMIKN TPVPANPPTT    660
FSPAKFASFI TQYSTGQVSV EIEWELQKEN SKRWNPEIQY TSNYNKSVNV DFTVDTNGVY    720
SEPRPIGTRY LTRPL                                                    735

SEQ ID NO: 41          moltype = AA  length = 735
FEATURE                Location/Qualifiers
source                 1..735
                       mol_type = protein
                       organism = synthetic construct
SEQUENCE: 41
MAADGYLPDW LEDNLSEGIR EWWALKPGAP QPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
```

```
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGGASND NHYFGYSTPW GYFDFNRFHC HFSPRDWQRL    300
INNNWGFRPK KLSFKLFNIQ VKEVTQNDGT TTIANNLTST VQVFTDSEYQ LPYVLGSAHQ    360
GCLPPFPADV FMVPQYGYLT LNNGSQAVGR SSFYCLEYFP SQMLRTGNNF QFSYTFEDVP    420
FHSSYAHSQS LDRLMNPLID QYLYYLNRTQ TSGGAGTSRL LFSQAGPQSM SLQARNWLPG    480
PCYRQQRLSK TANDNNNSNF PWTAASKYHL NGRDSLVNPG PAMASHKDDE EKFFPMHGNL    540
IFGKEGTTAS NVELDNVMIT DEEEIRTTNP VATEQYGTVA NNLQSSNTAP ITRTVNDQGA    600
LPGMVWQDRD VYLQGPIWAK IPHTDGHFHP SPLMGGFGLK HPPPQIMIKN TPVPANPPTT    660
FSPAKFASFI TQYSTGQVSV EIEWELQKEN SKRWNPEIQY TSNYNKSVNV DFTVDTNGVY    720
SEPRPIGTRY LTRPL                                                    735

SEQ ID NO: 42            moltype = AA   length = 736
FEATURE                  Location/Qualifiers
source                   1..736
                         mol_type = protein
                         organism = synthetic construct
SEQUENCE: 42
MAADGYLPDW LEDTLSEGIR EWWALKPGAP QPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGGASND NHYFGYSTPW GYFDFNRFHC HFSPRDWQRL    300
INNNWGFRPK KLSFKLFNIQ VKEVTQNDGT TTIANNLTST VQVFTDSEYQ LPYVLGSAHQ    360
GCLPPFPADV FMVPQYGYLT LNNGSQAVGR SSFYCLEYFP SQMLRTGNNF QFSYTFEDVP    420
FHSSYAHSQS LDRLMNPLID QYLYYLNRTQ TSGGAGTSRL LFSQAGPQSM SLQARNWLPG    480
PCYRQQRLSK TATNDNNNSN FPWTAASKYH LNGRDSLVNP GPAMASHKDD EEKFFPMHGN    540
LIFGKEGTTA SNAELDNVMI TDEEEIRTTN PVATEQYGTV ANNLQSSNTA PTTRTVNDQG    600
ALPGMVWQDR DVYLQGPIWA KIPHTDGHFH PSPLMGGFGL KHPPPQIMIK NTPVPANPPT    660
TFSPAKFASF ITQYSTGQVS VEIEWELQKE NSKRWNPEIQ YTSNYNKSVN VDFTVDTNGV    720
YSEPRPIGTR YLTRPL                                                   736

SEQ ID NO: 43            moltype = AA   length = 735
FEATURE                  Location/Qualifiers
source                   1..735
                         mol_type = protein
                         organism = synthetic construct
SEQUENCE: 43
MAADGYLPDW LEDNLSEGIR EWWALKPGAP QPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGGASND NHYFGYSTPW GYFDFNRFHC HFSPRDWQRL    300
INNNWGFRPK KLSFKLFNIQ VKEVTQNDGT TTIANNLTST VQVFTDSEYQ LPYVLGSAHQ    360
GCLPPFPADV FMVPQYGYLT LNNGSQAVGR SSFYCLEYFP SQMLRTGNNF QFSYTFEDVP    420
FHSSYAHSQS LDRLMNPLID QYLYYLNRTQ TSGGAGTSRL LFSQAGPQSM SLQARNWLPG    480
PCYRQQRLSK TANDNNNSNF PWTAASKYHL NGRDSLVNPG PAMASHKDDE EKFFPMHGNL    540
IFGKEGTTKS NAELDNVMIT DEEEIRTTNP VATEQYGTVS NNLQSSNTAP TTRTVNDQGA    600
LPGMVWQDRD VYLQGPIWAK IPHTDGHFHP SPLMGGFGLK HPPPQIMIKN TPVPANPPTT    660
FSPAKFASFI TQYSTGQVSV EIEWELQKEN SKRWNPEIQY TSNYNKSVNV DFTVDTNGVY    720
SEPRPIGTRY LTRPL                                                    735

SEQ ID NO: 44            moltype = AA   length = 735
FEATURE                  Location/Qualifiers
source                   1..735
                         mol_type = protein
                         organism = synthetic construct
SEQUENCE: 44
MAADGYLPDW LEDNLSEGIR EWWALKPGAP QPKANQQKQD DGRGLVLPGY KYLGPFNGLD     60
KGEPVNAADA AALEHDKAYD QQLQAGDNPY LRYNHADAEF QERLQEDTSF GGNLGRAVFQ    120
AKKRVLEPLG LVEEGAKTAP GKKRPVDQSP QEPDSSSGVG KSGKQPARKR LNFGQTGDSE    180
SVPDPQPLGE PPAAPTSLGS NTMASGGGAP MADNNEGADG VGNSSGNWHC DSQWLGDRVI    240
TTSTRTWALP TYNNHLYKQI SSQSGGASND NHYFGYSTPW GYFDFNRFHC HFSPRDWQRL    300
INNNWGFRPK KLSFKLFNIQ VKEVTQNDGT TTIANNLTST VQVFTDSEYQ LPYVLGSAHQ    360
GCLPPFPADV FMVPQYGYLT LNNGSQAVGR SSFYCLEYFP SQMLRTGNNF QFSYTFEDVP    420
FHSSYAHSQS LDRLMNPLID QYLYYLNRTQ TSGGAGTSRL LFSQAGPQSM SLQARNWLPG    480
PCYRQQRLSK TANDNNNSNF PWTAASKYHL NGRDSLVNPG PAMASHKDDE EKFFPMHGNL    540
IFGKEGTTAS NVELDNVMIT DEEEIRTTNP VATEQYGVVA NNLQSSNTAP TTRTVNDQGA    600
LPGMVWQDRD VYLQGPIWAK IPHTDGHFHP SPLMGGFGLK HPPPQIMIKN TPVPANPPTT    660
FSPAKFASFI TQYSTGQVSV EIEWELQKEN SKRWNPEIQY TSNYNKSVNV DFTVDTNGVY    720
SEPRPIGTRY LTRPL                                                    735

SEQ ID NO: 45            moltype = AA   length = 736
FEATURE                  Location/Qualifiers
source                   1..736
                         mol_type = protein
                         organism = synthetic construct
```

```
SEQUENCE: 45
MAADGYLPDW LEDTLSEGIR EWWALKPGAP QPKANQQKQD DGRGLVLPGY KYLGPFNGLD    60
KGEPVNAADA AALEHDKAYD QQLQAGDNPY LRYNHADAEF QERLQEDTSF GGNLGRAVFQ   120
AKKRVLEPLG LVEEGAKTAP GKKRPVDQSP QEPDSSSGVG KSGKQPARKR LNFGQTGDSE   180
SVPDPQPLGE PPAAPTSLGS NTMASGGGAP MADNNEGADG VGNSSGNWHC DSQWLGDRVI   240
TTSTRTWALP TYNNHLYKQI SSQSGGASND NHYFGYSTPW GYFDFNRFHC HFSPRDWQRL   300
INNNWGFRPK KLSFKLFNIQ VKEVTQNDGT TTIANNLTST VQVFTDSEYQ LPYVLGSAHQ   360
GCLPPFPADV FMVPQYGYLT LNNGSQAVGR SSFYCLEYFP SQMLRTGNNF QFSYTFEDVP   420
FHSSYAHSQS LDRLMNPLID QYLYYLNRTQ TSGGAGTSRL LFSQAGPQSM SLQARNWLPG   480
PCYRQQRLSK TATNDNNNSN FPWTAASKYH LNGRDSLVNP GPAMASHKDD EEKFFPMHGN   540
LIFGKEGTTA SNAELDNVMI TDEEEIRTTN PVATEQYGTV ANNLQSSNTA PITRTVNDQG   600
ALPGMVWQDR DVYLQGPIWA KIPHTDGHFH PSPLMGGFGL KHPPPQIMIK NTPVPANPPT   660
TFSPAKFASF ITQYSTGQVS VEIEWELQKE NSKRWNPEIQ YTSNYNKSVN VDFTVDTNGV   720
YSEPRPIGTR YLTRPL                                                  736

SEQ ID NO: 46           moltype = AA   length = 735
FEATURE                 Location/Qualifiers
source                  1..735
                        mol_type = protein
                        organism = synthetic construct
SEQUENCE: 46
MAADGYLPDW LEDTLSEGIR EWWALKPGAP QPKANQQKQD DGRGLVLPGY KYLGPFNGLD    60
KGEPVNAADA AALEHDKAYD QQLQAGDNPY LRYNHADAEF QERLQEDTSF GGNLGRAVFQ   120
AKKRVLEPLG LVEEGAKTAP GKKRPVDQSP QEPDSSSGVG KSGKQPARKR LNFGQTGDSE   180
SVPDPQPLGE PPAAPTSLGS NTMASGGAP MADNNEGADG VGNSSGNWHC DSQWLGDRVI   240
TTSTRTWALP TYNNHLYKQI SSQSGGASND NHYFGYSTPW GYFDFNRFHC HFSPRDWQRL   300
INNNWGFRPK KLSFKLFNIQ VKEVTQNDGT TTIANNLTST VQVFTDSEYQ LPYVLGSAHQ   360
GCLPPFPADV FMVPQYGYLT LNNGSQAVGR SSFYCLEYFP SQMLRTGNNF QFSYTFEDVP   420
FHSSYAHSQS LDRLMNPLID QYLYYLNRTQ TSGGAGTSRL LFSQAGPQSM SLQARNWLPG   480
PCYRQQRLSK TANDNNNSNF PWTAASKYHL NGRDSLVNPG PAMASHKDDE EKFFPMHGNL   540
IFGKEGTTAS NVDLDNVMIT DEEEIRTTNP VATEQYGVVA NNLQSSNTAP TTRTVNDQGA   600
LPGMVWQDRD VYLQGPIWAK IPHTDGHFHP SPLMGGFGLK HPPPQIMIKN TPVPANPPTT   660
FSPAKFASFI TQYSTGQVSV EIEWELQKEN SKRWNPEIQY TSNYNKSVNV DFTVDTNGVY   720
SEPRPIGTRY LTRPL                                                   735

SEQ ID NO: 47           moltype = AA   length = 736
FEATURE                 Location/Qualifiers
source                  1..736
                        mol_type = protein
                        organism = synthetic construct
SEQUENCE: 47
MAADGYLPDW LEDNLSEGIR EWWALKPGAP QPKANQQKQD DGRGLVLPGY KYLGPFNGLD    60
KGEPVNAADA AALEHDKAYD QQLQAGDNPY LRYNHADAEF QERLQEDTSF GGNLGRAVFQ   120
AKKRVLEPLG LVEEGAKTAP GKKRPVDQSP QEPDSSSGVG KSGKQPARKR LNFGQTGDSE   180
SVPDPQPLGE PPAAPTSLGS NTMASGGGAP MADNNEGADG VGNSSGNWHC DSQWLGDRVI   240
TTSTRTWALP TYNNHLYKQI SSQSGGASND NHYFGYSTPW GYFDFNRFHC HFSPRDWQRL   300
INNNWGFRPK KLSFKLFNIQ VKEVTQNDGT TTIANNLTST VQVFTDSEYQ LPYVLGSAHQ   360
GCLPPFPADV FMVPQYGYLT LNNGSQAVGR SSFYCLEYFP SQMLRTGNNF QFSYTFEDVP   420
FHSSYAHSQS LDRLMNPLID QYLYYLNRTQ TSGGAGTSRL LFSQAGPQSM SLQARNWLPG   480
PCYRQQRLSK TATNDNNNSN FPWTAASKYH LNGRDSLVNP GPAMASHKDD EEKFFPMHGN   540
LIFGKEGTTK SNAELDNVMI TDEEEIRTTN PVATEQYGTV SNNLQSSNTA PITRTVNDQG   600
ALPGMVWQDR DVYLQGPIWA KIPHTDGHFH PSPLMGGFGL KHPPPQIMIK NTPVPANPPT   660
TFSPAKFASF ITQYSTGQVS VEIEWELQKE NSKRWNPEIQ YTSNYNKSVN VDFTVDTNGV   720
YSEPRPIGTR YLTRPL                                                  736

SEQ ID NO: 48           moltype = DNA   length = 2507
FEATURE                 Location/Qualifiers
source                  1..2507
                        mol_type = other DNA
                        organism = synthetic construct
SEQUENCE: 48
aacaataaat gatttaaatc aggtatggct gccgatggtt atcttccaga ttggctcgag    60
gacaacctct ctgagggcat tcgcgagtgg tgggcgctga acctggagc cccgaagccc    120
aaagccaacc agcaaaagca ggacgacggc cggggtctgg tgcttcctgg ctacaagtac   180
ctcggaccct tcaacggact cgacaagggg gagcccgtca acgcggcgga cgcagcggcc   240
ctcgagcacg acaaggccta cgaccagcag ctgcaggcgg gtgacaatcc gtacctgcgg   300
tataaccacg ccgacgccga gtttcaggag cgtctgcaag aagatacgtc ttttggggc    360
aacctcgggc gagcagtctt ccaggccaag aagcgggttc tcgaacctct cggtctggtt   420
gaggaaggcg ctaagacggc tcctggaaag aagaaccggc tagatcagtc tcctcaggaa   480
ccggactcat catctggtgt ggcaaatcg ggcaaacagc ctgccagaaa aagactaaat   540
ttcggtcaga ctggcgactc agagtcagtc ccagaccctc aacctctcgg agaaccacca   600
gcagccccca agtttgggg atctaataca atggcttcag gcggtggcgc accaatggca   660
gacaataacg agggtgccga tggagtgggt aattcctcag gaaattggca ttgcgattc    720
caatggctgg gcgacagagt catcaccacc agcaccagga cctggcgcct gcccacttac   780
aacaaccatc tctacaagca aatctccagc caatcaggag cttcaaacga caaccactac   840
tttggctaca gcaccccttg ggggtatttt gactttaaca gattccactg ccacttctca   900
ccacgtgact ggcagcgact cattaacaac aactggggat ccggcccaa gaaactcagc   960
ttcaagctct tcaacatcca agttaaagag gtcacgcaga acgatggcac gacgactatt  1020
gccaataacc ttaccagcac ggttcaagtg tttacggact cggagtatca gctcccgtac  1080
```

```
gtgctcgggt cggcgcacca aggctgtctc ccgccgtttc cagcggacgt cttcatggtc 1140
cctcagtatg gatacctcac cctgaacaac ggaagtcaag cggtgggacg ctcatccttt 1200
tactgcctgg agtacttccc ttcgcagatg ctaaggactg gaaataactt ccaattcagc 1260
tataccttcg aggatgtacc ttttcacagc agctacgctc acagccagag tttggatcgc 1320
ttgatgaatc ctcttattga tcagtatctg tactacctga acagaacgca aggaacaacc 1380
tctggaacaa ccaaccaatc acggctgctt tttagccagg ctgggcctca gtctatgtct 1440
ttgcaggcca gaaattggct acctgggccc tgctaccggc aacagagact ttcaaagact 1500
gctaacgaca acaacaacag taactttcct tggacagcgg ccagcaaata tcatctcaat 1560
ggccgcgact cgctggtgaa tccaggacca gctatggcca gtcacaagga cgatgaagaa 1620
aaattttttcc ctatgcacgg caatctaata tttggcaaag aagggacaac ggcaagtaac 1680
gcagaattag ataatgtaat gattacggat gaagaagaga ttcgtaccac caatcctgtg 1740
gcaacagagc agtatggaac tgtggcaaat aacttgcaga gctcaaatac agctcccacg 1800
actagaactg tcaatgatca gggggcctta cctggcatgg tgtggcaaga tcgtgacgtg 1860
taccttcaag gacctatctg ggcaaagatt cctcacacgg atggacactt tcatccttct 1920
cctctgatgg gaggctttgg actgaaacat ccgcctcctc aaatcatgat caaaaatact 1980
ccggtaccgg caaatcctcc gacgactttc agcccggcca gtttgcttc atttatcact 2040
cagtactcca ctggacaggt cagcgtgaa attgagtggg agctacagaa agaaaacagc 2100
aaacgttgga atccagagat tcagtacact tccaactaca acaagtctgt taatgtggac 2160
tttactgtag acactaatgg tgtttatagt gaacctcgcc ctattggaac ccggtatctc 2220
acacgaaact tgtaattgcc tgttaatcaa taaaccggtt gattcgtttc agttgaactt 2280
tggtctctgc gaagggcgaa ttcgtttaaa cctgcaggac tagaggtcct gtattagagg 2340
tcacgtgagt gttttgcgac attttgcgac accatgtggt cacgctgggt atttaagccc 2400
gagtgagcac gcagggtctc cattttgaag cgggaggttt gaacgcgcag ccgccaagcc 2460
gaattctgca gatcccatcg atgcatgtcc ttgggtccgg cctgctg 2507

SEQ ID NO: 49              moltype = DNA  length = 20
FEATURE                    Location/Qualifiers
source                     1..20
                           mol_type = other DNA
                           organism = synthetic construct
SEQUENCE: 49
tccgccacaa catcgaggac                                                20

SEQ ID NO: 50              moltype = DNA  length = 20
FEATURE                    Location/Qualifiers
source                     1..20
                           mol_type = other DNA
                           organism = synthetic construct
SEQUENCE: 50
gtagtggttg tcgggcagca                                                20

SEQ ID NO: 51              moltype = DNA  length = 20
FEATURE                    Location/Qualifiers
source                     1..20
                           mol_type = other DNA
                           organism = synthetic construct
SEQUENCE: 51
cagcgtgcag ctcgccgacc                                                20
```

ADENO-ASSOCIATED VIRUS CAPSID

CROSS-REFERENCE TO RELATED APPLICATIONS

This application is a continuation of PCT/CN2022/127893, filed Oct. 27, 2022, and claims priority to PCT/CN2021/127182, filed Oct. 28, 2021, which are incorporated by reference for all purposes.

REFERENCE TO A SEQUENCE LISTING

In accordance with 37 CFR § 1.833-1835 and 37 CFR § 1.77(b)(5), the specification makes reference to a Sequence Listing submitted electronically as a .xml file named "552055US_ST26.xml". The .xml file was generated on Apr. 23, 2024 and is 81,800 bytes in size. The entire contents of the Sequence Listing are hereby incorporated by reference.

TECHNICAL FIELD

The present disclosure relates to an AAV capsid having improved liver tissue tropism and stronger exogenous gene expression, and/or improved ability in escaping from neutralizing antibody. The present disclosure further relates to a nucleic acid encoding the AAV capsid, an AAV particle containing the AAV capsid. The present disclosure further relates to a pharmaceutical formulation, which contains (1) the AAV capsid, the nucleic acid, or the AAV particle, and (2) a pharmaceutically acceptable carrier. The present disclosure further relates to use of the AAV capsid, the nucleic acid, the AAV particle, or the pharmaceutical formulation in the manufacture of a drug for delivering a target gene to mammalian cells. The present disclosure further relates to a method for treating disease, including administration of the pharmaceutical formulation to a subject in need thereof. The present disclosure further relates to a cell containing the nucleic acid.

BACKGROUND

The statements in this section merely provide background information related to the present disclosure and do not necessarily constitute prior art.

Adeno-associated virus (AAV) is a non-enveloped virus with a diameter of about 20 nm which infects mammals such as humans and primates, and is classified into family Parvoviridae, genus Dependovirus. To date, a large number of AAV serotypes have been identified, and it is known that different serotypes of AAV infect different types of animals or cells.

The AAV genome is a single stranded DNA (ssDNA) of approximately 4.7 kb, and comprises inverted terminal repeat (ITR) sequences of about 145 bases at both ends. The ITR sequence forms Watson-Crick base pairs by itself to form a T-type hairpin structure comprising cis elements necessary for replication and packaging of the AAV genome. The AAV genome comprises two open reading frames (ORFs) in a region flanked by the ITR sequences. One ORF (also called "rep gene") encodes four Rep proteins (Rep78, Rep68, Rep52 and Rep40). The other ORF (also called "cap gene") encodes three capsid proteins (VP1, VP2 and VP3) and an assembly-activating protein (AAP). The Rep proteins have helicase activity, and are required not only for induction of capsid formation but also for integration of the AAV genome into a host cell chromosome. On the other hand, a total of 60 molecules of VP1, VP2 and VP3 assemble at a ratio of 1:1:10 to form an icosahedral AAV outer shell. VP1, VP2 and VP3 are mainly different in the N-terminal region. For example, a phospholipase A2 (phospholipase A2: PLA2) domain is present at the N-terminus of VP1. Since the PLA2 domain is present only in VP1, the N-terminal region of VP1 is also called a VP1 unique region (VP1u). The PLA2 domain is known to be exposed to outside of the AAV particle under acidic conditions, though it is usually present inside the AAV particle. Thus it is believed that the PLA2 domain is necessary for AAV to escape from endosome and transfer into a nucleus after the AAV enters a cell. AAP is a protein necessary for formation of AAV capsid.

Replication of AAV in nature depends on the presence of a helper virus such as adenovirus and herpes virus. In the presence of a helper virus, the AAV genome is replicated in a host cell and a complete AAV particle containing the AAV genome is formed. Then, the AAV particle is released from the host cells. In the absence of a helper virus, the AAV genome is episomally maintained, or is integrated into a host chromosome and becomes latent.

AAV can infect a wide variety of cells including human cells, and AAV infects even non-dividing cells in which differentiation terminates, including blood cells, muscle cells, and nerve cells. In addition, since AAV is not pathogenic to human, it has a low risk of adverse effect. The virus particle of AAV is physicochemically stable. For these reasons, AAV has recently attracted attention to its value as a vector for gene transfer used in gene therapies for the treatment of congenital genetic diseases as well as the treatment of cancer or infection.

In order to achieve lower and safer dosage of the AAV used in gene therapies, there is ongoing need to provide an AAV with improved tissue tropism and stronger exogenous gene expression, and/or improved ability in escaping from neutralizing antibody.

SUMMARY

The present disclosure provides an AAV capsid, which achieves improved liver tissue tropism and stronger exogenous gene expression, and/or improved ability in escaping from neutralizing antibody, allowing lower and safer dosage of the AAV used in gene therapies.

One aspect of the present disclosure relates to an AAV capsid, comprising one or more amino acid modifications as compared with the amino acid sequence as set forth in SEQ ID NO: 1, wherein the one or more amino acid modifications are located at one or more positions selected from the group consisting of: 332, 589, 665, 98, 701, 14, 459, 452, 496, 597, 552, 583, and the combination of any of them, wherein the positions are defined with reference to SEQ ID NO: 1.

Another aspect of the present disclosure relates to an AAV capsid, comprising one or more amino acid modifications as compared with the amino acid sequence as set forth in SEQ ID NO: 13, wherein the one or more amino acid modifications are located at one or more positions selected from the group consisting of: 451, 585, 98, 457, 497, 201, 205, 265, 410, 417, 450-458 as a whole, 537, 540, 699, 735, 14, 553, 554, 579, 592, 493, 595, 248, 550, 581, and the combination of any of them, wherein the positions are defined with reference to SEQ ID NO: 13.

A further aspect of the present disclosure relates to a nucleic acid, comprising an AAV capsid coding sequence that has at least 90%, at least 95%, at least 96%, at least 97%, at least 98%, at least 99%, at least 99.5%, 100% identity with a nucleotide sequence encoding the AAV capsid according to the present disclosure.

An additional aspect of the present disclosure relates to an AAV particle containing the AAV capsid according to the present disclosure.

An additional aspect of the present disclosure relates to a pharmaceutical formulation, which contains (1) the AAV capsid according to the present disclosure, the nucleic acid according to the present disclosure, or the AAV particle according to the present disclosure, and (2) a pharmaceutically acceptable carrier.

An additional aspect of the present disclosure relates to use of the AAV capsid according to the present disclosure, the nucleic acid according to the present disclosure, the AAV particle according to the present disclosure, or the pharmaceutical formulation according to the present disclosure in the manufacture of a drug for delivering a target gene to mammalian cells.

An additional aspect of the present disclosure relates to a method for treating disease, including administration of the pharmaceutical formulation according to the present disclosure to a subject in need thereof.

An additional aspect of the present disclosure relates to a cell containing the nucleic acid according to the present disclosure.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1A:
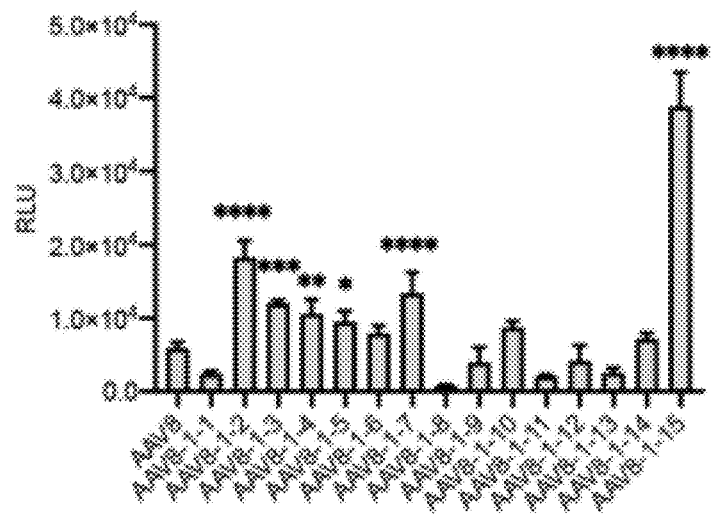
FIGS. 1A-1C show in vitro detection of the first batch of AAV8 mutants in Huh7 cells. (A) First round screening of AAV8 mutants. MOI=1E5. (B) Second round screening of AAV8 mutants. MOI=1E5. (C) Third round screening of AAV8 mutants. MOI=1E5.

The present disclosure is explained in greater detail below. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which do not depart from the instant invention. Hence, the following description is intended to illustrate some particular embodiments of the invention, and not to exhaustively specify all permutations, combinations and variations thereof.

Unless the context indicates otherwise, it is specifically intended that the various features of the invention described herein can be used in any combination. Moreover, the present disclosure also contemplates that in some embodiments of the invention, any feature or combination of features set forth herein can be excluded or omitted. To illustrate, if the description states that a complex comprises components A, B and C, it is specifically intended that any of A, B or C, or a combination thereof, can be omitted and disclaimed singularly or in any combination.

Unless defined otherwise, all technical and scientific terms used herein have the same meaning as commonly understood by one of ordinary skill in the art to which the disclosure pertains. Although any methods and materials similar or equivalent to those described herein may be used in the practice for testing of the present disclosure, the preferred materials and methods are described herein. In describing and claiming the present disclosure, the following terminology will be used.

It is also to be understood that the terminology used herein is for the purpose of describing particular embodiments only, and is not intended to be limiting.

The singular forms "a," "an," and "the" include plural referents unless the context clearly dictates otherwise.

As used in the description and in the claims, the open-ended transitional phrases "comprise(s)," "include(s)," "having," "has," "contain(s)," and variants thereof require the presence of the named ingredients/steps and permit the presence of other ingredients/steps. These phrases should also be construed as disclosing the closed-ended phrases "consist of" or "consist essentially of" that permit only the named ingredients/steps and unavoidable impurities, and exclude other ingredients/steps.

Numerical values in the description and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable. Throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The term "about" can be used to include any numerical value that can vary without changing the basic function of that value. When used with a range, "about" also discloses the range defined by the absolute values of the two endpoints, e.g., "about 2 to about 4" also discloses the range "from 2 to 4." The term "about" may refer to plus or minus 10% of the indicated number.

Nucleotide sequences are presented herein by single strand only, in the 5' to 3' direction, from left to right, unless specifically indicated otherwise. Nucleotides and amino acids are represented herein in the manner recommended by the IUPAC-IUB Biochemical Nomenclature Commission, or (for amino acids) by either the one-letter code, or the three letter code, both in accordance with 37 C.F.R. § 1.822 and established usage.

Except as otherwise indicated, standard methods known to those skilled in the art may be used for production of recombinant and synthetic polypeptides, antibodies or antigen-binding fragments thereof, manipulation of nucleic acid sequences, production of transformed cells, the construction of rAAV constructs, modified capsid proteins, packaging vectors expressing the AAV rep and/or cap sequences, and transiently and stably transfected packaging cells. Such techniques are known to those skilled in the art. See, e.g., SAMBROOK et al, MOLECULAR CLONING: A LABORATORY MANUAL 2nd Ed. (Cold Spring Harbor, N Y, 1989); F. M. AUSUBEL et al. CURRENT PROTOCOLS IN MOLECULAR BIOLOGY (Green Publishing Associates, Inc. and John Wiley & Sons, Inc., New York).

All publications, patent applications, patents, nucleotide sequences, amino acid sequences and other references mentioned herein are incorporated by reference in their entirety.

As used herein, the term "adeno-associated virus (AAV)" refers to small virus that infects primates and other mammals including humans and is classified into family Parvoviridae, genus Dependovirus. AAV has a non-enveloped icosahedral outer shell and a single-stranded genomic DNA within the shell. As used herein, if not otherwise specified, AAV includes wild-type virus and its derivatives, and also includes all serotypes and clades. As used herein, the serotype of an AAV particle is based on the serotype from which capsid is derived. In other words, the serotype of a recombinant AAV particle is determined based on the source of cap gene used for preparation of the recombinant AAV particle, and does not depend on the serotype of an AAV genome encapsulated in the recombinant AAV particle. For example, when capsid protein is derived from AAV8 and ITR sequences in an AAV genome encapsulated in a recombinant AAV particle are derived from AAV2, the recombinant AAV particle is defined as serotype 8.

As used herein, the term "capsid protein" means a protein which is encoded by cap gene present in a viral genome and constitutes the outer shell of virus. The wild-type AAV genome or cap gene encodes three capsid proteins (VP1, VP2 and VP3). As used herein, all of VP1, VP2 and VP3 are included in the capsid protein. A total of 60 molecules of VP1, VP2 and VP3 assemble at a ratio of 1:1:10 to form an icosahedral AAV capsid.

As used herein, the term "AAV particle" means an AAV genome (whether modified or not) packaged within an AAV capsid.

As used herein, the term "recombinant" means production using genetic recombination technology. For example, a recombinant AAV particle means an AAV particle produced using genetic recombination technology, and a recombinant DNA means a DNA produced using genetic recombination technology.

A "nucleic acid" or "nucleotide sequence" is a sequence of nucleotide bases, and may be RNA, DNA or DNA-RNA hybrid sequences (including both naturally occurring and non-naturally occurring nucleotide), but is preferably either single or double stranded DNA sequences.

The term "identity" refers to the degree of similarity between a pair of sequences (nucleotide or amino acid). Identity is measured by dividing the number of identical residues by the total number of residues and multiplying the product by 100 to achieve a percentage. Gaps do not count when assessing identity. Thus, two copies of exactly the same sequence have 100% identity, while sequences that have deletions, additions, or substitutions may have a lower degree of identity. Those skilled in the art will recognize that several computer programs, such as those that employ algorithms such as BLAST, are available for determining sequence identity. BLAST nucleotide searches are performed with the NBLAST program, and BLAST protein searches are performed with the BLASTP program, using the default parameters of the respective programs.

By the term "treat", "treating" or "treatment" (or grammatically equivalent terms) it is meant that the severity of the subject's condition is reduced or at least partially improved or ameliorated and/or that some alleviation, mitigation or decrease in at least one clinical symptom is achieved and/or there is a delay in the progression of the condition and/or prevention or delay of the onset of a disease or disorder. The term "treat", "treats", "treating", or "treatment" and the like also include prophylactic treatment of the subject (e.g., to prevent the onset of infection or cancer or a disorder). As used herein, the term "prevent", "prevents", or "prevention" (and grammatical equivalents thereof) are not meant to imply complete abolition of disease and encompasses any type of prophylactic treatment that reduces the incidence of the condition, delays the onset and/or progression of the condition, and/or reduces the symptoms associated with the condition. Thus, unless the context indicates otherwise, the term "treat", "treating" or "treatment" (or grammatically equivalent terms) refers to both prophylactic and therapeutic regimens.

As one of the delivery vectors for gene therapy, AAV has been widely used in preclinical and clinical studies, and has been approved by EMA and FDA. Nevertheless, AAV still has some deficiencies, such as the low efficiency of infection and the immune response caused by high dose injection. For example, in the treatment of some liver diseases using AAV, high-dose AAV injections will be required due to the need for high protein level, which poses a certain risk and may also induce an immune response.

In view of the deficiency of AAV vector, it can be modified through a variety of ways such as directed evolution, rational design, natural discovery and in silico analysis. AAV can be modified in different ways to improve in vivo gene expression efficiency, thus reducing the injection dose and improving the safety of gene therapy.

Rational design strategy is based on the expanding knowledge of AAV to obtain an AAV virus with one or more improved properties by artificially designing, such as improving infection efficiency, reducing immunogenicity or enhancing infection specificity. At present, rationally designed engineering strategies mainly include AAV capsid protein or genomic structure mutation, non-viral fragment insertion, chemical coupling, etc. Compared with other methods, AAV capsid protein mutation based on AAV structure and virus life cycle is the most straightforward method.

The present disclosure provides a novel AAV capsid by mutating one or more amino acids in a wild-type or known mutant AAV capsid protein, and the thus obtained AAV capsid achieves improved liver tissue tropism and stronger exogenous gene expression.

In a first aspect of the present disclosure, there is provided an AAV capsid, comprising one or more amino acid modifications as compared with the amino acid sequence as set forth in SEQ ID NO: 1,
wherein the one or more amino acid modifications are located at one or more positions selected from the group consisting of: 332, 589, 665, 98, 701, 14, 459, 452, 496, 597, 552, 583, and the combination of any of them,
wherein the positions are defined with reference to SEQ ID NO: 1.

In some embodiments, the one or more amino acid modifications are selected from the group consisting of T332N, Q589N, N665Q, A98R, A98E, I701V, N14T, N459G, S452 insertion, G496S, T597V, R552K, A583S, and the combination of any of them.

In some embodiments, the AAV capsid comprises the amino acid sequence as set forth in any of SEQ ID NOs: 2-12.

In some embodiments, the AAV capsid is covalently linked, bound to, or encapsidating a compound selected from the group consisting of a DNA molecule, an RNA molecule, a polypeptide, a carbohydrate, a lipid, and a small organic molecule.

In a second aspect of the present disclosure, there is provided an AAV capsid, comprising one or more amino acid modifications as compared with the amino acid sequence as set forth in SEQ ID NO: 13,
wherein the one or more amino acid modifications are located at one or more positions selected from the group consisting of: wherein the one or more amino acid modifications are located at one or more positions selected from the group consisting of: 451, 585, 98, 457, 497, 201, 205, 265, 410, 417, 450-458 as a whole, 537, 540, 699, 735, 14, 553, 554, 579, 592, 493, 595, 248, 550, 581, and the combination of any of them,
wherein the positions are defined with reference to SEQ ID NO: 13. In some embodiments, the one or more amino acid modifications are selected from the group consisting of T451N, Q585N, A98R, N457Q, N497Q, N201G, S205A, G265 insertion, Q410T, Q410E, D417E, GTTSGTTNQ (450-458)→TSGGAGT, M537S, N540V, I699V, N735P, N14T, A553V, E554D, T579V, T592I, A493L, T493 insertion, T595D, A248V, A550K, A581S and the combination of any of them.

In some embodiments, the AAV capsid comprises the amino acid sequence as set forth in any of SEQ ID NOs: 14-47.

In some embodiments, the AAV capsid is covalently linked, bound to, or encapsidating a compound selected from the group consisting of a DNA molecule, an RNA molecule, a polypeptide, a carbohydrate, a lipid, and a small organic molecule.

In a third aspect of the present disclosure, there is provided a nucleic acid, comprising an AAV capsid coding sequence that has at least 90%, at least 95%, at least 96%, at least 97%, at least 98%, at least 99%, at least 99.5%, 100% identity with a nucleotide sequence encoding the AAV capsid according to the present disclosure.

The nucleic acid of the present disclosure may be present in the form of DNA, or may be in the form of RNA or a chimera of DNA and RNA. The nucleic acid of the present disclosure also includes a complementary nucleic acid (for example, cDNA). The nucleic acid of the present disclosure may be single-stranded or double-stranded. The nucleic acid of the present disclosure is preferably double-stranded.

The nucleic acid of the present disclosure may be operably linked to an appropriate regulatory sequence. Examples of the regulatory sequence include a promoter sequence, a polyadenylation signal, a transcription termination sequence, an upstream regulatory domain, an internal ribosome entry site (IRES), and an enhancer. Examples of the promoter sequence include an inducible promoter sequence, and a constitutive promoter sequence. The regulatory sequence may be inherent in or foreign to the AAV from which the capsid protein is derived, and may be a natural sequence or a synthetic sequence. A recombinant DNA comprising the nucleic acid of the present disclosure which is capable of expressing an AAV capsid of the present disclosure is also included in the present disclosure.

The recombinant DNA is useful for delivering the nucleic acid of the present disclosure to cells in vitro, ex vivo or in vivo to impart ability to express the AAV capsid of the present disclosure to the cells. The cell to which the nucleic acid of the present disclosure has been delivered is useful for production of a recombinant AAV capsid. The recombinant DNA can be used particularly for delivery or introduction of the nucleic acid of the present disclosure to eukaryotic cells, preferably animal cells, more preferably mammalian cells.

In the present disclosure, a DNA used as a vector is loaded with the nucleic acid of the present disclosure to produce a recombinant DNA. For example, a plasmid, a phage, a transposon, a cosmid, an episomal DNA, a viral genome or the like can be used. For example, a plasmid can be loaded with the nucleic acid (cap gene) encoding the AAV capsid of the present disclosure to produce a packaging plasmid. The packaging plasmid may further contain any nucleotide sequence such as a nucleic acid encoding a Rep protein (a rep gene).

In a fourth aspect of the present disclosure, there is provided an AAV particle containing the AAV capsid according to the present disclosure.

In a fifth aspect of the present disclosure, there is provided a pharmaceutical formulation, which contains (1) the AAV capsid according to the present disclosure, the nucleic acid according to the present disclosure, or the AAV particle according to the present disclosure, and (2) a pharmaceutically acceptable carrier.

In a sixth aspect of the present disclosure, there is provided use of the AAV capsid according to the present disclosure, the nucleic acid according to the present disclosure, the AAV particle according to the present disclosure, or the pharmaceutical formulation according to the present disclosure in the manufacture of a drug for delivering a target gene to mammalian cells.

In some embodiments, the drug is used for treating liver-related disease. In some embodiments, the mammalian cells are liver cells.

In a seventh aspect of the present disclosure, there is provided a method for treating disease, including administration of the pharmaceutical formulation according to the present disclosure to a subject in need thereof.

In some embodiments, the disease is liver-related disease.

In an eighth aspect of the present disclosure, there is provided a cell containing the nucleic acid according to the present disclosure.

Examples of a method for introducing a recombinant DNA (nucleic acid construct) containing the nucleic acid of the present disclosure into a cell include transient or constitutive introduction methods. Examples of a transient introduction method include, but not limited to, any known transient introduction methods, such as a calcium phosphate method, a lipofection method, a DEAE dextran method, a polyethyleneimine method, and an electroporation method. A commercially available reagent, for example, TransIT (registered trademark)-293 Reagent (manufacture by Mirus Bio LLC), TransIT (registered trademark)-2020 (manufacture by Mirus Bio LLC), Lipofectamine (registered trademark) 2000 Reagent (manufactured by Thermo Fisher Scientific Inc.), Lipofectamine (registered trademark) 2000CD Reagent (manufactured by Thermo Fisher Scientific Inc.), or FuGene (registered trademark) Transfection Reagent (manufactured by Promega Corporation) may be used.

Examples of a constitutive introduction method include, but not limited to, any known constitutive introduction methods, such as a method comprising use of a retrovirus vector, and a method comprising introducing a plasmid by a transient introduction method as described above and selecting cells in which a recombinant DNA is integrated into the chromosomes of the cells. In the method comprising use of a retrovirus vector, a commercially available reagent such as Retorovirus Constructive System (manufactured by TAKARA BIO INC.) may be used.

The recombinant DNA of the present disclosure is stably or transiently introduced into cells by using such established techniques. For stable transformation, a selection marker, for example, a well-known selection marker such as a neomycin resistance gene (encoding neomycin phosphotransferase) or a hygromycin B resistance gene (encoding aminoglycoside phosphotransferase) can be linked with the recombinant DNA of the present disclosure.

As a cell into which the nucleic acid of the present disclosure is introduced, various eukaryotic cells such as mammalian cells including rodent cells and primate cells (for example, human cells), and insect cells can be used. The cell into which the nucleic acid of the present disclosure is introduced may be a primary cultured cell or a cell line. Examples of a suitable cell line include a 293 cell (ATCC CRL-1573), a 293T cell, a 293F cell, a 293 FT cell, a 293EB cell, a COS cell, a HeLa cell, a Vero cell, a 3T3 mouse fibroblast, a C3H10T1/2 fibroblast, a CHO cell, a Sf9 cell (ATCC CRL-1711), a AAV 293 cell (manufactured by Stratagene), and cells derived from these cells. In the present disclosure, for example, preferably used is a cell modified so as to transiently or constitutively express one or some of proteins necessary for production of a recombinant AAV, such as the 293 cell or the like which constitutively expresses adenovirus E1 protein.

The present disclosure will further be illustrated in the following non-limiting working examples, it being understood that these examples are intended to be illustrative only and that the disclosure is not intended to be limited to the materials, conditions, process parameters and the like recited herein. All proportions are by weight unless otherwise indicated.

EXAMPLES

Example 1: Generation of Various AAV8 Packaging Plasmids

In this example, the wild-type AAV8 was used as the parent capsid for mutagenesis to identify novel AAV capsids with improved liver tissue tropism. Modification(s) including amino acid substitution and/or amino acid insertion was/were introduced into the capsid of AAV8 to generate various AAV8 mutants.

The AAV8 capsid has the amino acid sequence of SEQ ID NO: 1 as follows:

```
MAADGYLPDWLEDNLSEGIREWWALKPGAPKPKANQQKQDDGRGL

VLPGYKYLGPENGLDKGEPVNAADAAALEHDKAYDQQLQAGDNPY

LRYNHADAEFQERLQEDISFGGNLGRAVFQAKKRVLEPLGLVEEG

AKTAPGKKRPVEPSPQRSPDSSTGIGKKGQQPARKRLNFGQTG

DSESVPDPQPLGEPPAAPSGVGPNTMAAGGGAPMADNNEGADGVG

SSSGNWHCDSTWLGDRVITTSTRTWALPTYNNHLYKQISNGTSGG

AINDNTYPGYSTPWGYFDFNRFHCHFSPRDWQRLINNNWGFRPKR

LSFKLFNIQVKEVTQNEGTKTIANNLTSTIQVFTDSEYQLPYVLG

SAHQGCLPPFPADVFMIPQYGYLTLNNGSQAVGRSSFYCLEYFPS

QMLRTGNNFQFTYTFEDVPFHSSYAHSQSLDRLMNPLIDQYLYYL

SRTQTTGGTANTQTLGFSQGGPNTMANQAKNWLPGPCYRQQRVST

TTGQNNNSNFAWTAGTKYHLNGRNSLANPGIAMATHKDDEERFFP

SNGILIFGKQNAARDNADYSDVMLTSEEEIKIINPVATEEYGIVA

DNLQQQNTAPQIGTVNSQGALPGMVWQNRDVYLQGPIWAKIPHTD

GNFHPSPLMGGFGLKHPPPQILIKNTPVPADPPTTFNQSKLNSFI

TQYSTGQVSVEIEWELQKENSKRWNPEIQYTSNYYKSTSVDFAVN

TEGVYSEPRPIGTRYLTRNL
```

For each AAV8 mutant, the modification as compared to the wild-type AAV8 (SEQ IN NO: 1) is shown in Table 1.

TABLE 1

| Name | Modification |
|---|---|
| AAV8-1-1 | N273T |
| AAV8-1-2 | T332N |
| AAV8-1-3 | Y380N |
| AAV8-1-4 | Q452N |
| AAV8-1-5 | T460N |

TABLE 1-continued

| Name | Modification |
| --- | --- |
| AAV8-1-6 | T493N |
| AAV8-1-7 | Q589N |
| AAV8-1-8 | Q260N |
| AAV8-1-9 | S710N |
| AAV8-1-10 | N14Q |
| AAV8-1-11 | N263Q |
| AAV8-1-12 | N338Q |
| AAV8-1-13 | N385Q |
| AAV8-1-14 | N499Q |
| AAV8-1-15 | N665Q |
| AAV8-2-1 | A98R |
| AAV8-2-2 | A98Q |
| AAV8-2-3 | A98E |
| AAV8-2-4 | F56G |
| AAV8-2-5 | T332N + Q589N |
| AAV8-2-6 | T332N + N665Q |
| AAV8-2-7 | Q589N + N665Q |
| AAV8-2-8 | T332N + Q589N + N665Q |
| AAV8-2-9 | A98R + T332N + Q589N |
| AAV8-2-10 | A98R + T332N + N665Q |
| AAV8-2-11 | A98R + Q589N + N665Q |
| AAV8-2-12 | A98R + T332N + Q589N + N665Q |
| AAV8-2-13 | A98Q + T332N + Q589N |
| AAV8-2-14 | A98Q + T332N + N665Q |
| AAV8-2-15 | A98Q + Q589N + N665Q |
| AAV8-2-16 | A98Q + T332N + Q589N + N665Q |
| AAV8-2-17 | A98E + T332N + Q589N |
| AAV8-2-18 | A98E + T332N + N665Q |
| AAV8-2-19 | A98E + Q589N + N665Q |
| AAV8-2-20 | A98E + T332N + Q589N + N665Q |
| AAV8-2-21 | F56G + T332N + Q589N |
| AAV8-2-22 | F56G + T332N + N665Q |
| AAV8-2-23 | F56G + Q589N + N665Q |
| AAV8-2-24 | F56G + Q589N + N665Q |
| AAV8-3-1 | A98R + T332N |
| AAV8-3-2 | A98R + Q589N |
| AAV8-3-3 | A98R + N665Q |
| AAV8-3-4 | A98Q + T332N |
| AAV8-3-5 | A98Q + Q589N |
| AAV8-3-6 | A98Q + N665Q |
| AAV8-3-7 | A98E + T332N |
| AAV8-3-8 | A98E + Q589N |
| AAV8-3-9 | A98E + N665Q |
| AAV8-S1 | TTGGTANT (453-460) →TSGGAGT (meaning TTGGTANT in positions 453-460 of AAV8 substituted with TSGGAGT) |
| AAV8-S2 | I542V |
| AAV8-S3 | I701V |
| AAV8-S4 | N737P |
| AAV8-S5 | TTGGTANT (453-460) →TSGGAGT + I542V + I701V + N737P |
| AAV8-S7 | TTGGTANT (453-460) →TSGGAGT + I701V |
| AAV8-S13 | I701V + N737P |
| AAV8-S15 | TTGGTANT (453-460) →TSGGAGT + I701V + N737P |
| AAV8-S16 | I701V + N14T |
| AAV8-S17 | I701V + N459G |
| AAV8-S18 | I701V + T495 Insertion (meaning T inserted right after position 495 of AAV8) |
| AAV8-S46 | I701V + N14T + S452 Insertion + G496S + T597V |
| AAV8-S48 | I701V + N14T + S452 Insertion + R552K + G496S + T597V |
| AAV8-S49 | I701V + N14T + S452 Insertion + A583S + G496S + T597V |
| AAV8-S50 | I701V + N14T + S452 Insertion + I581V + G496S + T597V |
| AAV8-S51 | I701V + N14T + S452 Insertion + A555V + I581V + G496S + T597V |

Plasmid pDP8.ape (PlasmidFactory, PF478), which has both the function of a packaging plasmid and the function of a helper plasmid, contains the capsid gene of AAV8 and was used as the starting template to generate the packaging plasmids encoding the AAV8 mutants listed in Table 1 by performing PCR using appropriate primers.

The PCR system is as follows:

| Component | Source | Volume |
| --- | --- | --- |
| 2× Phanta Flash Master Mix (Dye Plus) | Vazyme, P520-01 | 25 μL |
| Forward primer (10 μM) | Genscript | 1 μL for each forward primer |
| Reverse primer (10 μM) | Genscript | 1 μL for each reverse primer |

The PCR program is set as follows:

| Temperature | Time | Cycle |
|---|---|---|
| 98° C. | 10 s | 30 |
| 60° C. | 15 s | |
| 72° C. | 15 s | |
| 4° C. | Forever | 1 |

Plasmid pDP8.ape (PlasmidFactory. PF478) was digested at 25° C. for 6 h in the following reaction system.

| Component | Source | Volume |
|---|---|---|
| SwaI | NEB, R0604S | 1 μL |
| ClaI | NEB, R0604S | 1 μL |
| 10× NEBuffer 3.1 | NEB | 5 μL |
| pDP8.ape | PlasmidFactory, PF478 | 1 μg |
| H₂O | | To 50 μL |

The PCR products and the digested products were subjected to 1% agarose gel electrophoresis, and were recovered using ZymoClean™ gel DNA recovery kit (ZYMO, D4008). Seamless Cloning and Assembly Kit (CloneSmarter, C5891-50) was used for plasmids ligation. For a specific AAV8 mutant, the ligation system consisted of 5 μL 2× Seamless mix, 50 ng digested product, and 20 ng each PCR product generated using a primer pair, and was incubated for 15 min at 50° C., and then placed on ice. For transformation, 50 μL competent cells (TransStbl3 Chemically Competent Cell, TansGen Biotech, CD521-01) and 5 μL of the ligation product were added into a tube. Afterwards, the tube was heat shocked for 45 s in a 42° C. water bath without shaking, and then placed on ice. The tube was added with 950 μL of pre-warmed SOC, and incubated at 37° C. for 1 hour at 225 rpm. Subsequently, 200 μL was pipetted from the tube and spread on a pre-warmed LB AMP plate (agar 2% (w/v), typtone 1% (w/v), sodium chloride 1% (w/v), yeast extract 0.5 (w/v), ampicillin 100 μg/mL). After incubation overnight at 37° C., single clones were picked and sequenced by Sanger sequencing (Tsingke Biotechnology) to confirm successful generation of various packaging plasmids.

-continued

| Component | Source | Volume |
|---|---|---|
| pDP8.ape | PlasmidFactory, PF478 | 5 ng |
| H₂O | | To 50 μL |

Example 2: Generation of Various AAVS3 Packaging Plasmids

In this example, AAVS3 was used as the parent capsid for mutagenesis to identify novel AAV capsids with improved liver tissue tropism. Modification(s) including amino acid substitution and/or amino acid insertion was/were introduced into the capsid of AAVS3 to generate various AAVS3 mutants.

The AAVS3 capsid has the amino acid sequence of SEQ ID NO: 13 as follows:

MAADGYLPDWLEDNLSEGIREWWALKPGAPKPKANQQKQDDGRG

LVLPGYKYLGPENGLDKGEPVNAADAAALEHDKAYDQQLQAGDNP

YLRYNHADAEFQERLQEDISFGGNLGRAVFQAKKRVLEPLGLVE

EGAKTAPGKKRPVDQSPQEPDSSSGVGKSGKQPARKRLNFGQT

GDSESVPDPQPLGEPPAAPTSLGSNTMASGGGAPMADNNEGADGV

GNSSGNWHCDSQWLGDRVITTSTRTWALPTYNNHLYKQISSQSGA

SNDNHYFGYSTPWGYFDFNRFHCHFSPRDWQRLINNNWGFRPKKL

SFKLFNIQVKEVTQNDGTTTIANNLTSTVQVFTDSEYQLPYVLGS

AHQGCLPPFPADVFMVPQYGYLTLNNGSQAVGRSSFYCLEYFPSQ

MLRTGNNFQFSYTFEDVPFHSSYAHSQSLDRLMNPLIDQYLYYLN

RTQGTTSGTTNQSRLLFSQAGPQSMSLQARNWLPGPCYRQQRLSK

TANDNNNSNFPWTAASKYHLNGRDSLVNPGPAMASHKDDEEKFFP

MHGNLIFGKEGTTASNAELDNVMITDEEEIRTTNPVATEQYGTVA

NNLQSSNTAPTTRTVNDQGALPGMVWQDRDVYLQGPIWAKIPHTD

GHFHPSPLMGGFGLKHPPPQIMIKNTPVPANPPTTFSPAKFASFT

TQYSTGQVSVEIEWELQKENSKRWNPEIQYTSNYNKSVNVDFTVD

TNGVYSEPRPIGTRYLTRNL

For each AAVS3 mutant, the modification as compared to the wild-type AAVS3 (SEQ IN NO: 13) is shown in Table 2.

TABLE 2

| Name | Modification |
|---|---|
| AAVS3-1-1 | T329N |
| AAVS3-1-2 | T451N |
| AAVS3-1-3 | S453N |
| AAVS3-1-4 | S490N |
| AAVS3-1-5 | N496T |
| AAVS3-1-6 | N500T |
| AAVS3-1-7 | Q585T |
| AAVS3-1-8 | Q585N |
| AAVS3-1-9 | S587N |
| AAVS3-1-10 | N335Q |
| AAVS3-1-11 | N382Q |
| AAVS3-1-12 | N446Q |
| AAVS3-1-13 | N457Q |
| AAVS3-1-14 | N497Q |

TABLE 2-continued

| Name | Modification |
|---|---|
| AAVS3-2-1 | N457Q + N497Q |
| AAVS3-2-2 | A98R + N457Q |
| AAVS3-2-3 | A98R + N497Q + S162L |
| AAVS3-2-4 | A98R |
| AAVS3-2-5 | A98R + N457Q + N497Q |
| AAVS3-2-6 | A98Q + N457Q |
| AAVS3-2-7 | A98Q + N497Q + S162L |
| AAVS3-2-8 | A98Q |
| AAVS3-2-9 | A98Q + N457Q + N497Q |
| AAVS3-2-10 | A98E + N457Q |
| AAVS3-2-11 | A98E + N497Q + S162L |
| AAVS3-2-12 | A98E |
| AAVS3-2-13 | A98E + N457Q + N497Q |
| AAVS3-2-14 | A98R + N497Q |
| AAVS3-2-15 | A98Q + N497Q |
| AAVS3-2-16 | A98E + N497Q |
| AAVS3-S22 | A24D |
| AAVS3-S23 | A24K |
| AAVS3-S24 | A67E |
| AAVS3-S25 | R92K |
| AAVS3-S26 | G135P |
| AAVS3-S27 | D147E |
| AAVS3-S28 | Q148H |
| AAVS3-S29 | Q148P |
| AAVS3-S30 | R151 Insertion (meaning R inserted right after position 151 of AAVS3) |
| AAVS3-S31 | S157 Insertion (meaning S inserted right after position 157 of AAVS3) |
| AAVS3-S32 | T157 Insertion (meaning T inserted right after position 157 of AAVS3) |
| AAVS3-S33 | V159I |
| AAVS3-S34 | V159T |
| AAVS3-S35 | S162K |
| AAVS3-S36 | S162A |
| AAVS3-S37 | K164Q |
| AAVS3-S38 | T196A |
| AAVS3-S39 | S197G |
| AAVS3-S40 | N201G |
| AAVS3-S41 | S205A |
| AAVS3-S42 | Q233T |
| AAVS3-S43 | G265 Insertion (meaning G inserted right after position 265 of AAVS3) |
| AAVS3-S44 | K310R |
| AAVS3-S45 | S312N |
| AAVS3-S46 | Q410T |
| AAVS3-S47 | Q410E |
| AAVS3-S48 | D417E |
| AAVS3-S49 | N446S |
| AAVS3-S50 | GTTSGTTNQ(450-458)→SSGGAGT (meaning GTTSGTTNQ in positions 450-458 of AAVS3 substituted with SSGGAGT) |
| AAVS3-S51 | GTTSGTTNQ(450-458)→TSGGAGT (meaning GTTSGTTNQ in positions 450-458 of AAVS3 substituted with TSGGAGT) |
| AAVS3-S52 | GTTSGTTNQ(450-458)→STGGAGT (meaning GTTSGTTNQ in positions 450-458 of AAVS3 substituted with STGGAGT) |
| AAVS3-S53 | GTTSGTTNQ(450-458)→TTGGAGT (meaning GTTSGTTNQ in positions 450-458 of AAVS3 substituted with TTGGAGT) |
| AAVS3-S54 | QAGPQSMSLQAR(465-476)→RASPSNMSAQAK (meaning QAGPQSMSLQAR in positions 465-476 of AAVS3 substituted with RASPSNMSAQAK) |
| AAVS3-S55 | QAGPQSMSLQAR(465-476)→RASPSNMSAQSK (meaning QAGPQSMSLQAR in positions 465-476 of AAVS3 substituted with RASPSNMSAQSK) |
| AAVS3-S56 | QAGPQSMSLQAR(465-476)→RASPSNMSAQAR (meaning QAGPQSMSLQAR in positions 465-476 of AAVS3 substituted with RASPSNMSAQAR) |
| AAVS3-S57 | QAGPQSMSLQAR(465-476)→RASPSNMSAQSR (meaning QAGPQSMSLQAR in positions 465-476 of AAVS3 substituted with RASPSNMSAQSR) |
| AAVS3-S58 | LSKTANDNNNSNFPWTA(489-505)→VSKTTLSQNNNSNFAWTG (meaning LSKTANDNNNSNFPWTA in positions 489-505 of AAVS3 substituted with VSKTTLSQNNNSNFAWTG) |
| AAVS3-S59 | LSKTANDNNNSNFPWTA(489-505)→VSTTTLSQNNNSNFAWTG (meaning LSKTANDNNNSNFPWTA in positions 489-505 of AAVS3 substituted with VSTTTLSQNNNSNFAWTG) |
| AAVS3-S61 | LSKTANDNNNSNFPWTA(489-505)→VSTTTLSDNNNSNFAWTG (meaning LSKTANDNNNSNFPWTA in positions 489-505 of AAVS3 substituted with VSTTTLSDNNNSNFAWTG) |
| AAVS3-S62 | H510N |
| AAVS3-S63 | S526T |
| AAVS3-S64 | K533R |
| AAVS3-S65 | M537S |
| AAVS3-S66 | H538S |
| AAVS3-S67 | N540V |
| AAVS3-S68 | L541M |
| AAVS3-S69 | EGTTASNAELDN(546-557)→QGAGKDNVDLEN (meaning EGTTASNAELDN in positions 546-557 of AAVS3 substituted with QGAGKDNVDLEN) |

TABLE 2-continued

| Name | Modification |
|---|---|
| AAVS3-S75 | H642N |
| AAVS3-S76 | M648L |
| AAVS3-S77 | P664A |
| AAVS3-S78 | P664Q |
| AAVS3-S79 | A665T |
| AAVS3-S80 | I699V |
| AAVS3-S81 | T714A |
| AAVS3-S82 | S722T |
| AAVS3-S83 | N735P |
| AAVS3-S93 | N14T |
| AAVS3-S164 | T493 Insertion (meaning T inserted right after position 493 of AAVS3) |
| AAVS3-S165 | A493L |
| AAVS3-S166 | N494S |
| AAVS3-S169 | D495Q |
| AAVS3-S175 | E546Q |
| AAVS3-S176 | T548A |
| AAVS3-S177 | T549G |
| AAVS3-S183 | A553V |
| AAVS3-S184 | E554D |
| AAVS3-S193 | T579V |
| AAVS3-S195 | A581S |
| AAVS3-S198 | N582S |
| AAVS3-S207 | T592I |
| AAVS3-S210 | R594G |
| AAVS3-S211 | T595D |
| AAVS3-S254 | I240T |
| AAVS3-S255 | A248V |
| AAVS3-S257 | S412T |
| AAVS3-S258 | T414S |
| AAVS3-S261 | A506G |
| AAVS3-S242 | S205A + N540V + I699V |
| AAVS3-S243 | G265 Insertion + GTTSGTTNQ(450-458)→TSGGAGT + N735P |
| AAVS3-S244 | S205A + G265 Insertion + GTTSGTTNQ(450-458)→TSGGAGT + N540V + I699V + N735P |
| AAVS3-S245 | G265 Insertion + N735P |
| AAVS3-S246 | GTTSGTTNQ(450-458)→TSGGAGT + I699V |
| AAVS3-S247 | S205A + N540V |
| AAVS3-S248 | A24D + R92K + Q410T + D417E + M537S |
| AAVS3-S249 | A24K + Q148P+ S162K + D417E + T714A |
| AAVS3-S250 | S162A + N201G + D417E + T714A |
| AAVS3-S251 | Q410E + N446S + GTTSGTTNQ(450-458)→SSGGAGT + S722T |
| AAVS3-S271 | G265 Insertion + GTTSGTTNQ (450-458) →TSGGAGT + N735P + E554D + T579V |
| AAVS3-S272 | G265 Insertion + GTTSGTTNQ (450-458) →TSGGAGT + N735P + A553V + T592I |
| AAVS3-S273 | G265 Insertion + GTTSGTTNQ (450-458) TSGGAGT + N735P + N14T + T493 Insertion |
| AAVS3-S274 | G265 Insertion + GTTSGTTNQ (450-458) → TSGGAGT + N735P + A550K + A581S |
| AAVS3-S275 | G265 Insertion + GTTSGTTNQ (450-458) → TSGGAGT + N735P + A553V + E554D + T579V |
| AAVS3-S276 | G265 Insertion + GTTSGTTNQ (450-458) →TSGGAGT + N735P + N14T + T493 Insertion + T592I |
| AAVS3-S277 | G265 Insertion + GTTSGTTNQ (450-458) → TSGGAGT + N735P + N14T + A553V + E554D + T579V |
| AAVS3-S278 | G265 Insertion + GTTSGTTNQ (450-458) → TSGGAGT + N735P + T493 Insertion + A550K + A581S + T592I |

The AAVS3 capsid gene fragment of SEQ ID NO: 48 was ordered from Genscript, and used as the starting template to generate the packaging plasmids encoding the AAVS3 mutants listed in Table 2 by performing PCR using appropriate primers, following similar protocols as described in Example 1.

Example 3: Production of the Various AAV8 and AAVS3 Mutant Viral Particles

HEK293T cells were seeded on 10 cm cell culture dish in DMEM (Gibco, 11995065) with 10% FBS (Gibco, 10099141C), 6E6 cells per dish, and incubated in 37° C. incubator with a humidified atmosphere of 5-10% $CO_2$ in air. 24 hr after seeding, transfection was performed using Lipofectamine™ LTX Reagent with PLUS™ Reagent. Into a tube (tube A), 500 μL OPTI-MEM (Gibco, 31985070) and 25 μL LIPO LTX were added and mixed, and then placed at room temperature for 15 min. Into another tube (tube B), 500 μL OPTI-MEM (Gibco, 31985070), 12.5 μL PLUS, 10 μg each packaging plasmid as generated in Example 1 or 2, and 2.5 μg Target plasmid (pAAV.CMV.Luc.IRES.EGFP.SV40, Addgene, 105533) were added and mixed, and then placed at room temperature for 15 min. Subsequently, 500 μL was pipetted from tube A and added into tube B. Tube B was vortexed and placed at room temperature for 30 minutes. Afterwards, 1 mL was pipetted from tube B and drop-wised to the cell culture dish and cells were incubated at 37° C. incubator with a humidified atmosphere of 5-10% $CO_2$ in air.

48 h after transfection, the supernatant of the cell culture dish was collected in a 50 mL tube and stored at 4° C., and the cell culture dish was added with 10 mL fresh medium. 72 h after transfection, the supernatant of the cell culture dish was collected and pooled with the supernatant collected at 48 h after transfection. The cell culture dish was treated with 0.05% typsin-EDTA (Trypsin-EDTA 0.05%, Gibco, 25300062) to digest cells, and the resultant was centrifuged at 2000 rpm for 10 min. The supernatant was discarded, and 2 mL PBS was added to the pellet to resuspend the cells. The resulting cell suspension was frozen in liquid nitrogen, and then thawed at 37° C. in a water bath. The above process was repeated twice for a total of 3 freeze and thaw cycles to lyse cells. The lysate was mixed with the pooled supernatant, and DNase I (Roche, 10104159001) was added to the mixture at a 1:10,000 ratio and incubated for 30 minutes at 37° C. to digest cellular DNA. Afterwards, the mixture was spined down at 4,000 rpm for 15 min at room temperature, and the supernatant was concentrated using a 100 kDa protein concentration column (Amicon®) Ultra-15 Centrifugal Filter Unit, Millipore, UFC900324). The column was centrifuged at 6,000 rpm and 4° C.' until the final volume was less than 10 mL.

Example 4: Titer Determination of the Various AAV8 and AAVS3 Mutant Viral Particles Into a tube, 5 μL mixture of 50 U/mL DNase I+DNase buffer (Reagent setup) and 50 μL of the product obtained in Example 3 were added, and the mixture was incubated in a 37° C. water bath for 1 h, to digest DNA that was not packaged into the viral capsid. The tube was added with 5 μL of EDTA (Thermo, AM9260G), and incubated in a 70° C. dry bath for 10 min, to inactivate the DNase I. Afterwards, the tube was added with 5 μL Proteinase K (Takara, 9034), and incubated in 70° C. for 30 min, and then incubated in 95° C. for 10 min. 10 μL was pipetted from the tube, and diluted by 10-fold, 100-fold and 1000-fold, and then was used as the template for quantitative PCR, respectively. The quantitative PCR system was as follows:

| Component | Source | Volume |
| --- | --- | --- |
| AceQ U + Probe Master Mix V2 (2×) | Vazyme, Q513 | 10 μL |
| Primer-GFP-F8 (SEQ ID NO: 49) (10 μM) | Genscript | 0.2 μL |
| Primer-GFP-R8 (SEQ ID NO: 50) (10 μM) | Genscript | 0.2 μL |
| Probe-GFP-P8 (SEQ ID NO: 51) (10 μM) | Genscript | 0.4 μL |
| Template | As descried above | 2 μL |
| $H_2O$ | | 6.8 μL |

The quantitative PCR program is set as follows:

| Temperature | Time | Cycle (s) |
| --- | --- | --- |
| 37° C. | 2 min | 1 |
| 95° C. | 10 min | 1 |
| 95° C. | 10 s | 40 |
| 62° C. | 45 s | |

On the other hand, as a standard, quantitative PCR was performed under the same conditions as described above except that the pDP8.ape plasmids linearized by digestion with restriction enzyme XhoI (NEB, R0146L) of 1E12, 1E11, 1E10, 1E9 and 1E8 copies were used as the template, respectively, and then a standard curve was prepared. Thus, copy numbers of viral genomes (genomic titer) of the various AAV8 and AAVS3 particles obtained in Example 3 were determined by substituting the results into the standard curve.

Example 5: Packaging of the rAAVs

The target gene of the mutant AAV was CMV-Luciferase-GFP, and the target gene of the parent AAV is CMV-Luciferase-mcherry.

HEK293T cells were seeded on 150 cm cell culture dish in DMEM with 10% FBS, and incubated at 37° C. with 5% CO2 for 24 h until 80-90% confluency was reached. Then, transfection was performed using Lipofectamine™ LTX Reagent with PLUS™ Reagent. Into a tube (tube A), 2 mL OPTI-MEM (Gibco, 31985070) and 60 μL LIPO LTX were added and mixed, and then placed at room temperature for 15 min. Into another tube (tube B), 2 mL OPTI-MEM (Gibco, 31985070), 30 μL PLUS, 24 μg each packaging plasmid as generated in Example 1 or 2, and 6 μg Target plasmid (pAAV.CMV.Luc.IRES.EGFP.SV40) (Addgene, 105533) or pAAV-MCS-mCherry-T2A-Luc (miaolingbio, P14570)) were added and mixed, and then placed at room temperature for 15 min. Subsequently, the mixture in tube A was pipetted and added into tube B. Tube B was vortexed and placed at room temperature for 30 minutes. Afterwards, 4 mL was pipetted from tube B and drop-wised to the cell culture dish and incubated in 37° C. incubator with a humidified atmosphere of 5-10% CO2 in air.

48 h after transfection, the supernatant of cells in the cell culture dish was collected, and the cell culture dish was added with 25 mL fresh medium. 72 h after transfection, the supernatant of cells in the cell culture dish was collected and pooled with the supernatant collected at 48 h after transfection. AAV precipitation solution (40% PEG-8000 and 2.5 M NaCl in water) was added to the pooled supernatant at a volume ratio of 1:4, and stored overnight at 4° C. Afterwards, the mixture was centrifuged at 3,000 rpm for 30 min at 4° C., and the supernatant was discarded. 10 mL AAV lysis buffer (150 mM NaCl, 50 mM Tris-HCl pH 8.5, and 2 mM MgCl2 in water) was added to resuspend the pellets and thus an AAV suspension was obtained The cell culture dish was treated with 0.05% trypsin-EDTA to digest cells, and the resultant was centrifuged at 2000 rpm for 10 min. The supernatant was discarded, and 10 mL AAV lysis buffer (150 mM NaCl, 50 mM Tris-HCl pH 8.5, and 2 mM MgCl2 in water) was added to the pellet to resuspend the cells. The resulting cell suspension was frozen in liquid nitrogen, and then thawed at 37° C. in a water bath. The above process was repeated twice for a total of 3 freeze and thaw cycles to lyse cells. The obtained crude lysate was stored overnight at −80° C., and then combined with the AAV suspension. DNase I (Roche, 10104159001) was added to the resulting mixture at a 1:10,000 ratio and incubated for 30 minutes at 37° C. to digest cellular DNA. Afterwards, the mixture was spined down at 4,000 rpm for 15 min at room temperature, and the supernatant was transferred to a clean 50 ml conical tube.

Into an ultracentrifuge tube, 15 mL of the supernatant was added, and then the iodixanol fractions were underlaid in the following order and volume:

| Order | Iodixanol fractions | Volume/tube (mL) |
| --- | --- | --- |
| 1 | 15% | 9 |
| 2 | 25% | 6 |
| 3 | 40% | 5 |
| 4 | 60% | 5 |

Components of the iodixanol fractions are listed below.

| Iodixanol fractions | Iodixanol (60%) (mL) | 5M NaCl (mL) | 5 × PBS (mL) | Water (mL) | Phenol red solution (μL) |
| --- | --- | --- | --- | --- | --- |
| 15% | 12.5 | 10 | 10 | 17.5 | — |
| 25% | 20.8 | — | 10 | 19.2 | 100 |

-continued

| Iodixanol fractions | Iodixanol (60%) (mL) | 5M NaCl (mL) | 5 × PBS (mL) | Water (mL) | Phenol red solution (μL) |
|---|---|---|---|---|---|
| 40% | 33.3 | — | 10 | 6.7 | — |
| 60% | 50 | — | — | — | 100 |

Afterwards, top of the ultracentrifuge tube was carefully filled with mineral oil, using a 5 mL serological pipet. Then, the ultracentrifuge tube was sealed with heat-sealing machine, and centrifuged with the parameters listed below.

| Parameter | |
|---|---|
| Type (rotor type) | 70Ti |
| Temp | 18° C. |
| Time | 1.50 h |
| Display RCF (×g) | 350000 g |
| Accel | 9 |
| Decel | 1 |

After centrifugation, the 40% 60% interface, which comprises the majority of the packaged AAV particles, was collected, and concentrated using a 100 kDa protein concentration column. The column was centrifuged at 6,000 rpm and 4° C. until the final volume was less than 10 Ml. The column was washed with a total of 50 mL of PBS solution to dilute out the residual iodixanol. After centrifugation, the AAV particle solution was transferred to a new tube, and the titer was determined.

Example 6: Evaluation of the AAV8 and AAVS3 Mutants in Huh7 Cells

A Huh7 cell line was obtained from Procell Life Science & Technology Co., Ltd. After digestion, Huh7 cells were spined and resuspend with DMEM (Gibco, C11995500BT)+ 10% FBS (Gibco, 10099141). Subsequently, 2E6 Huh7 cells were added into 10 mL complete medium, and then added to a 96-well plate, 100 μL per well, and cultured overnight in 5% $CO_2$ at 37° C.

Huh7 cells were infected by AAV with MOI=1E4 or MOI=1E5 with three replicates, respectively, and incubated in 5% $CO_2$ at 37° C. 72 hours after infection, the luminescence intensity was measured with a microplate analyzer following the instruction of Bright-Lite Luciferase Assay System. By comparing the luminescence intensity with parent AAV, the expression efficiency of the mutant AAV was determined. The detection results are showed in FIGS. 1-4, wherein * represents P<=0.05,  represents P<=0.01, * represents P<=0.001 and **** represents P<=0.0001.

Figure 1B:
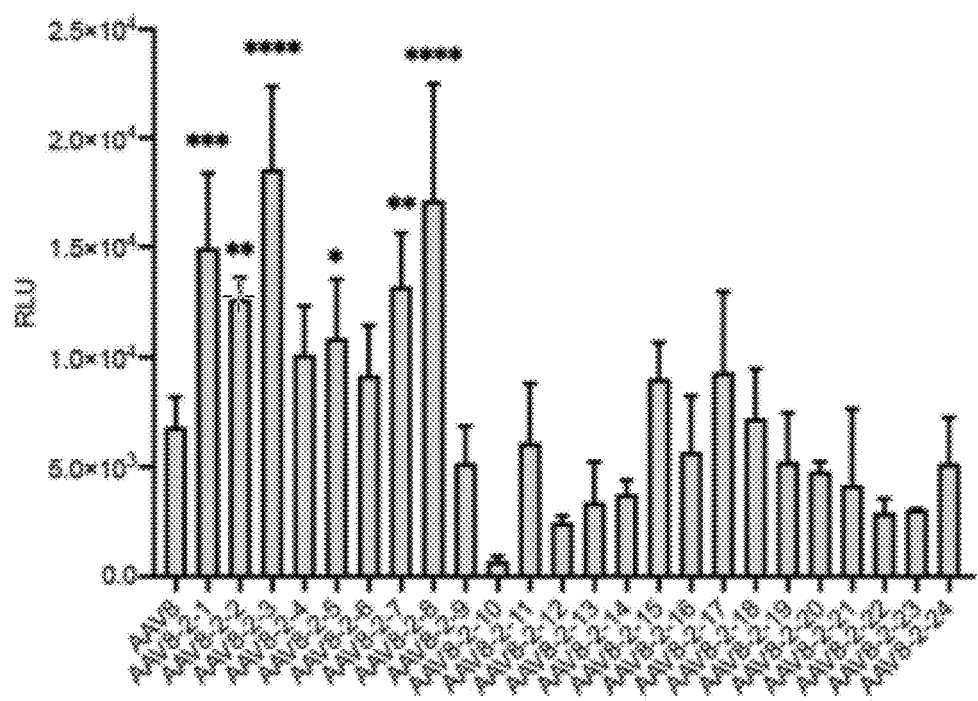
Figure 1C:
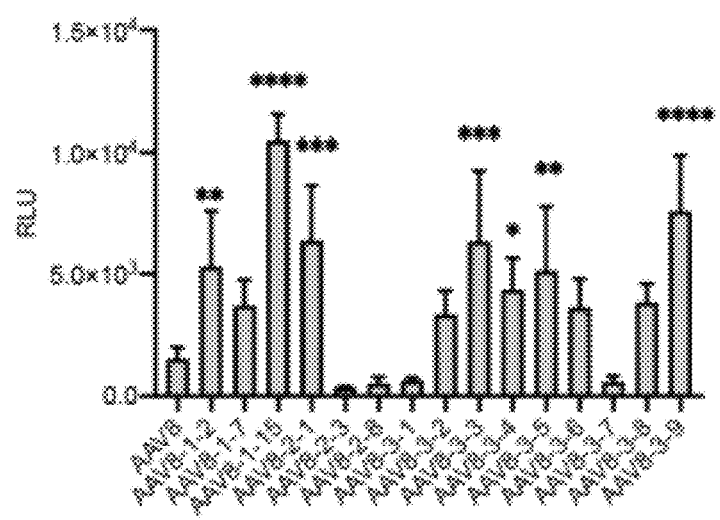
Figure 2A:
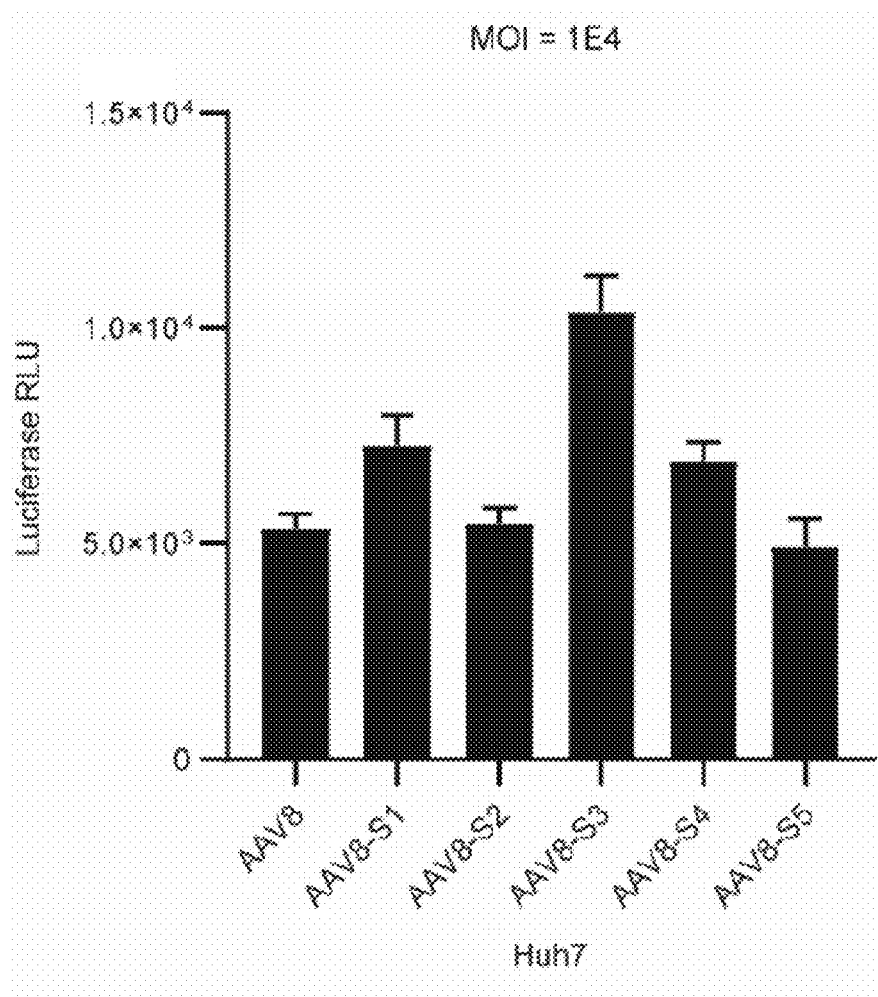
FIGS. 2A-2F show in vitro detection of the second batch of AAV8 mutants in Huh7 cells. (A) MOI=1E4; (B) MOI=1E5.
Figure 2B:
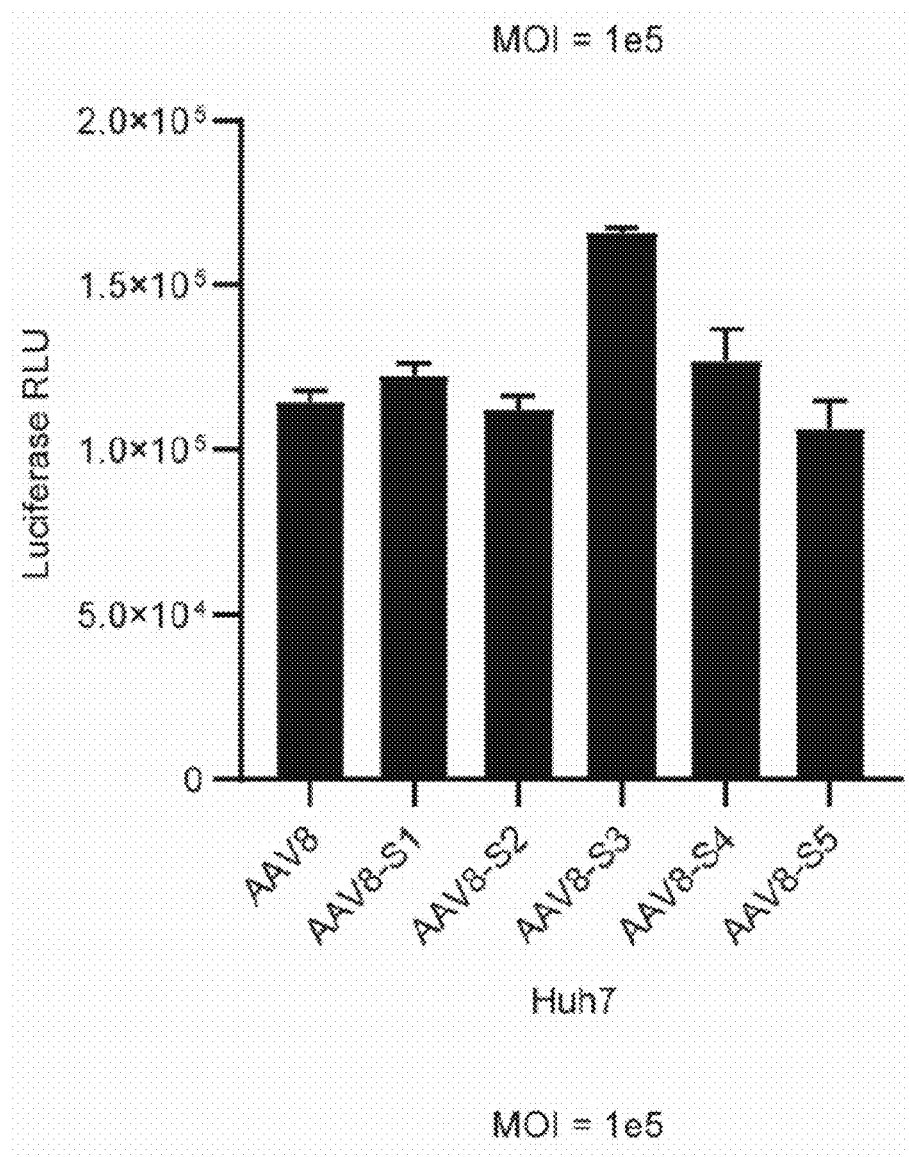
Figure 2C:
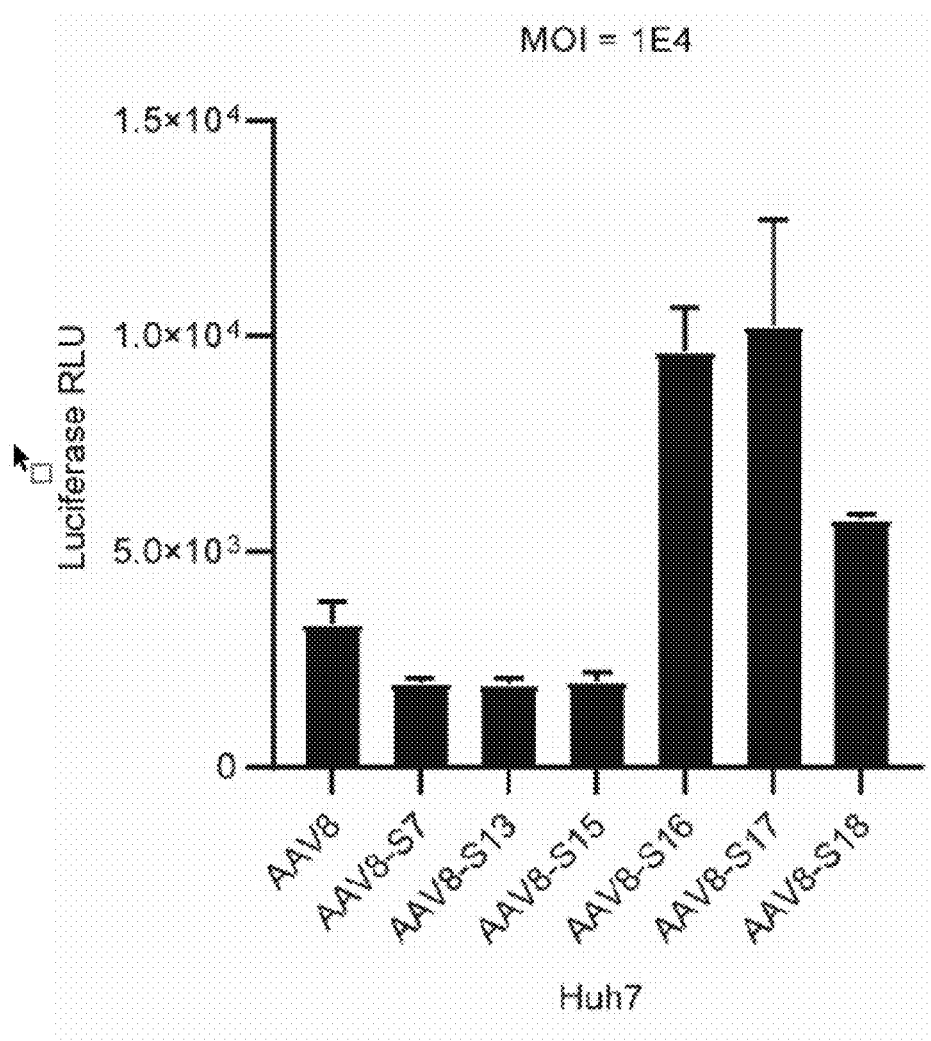
Figure 2D:
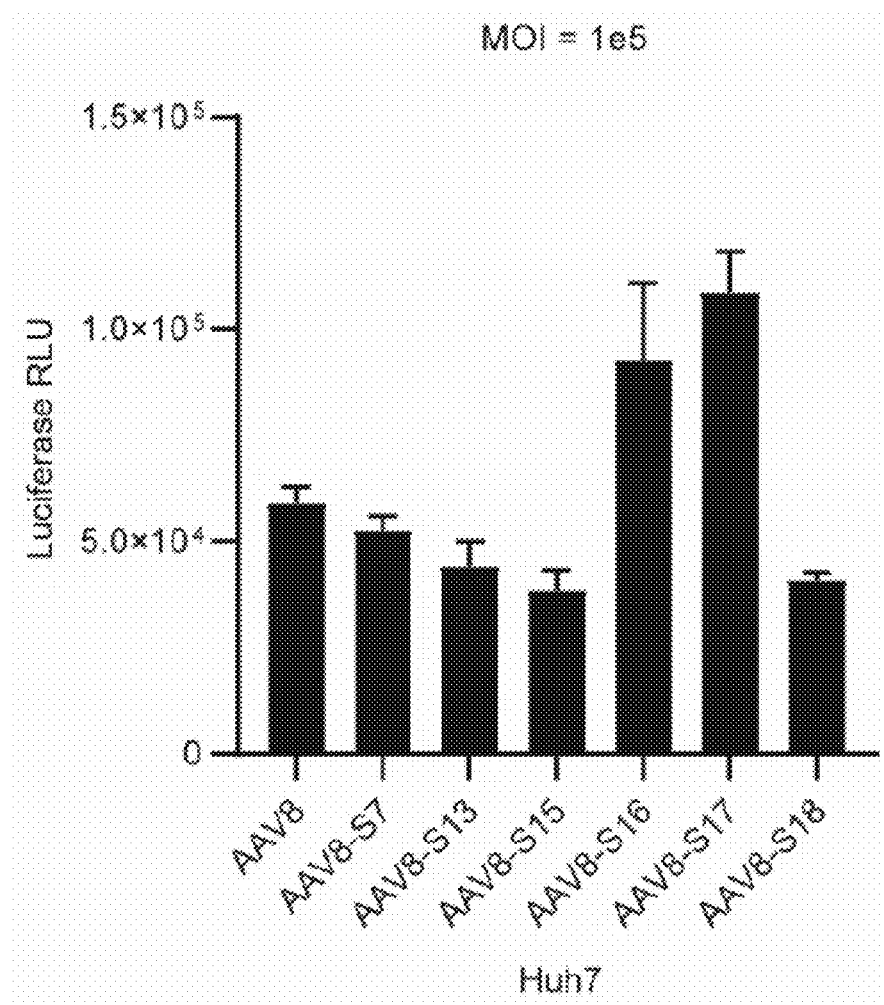
Figure 2E:
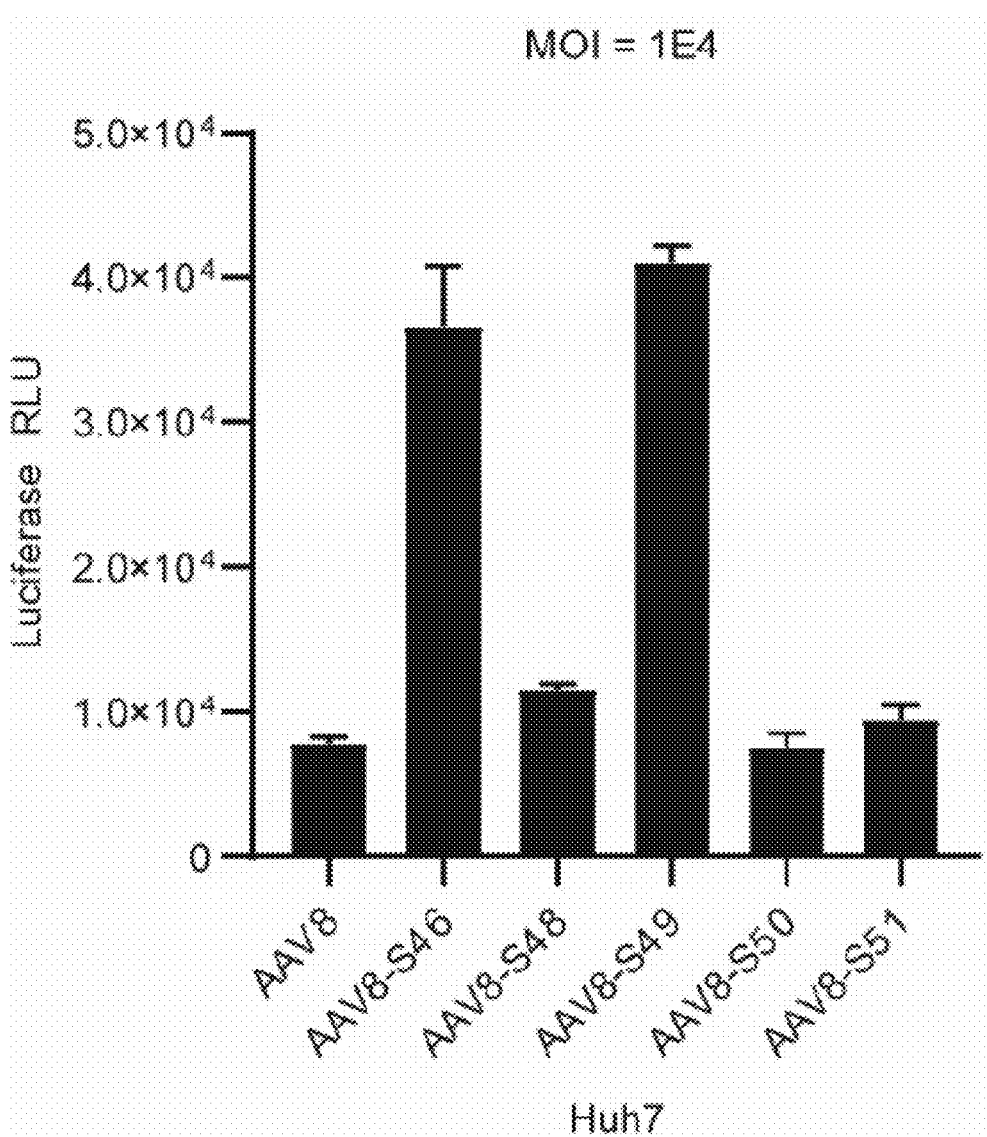
Figure 2F:
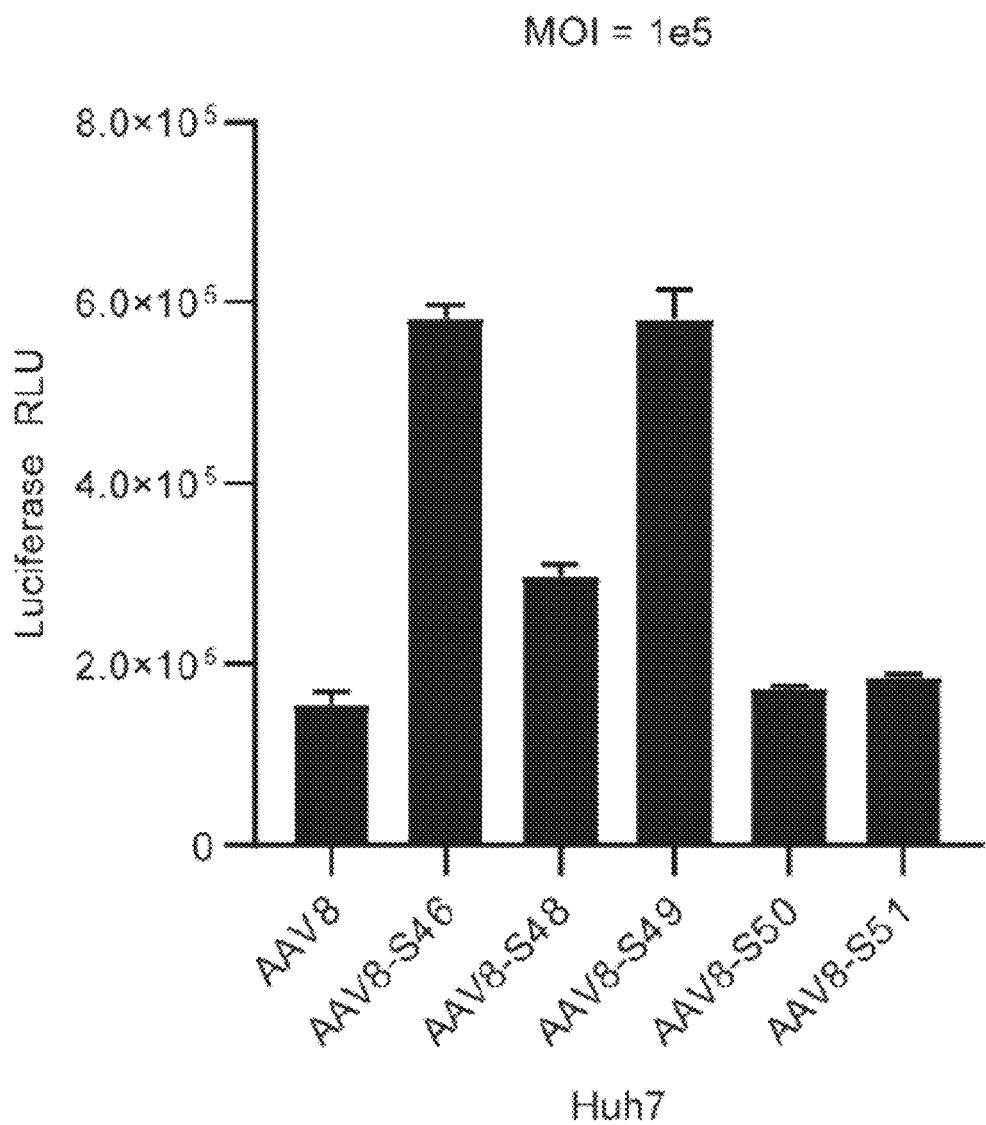

FIGS. 1-2 demonstrate that, compared with the parent AAV8 (SEQ ID NO: 1), mutants AAV8-1-2 (SEQ ID NO: 2), AAV8-1-7 (SEQ ID NO: 3), AAV8-1-15 (SEQ ID NO: 4), AAV8-2-1 (SEQ ID NO: 5), AAV8-3-9 (SEQ ID NO: 6), AAV8-S3 (SEQ ID NO: 7), AAV8-S16 (SEQ ID NO: 8), AAV8-S17 (SEQ ID NO: 9), AAV8-S46 (SEQ ID NO: 10), AAV8-S48 (SEQ ID NO: 11), and AAV8-S49 (SEQ ID NO: 12) achieved stronger exogenous gene expression.

Figure 3A:
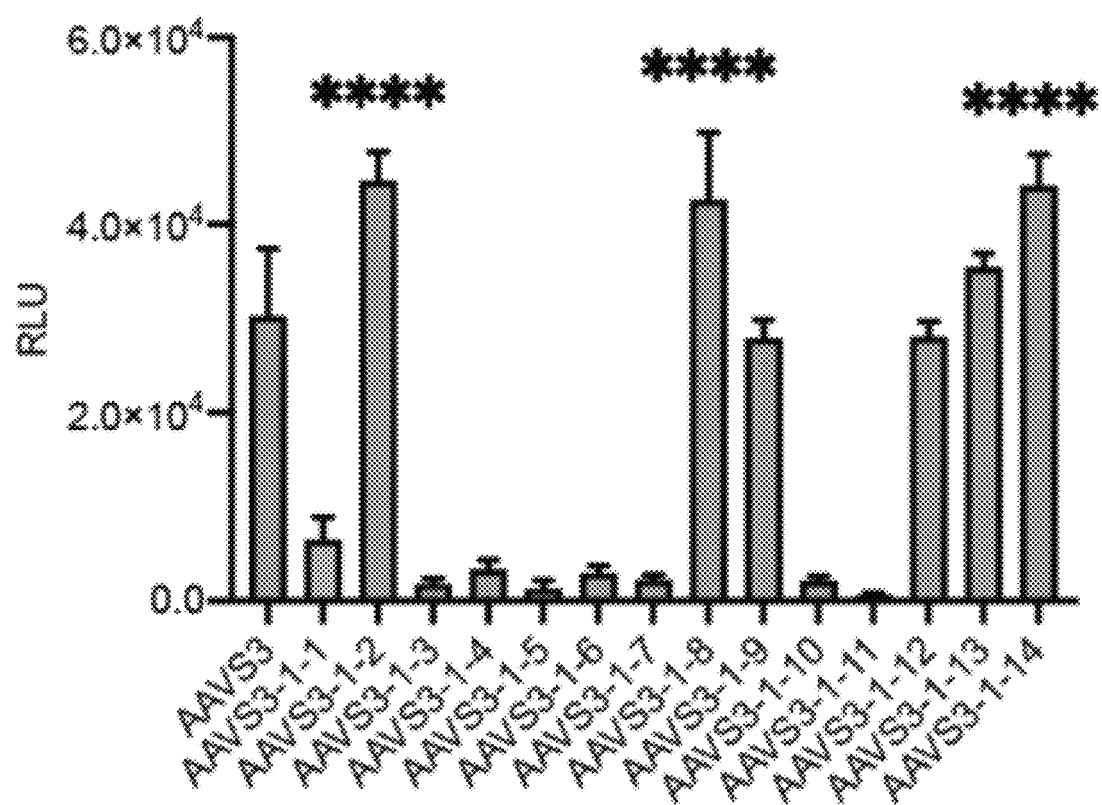
FIGS. 3A and 3B show in vitro detection of the first batch of AAVS3 mutants in Huh7 cells. (A) First round screening of AAVS3 mutants. MOI=1E5. (B) Second round screening of AAVS3 mutants. MOI=1E5.
Figure 3B:
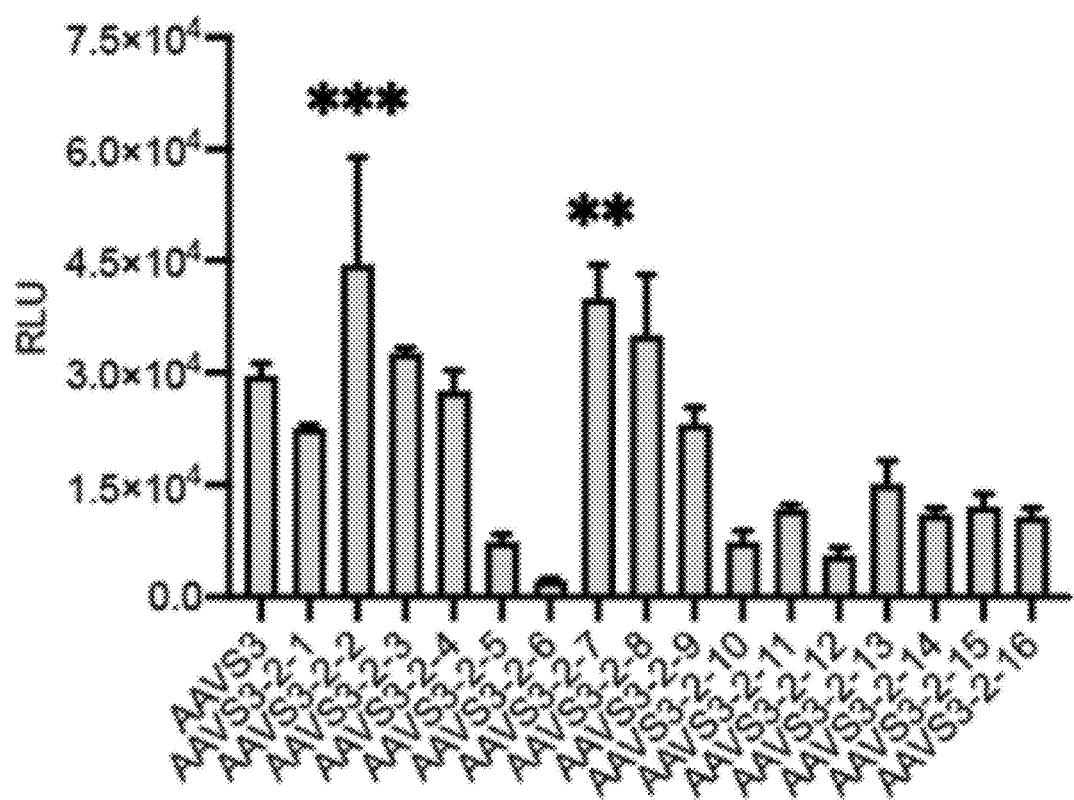
Figure 4A:
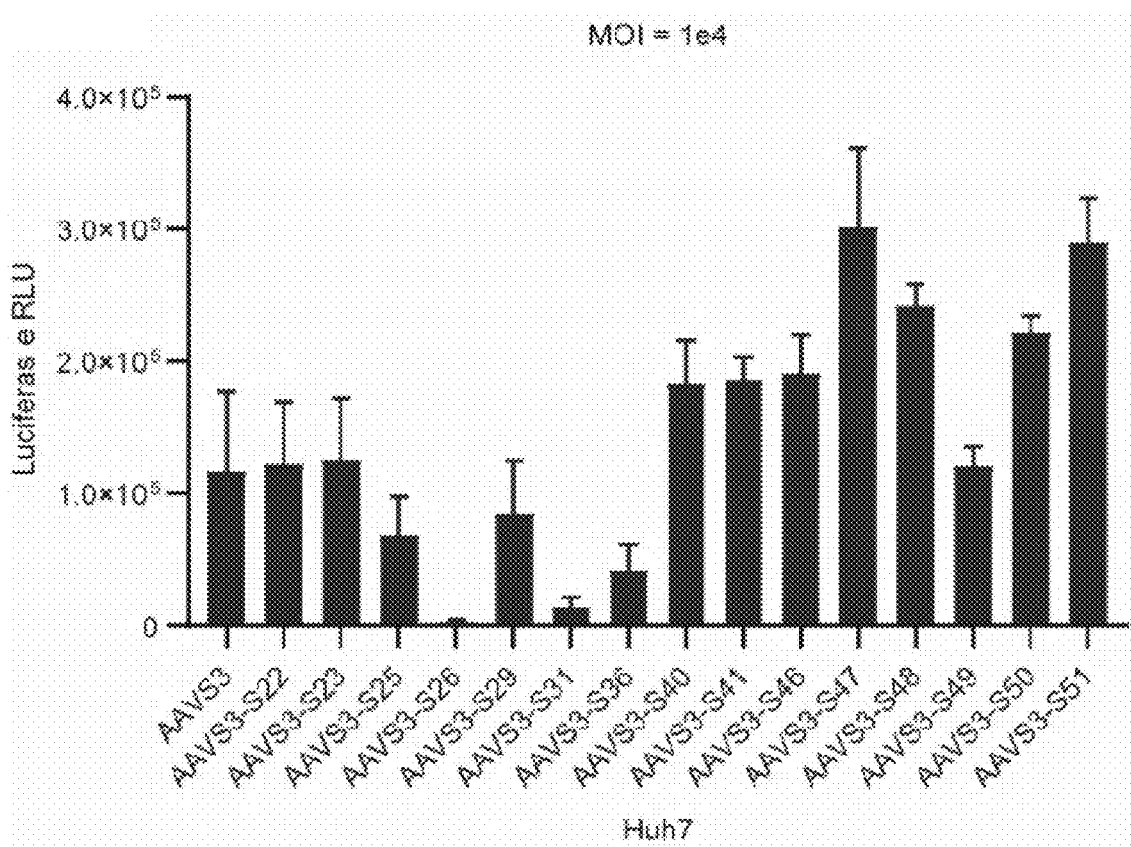
FIGS. 4A-4R shows in vitro detection of the second batch of AAVS3 mutants in Huh7 cells. (A), (C), and (E) MOI=1E4; (B), (D), and (F) MOI=1E5.
Figure 4B:
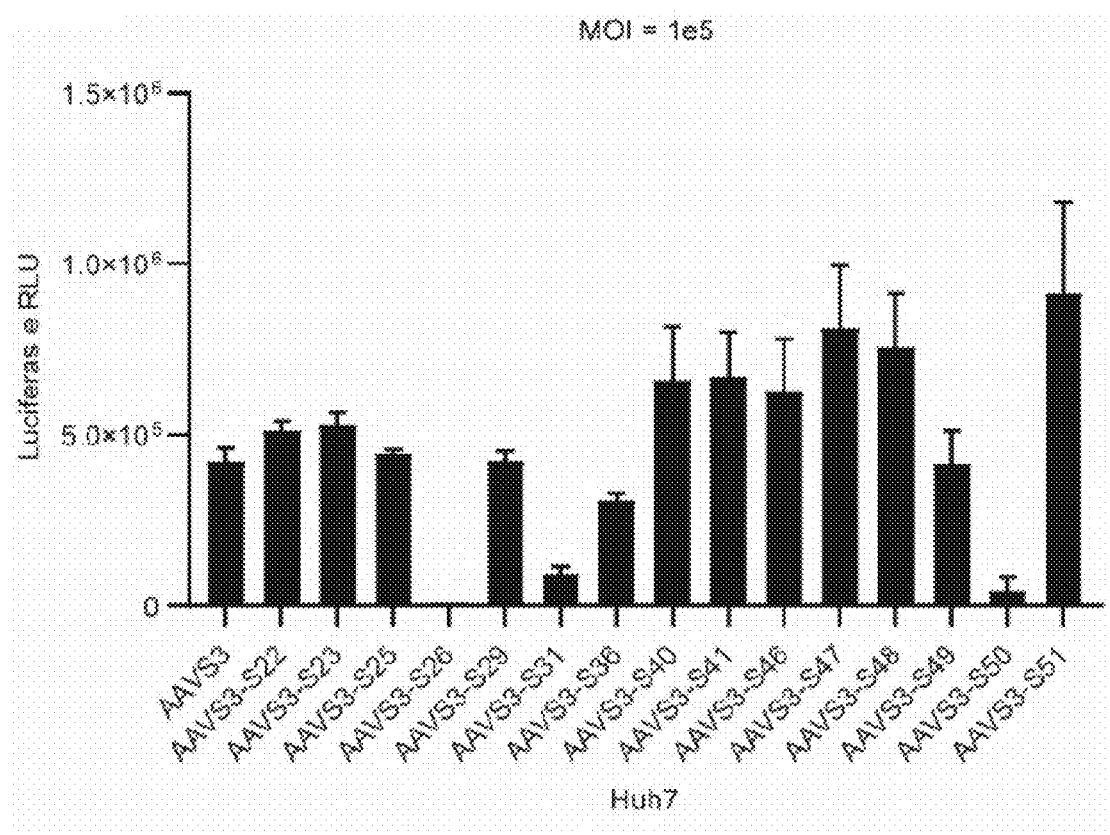
Figure 4C:
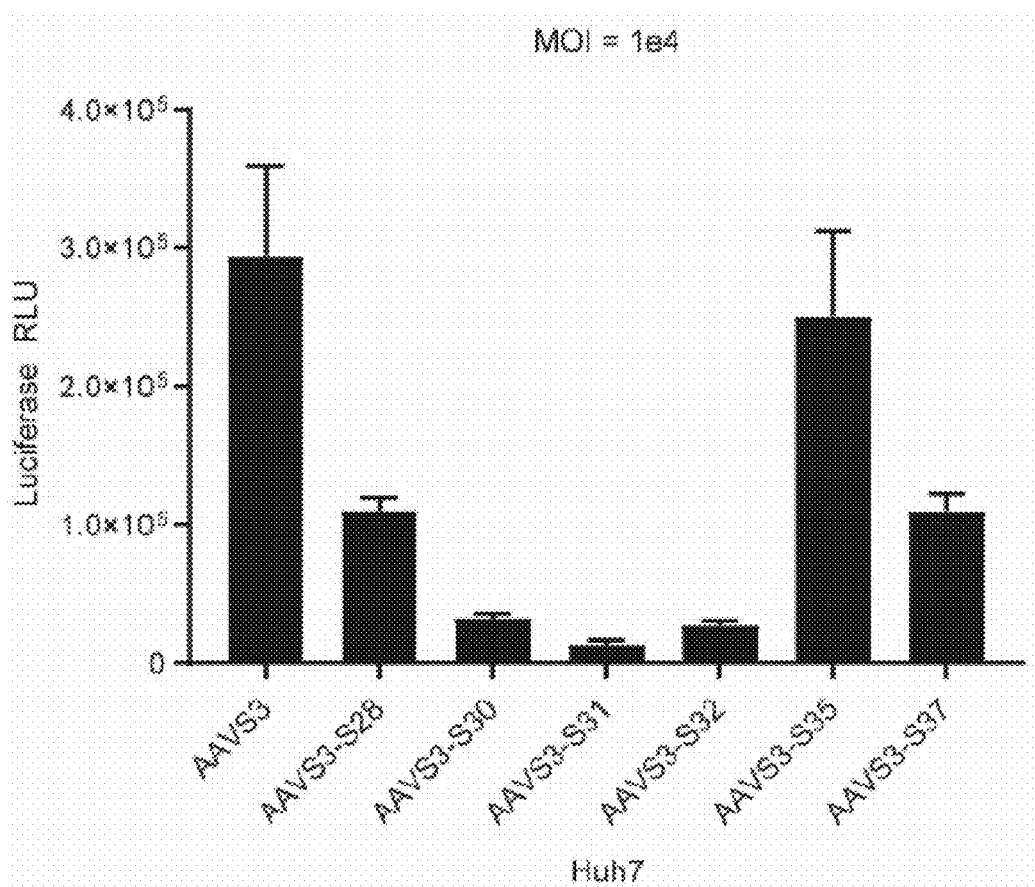
Figure 4D:
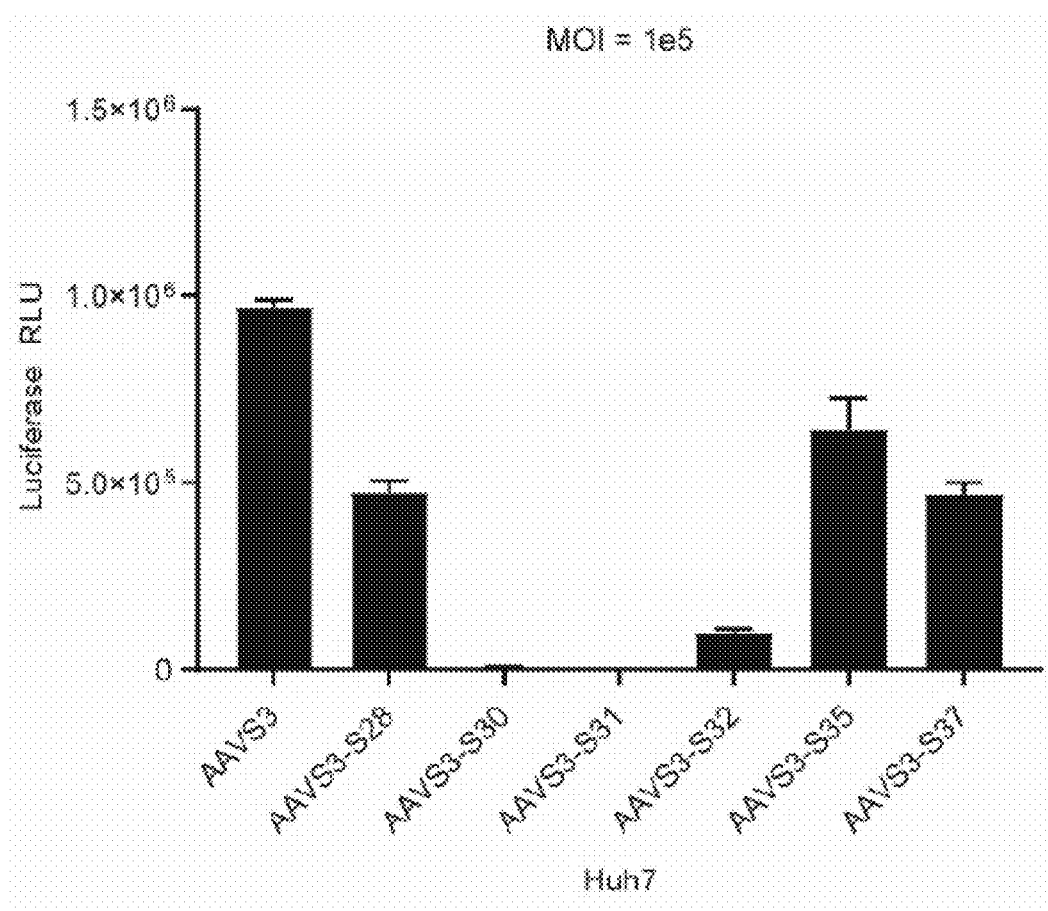
Figure 4E:
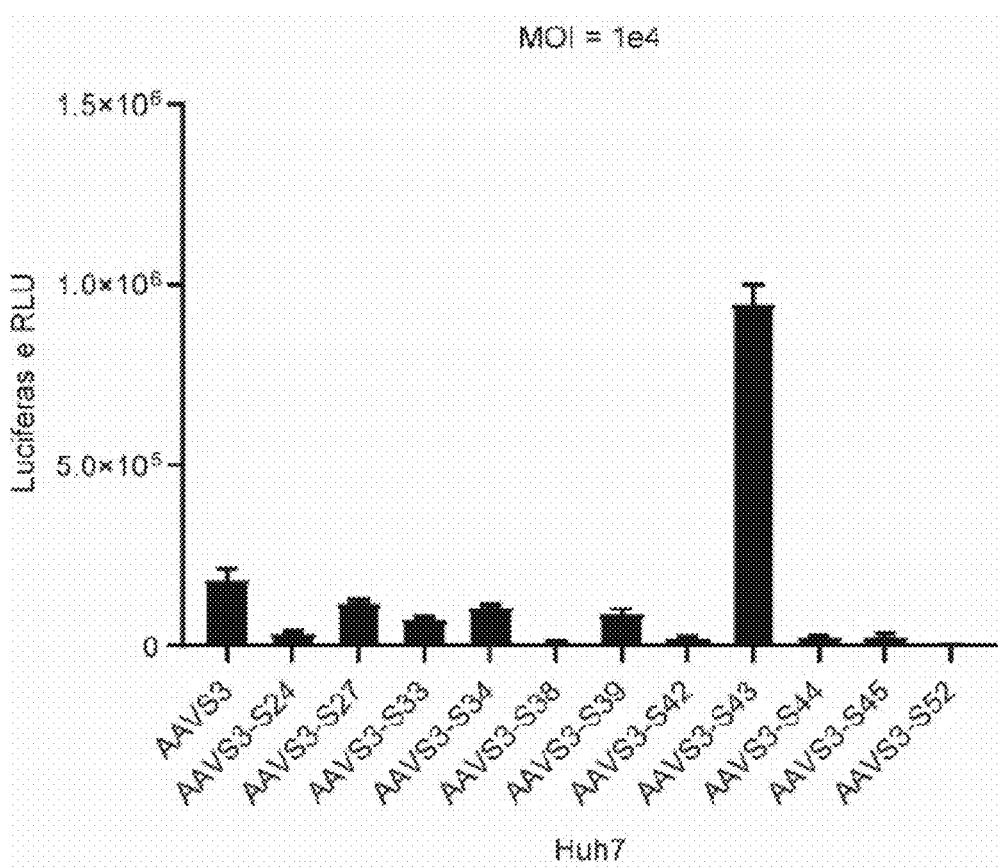
Figure 4F:
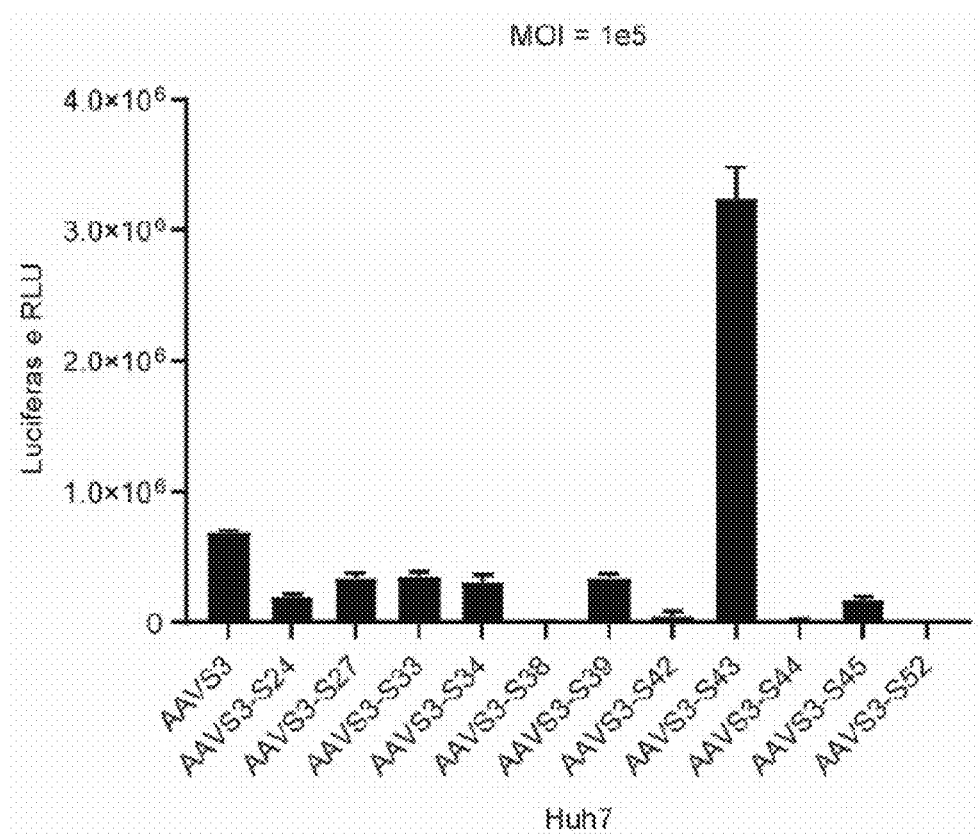
Figure 4G:
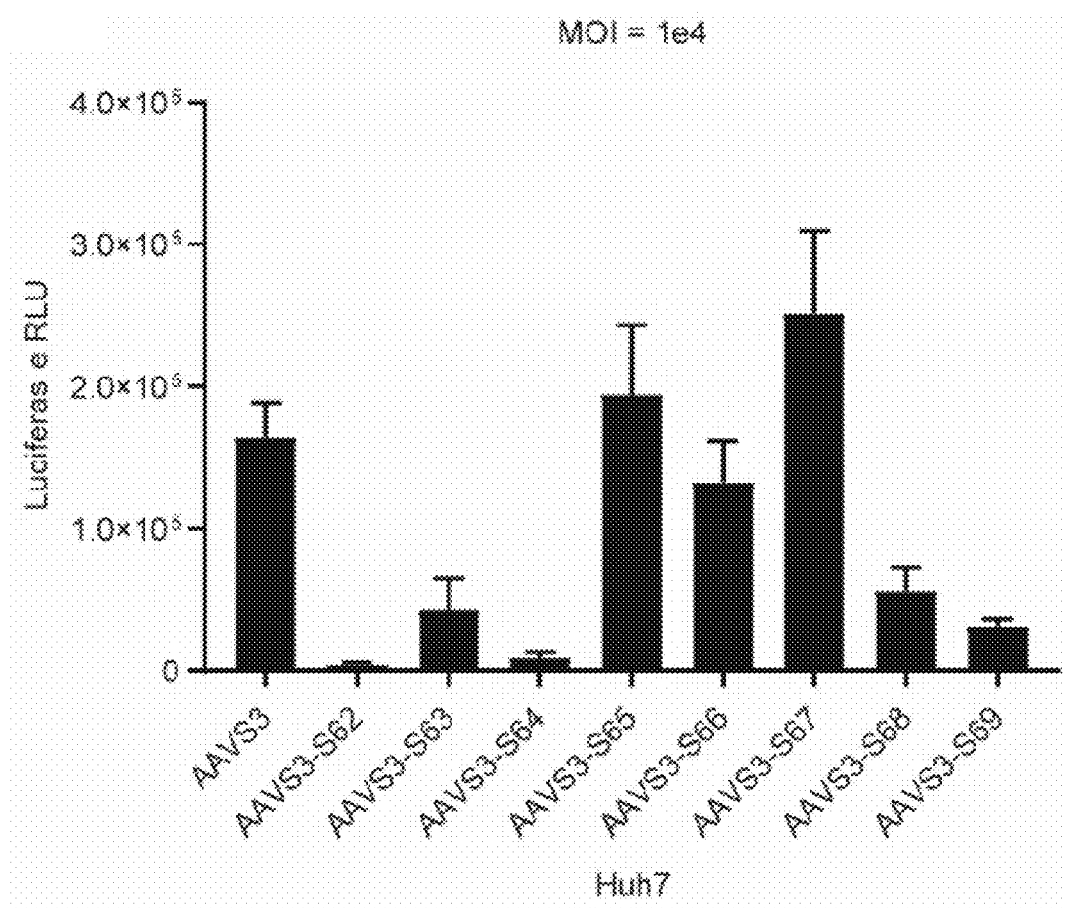
Figure 4H:
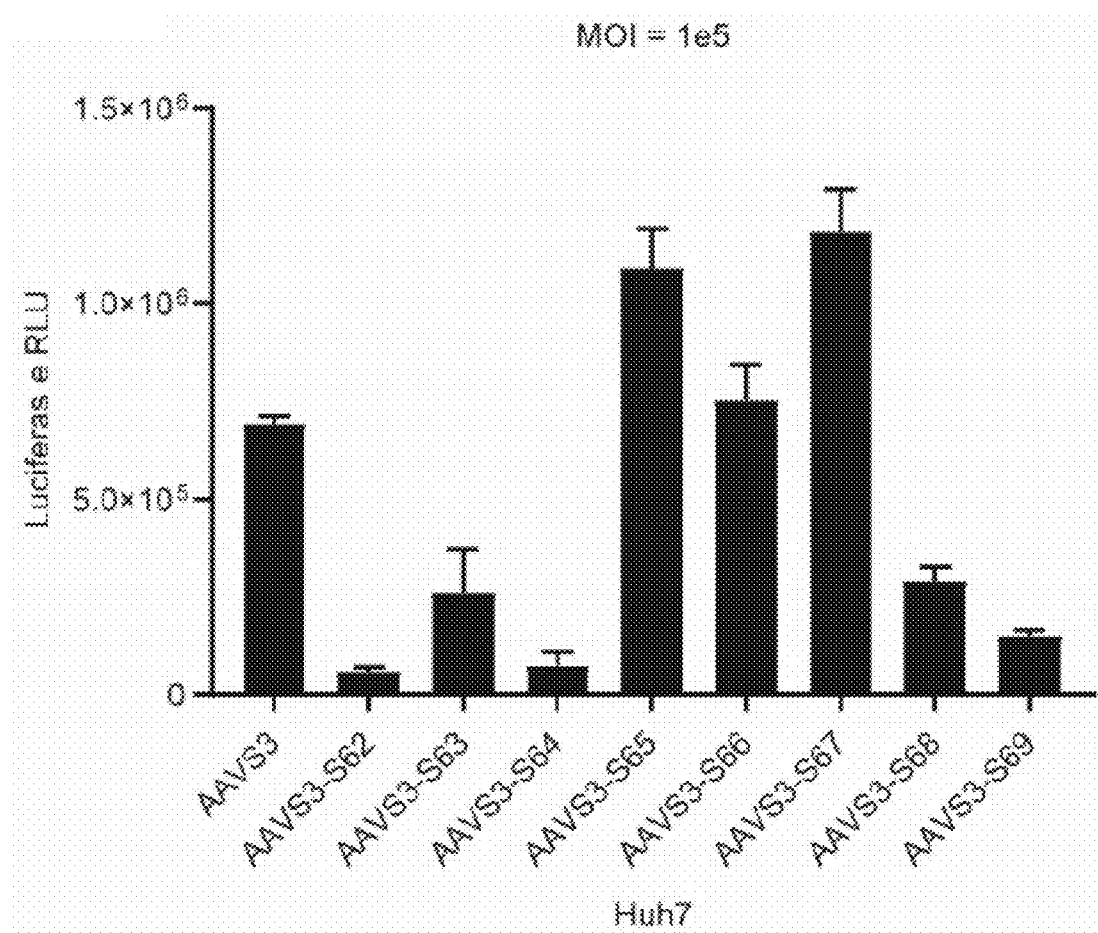
Figure 4I:
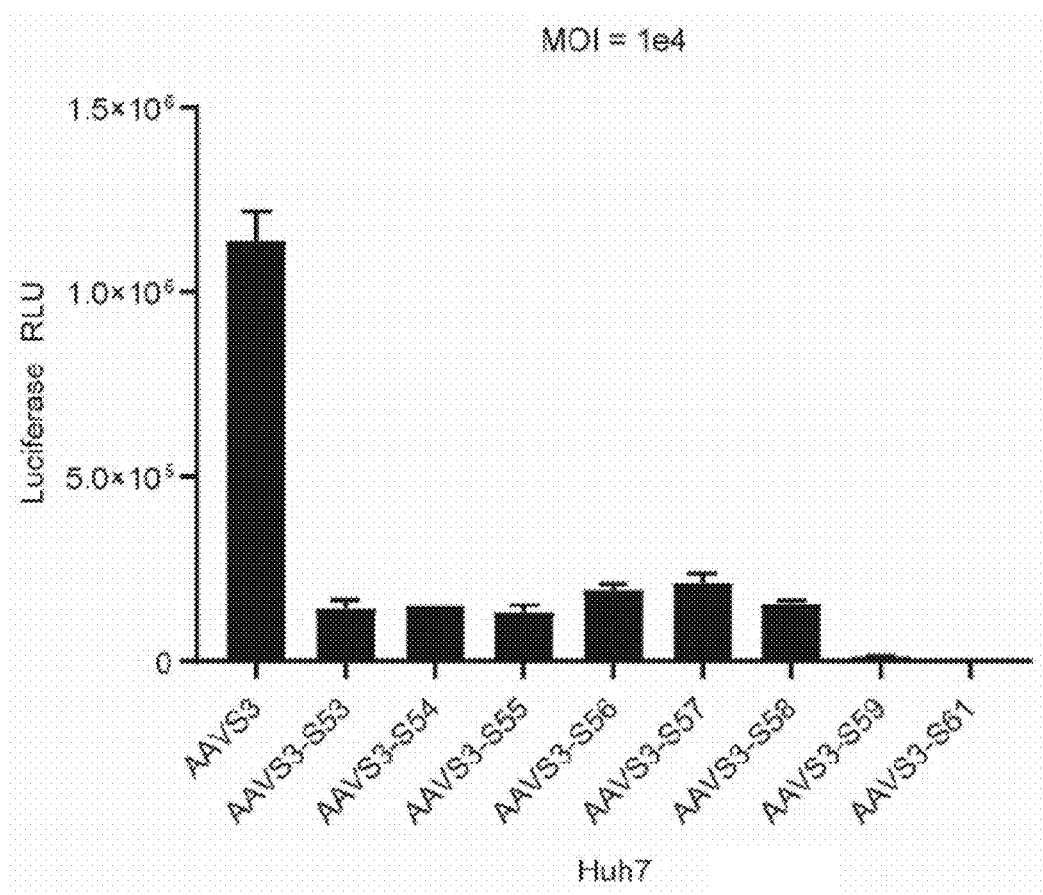
Figure 4J:
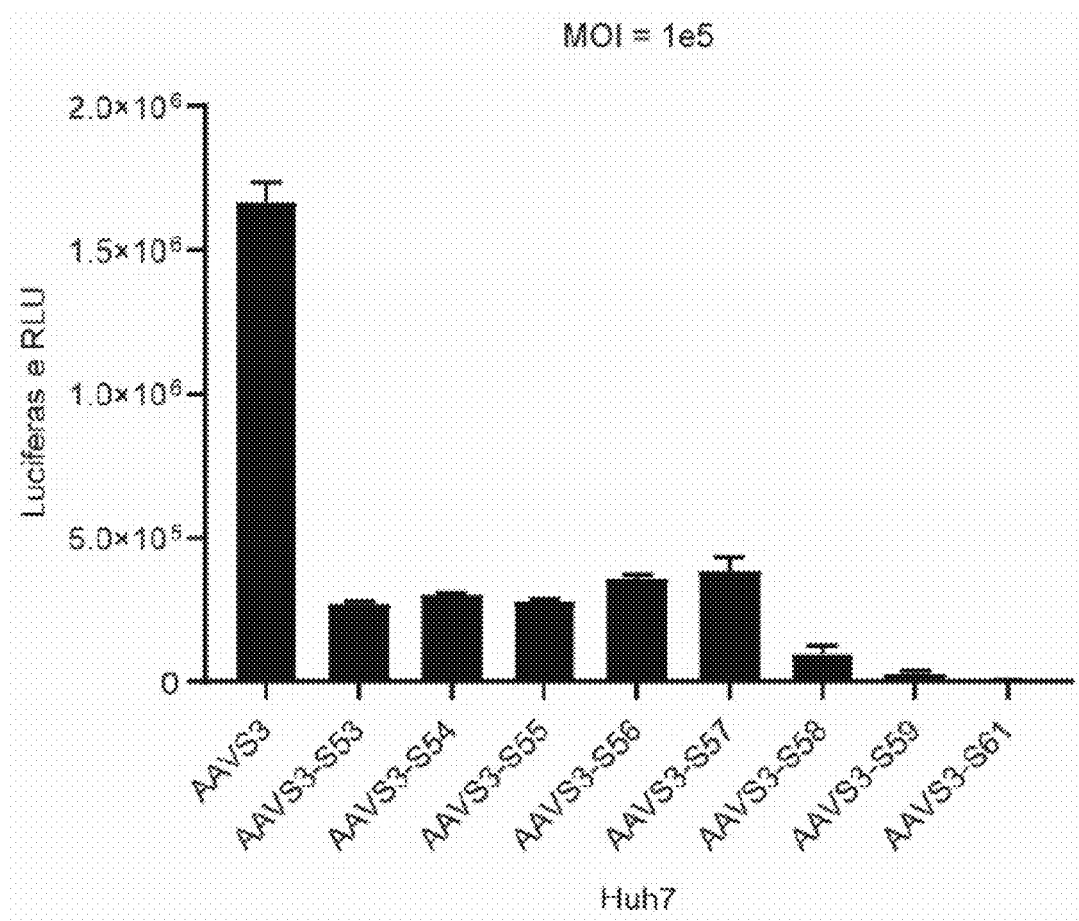
Figure 4K:
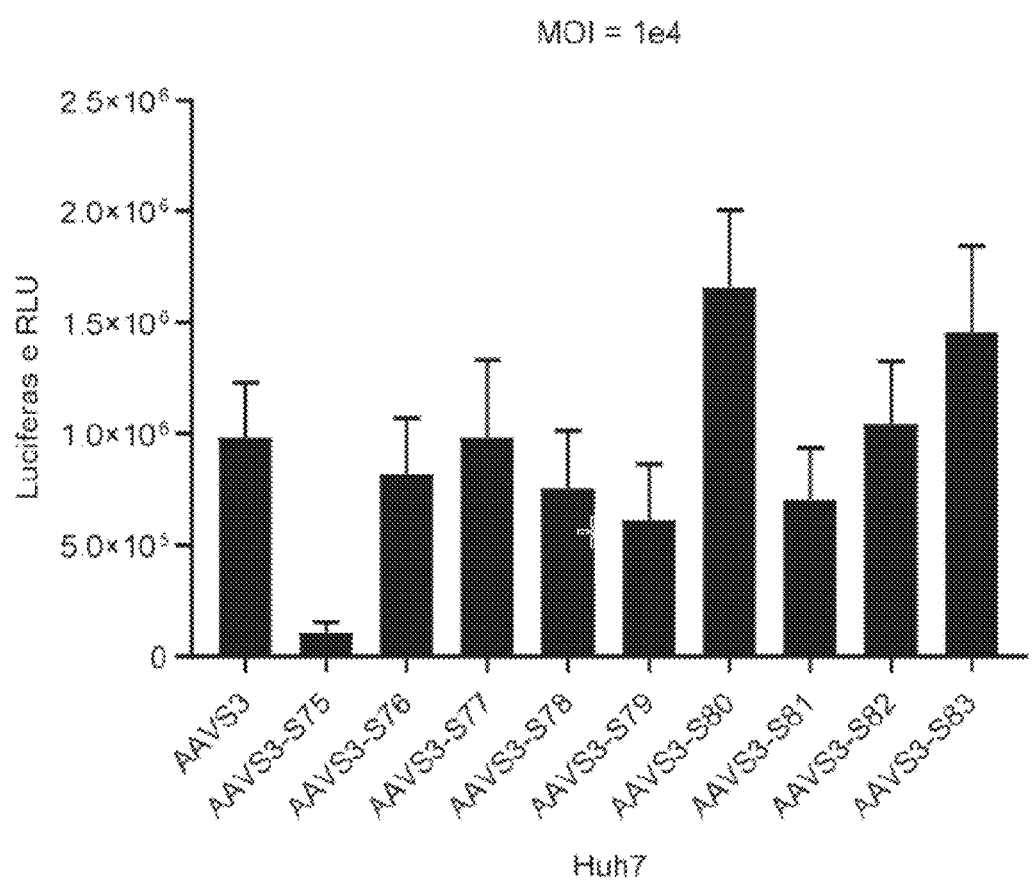
Figure 4L:
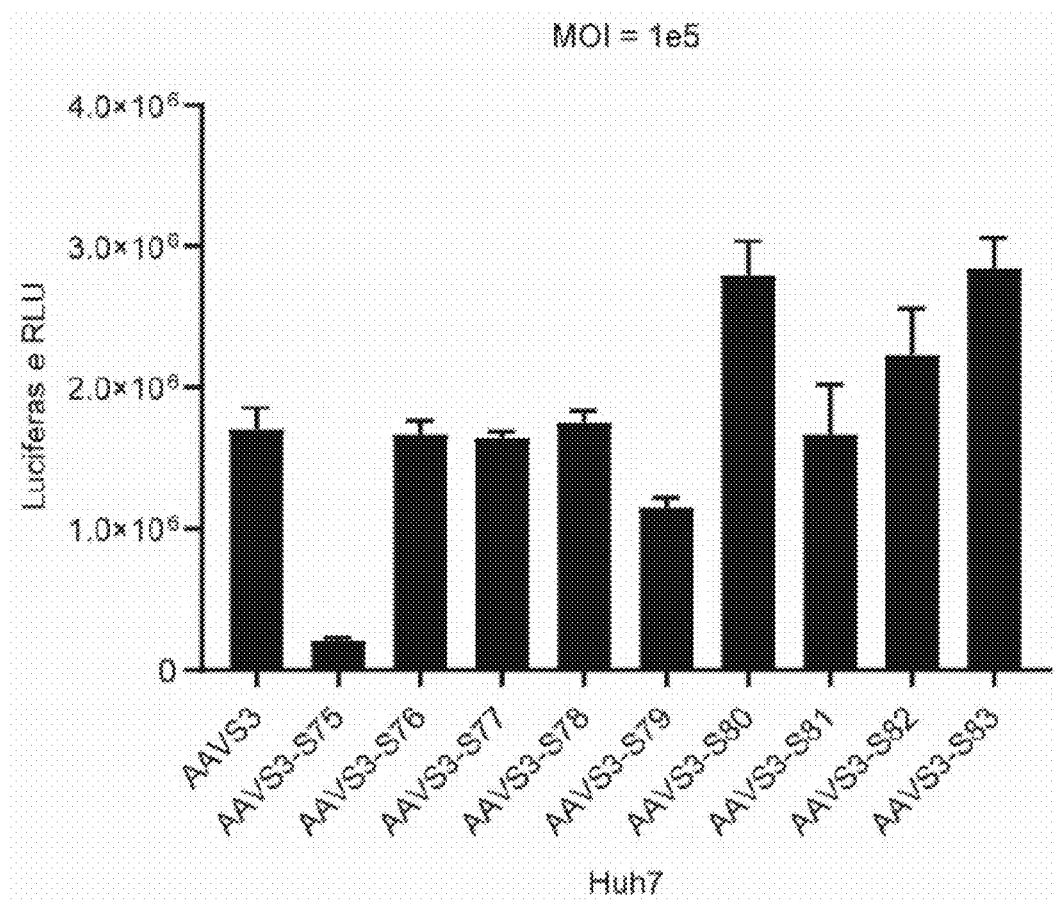
Figure 4M:
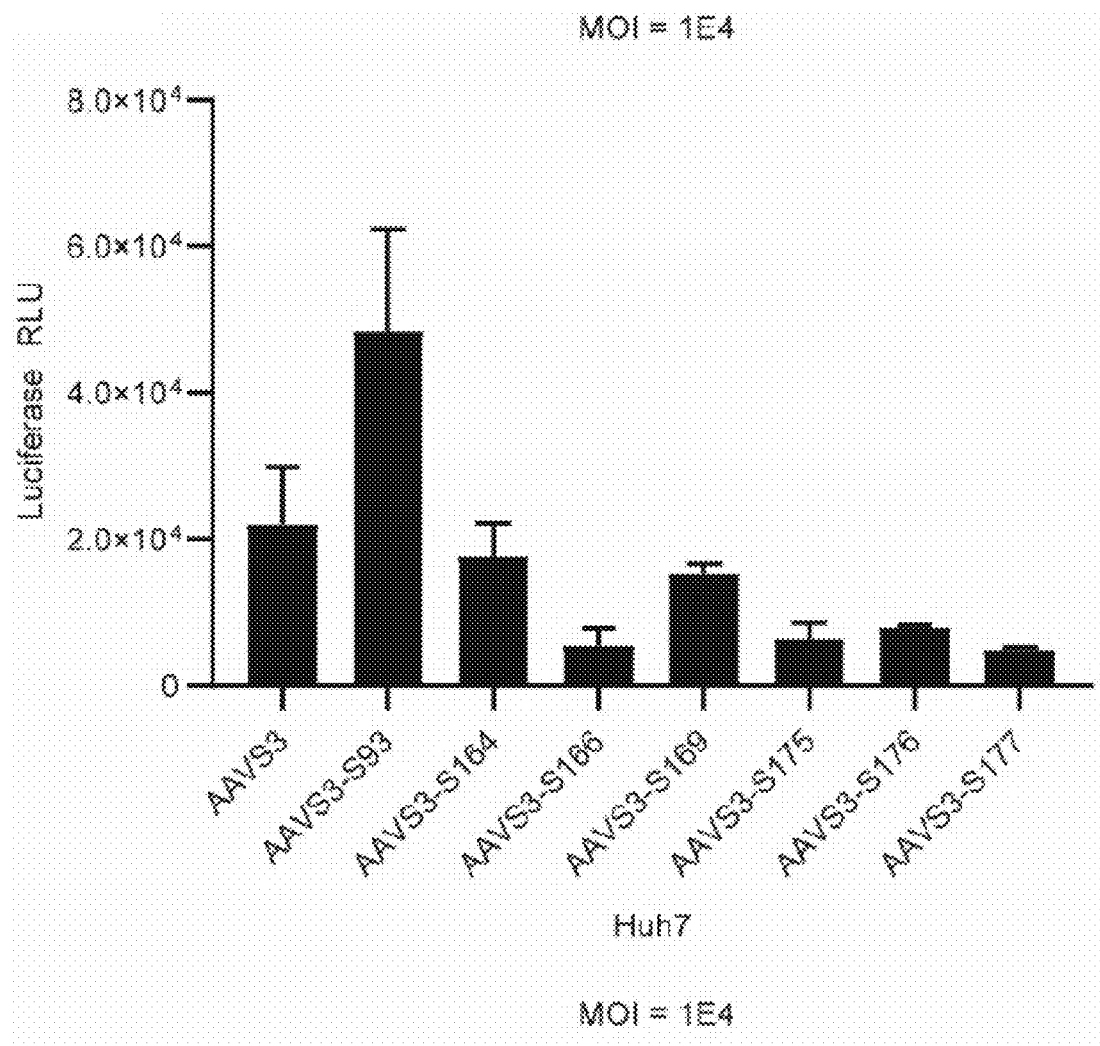
Figure 4N:
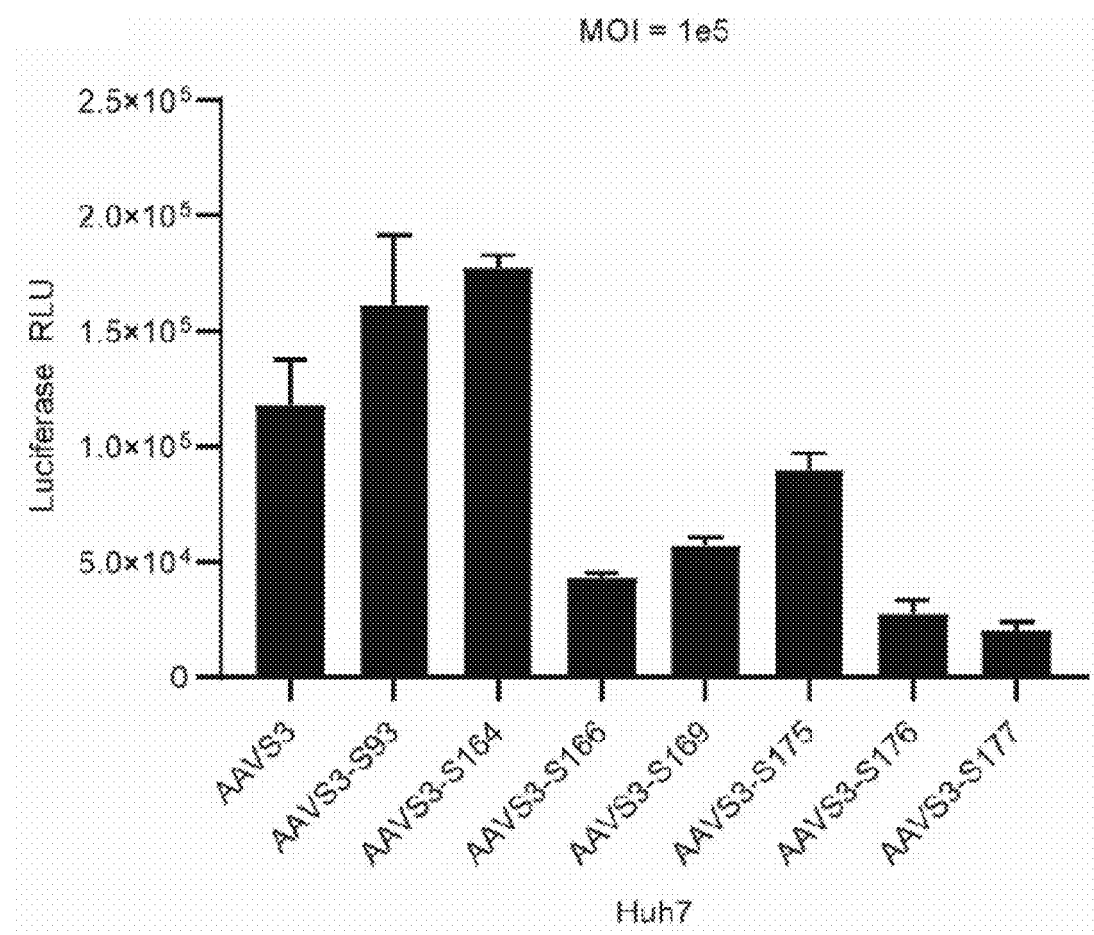
Figure 4O:
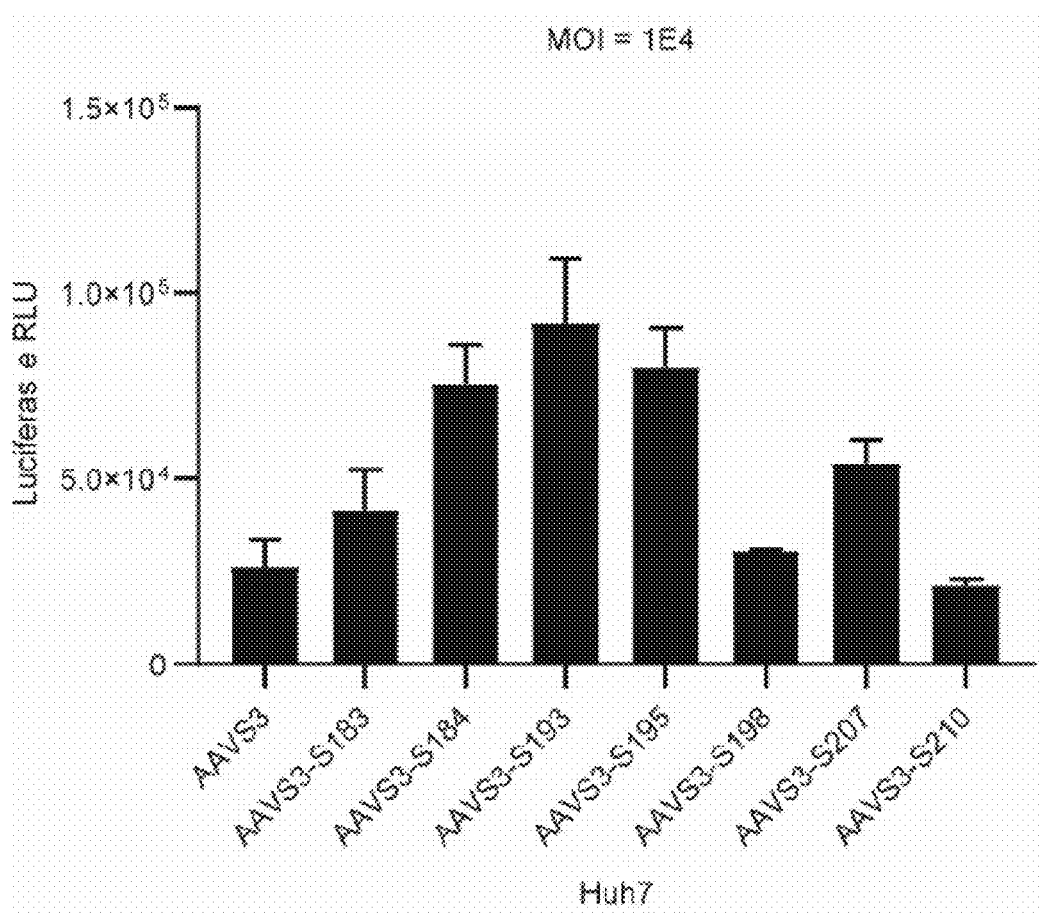
Figure 4P:
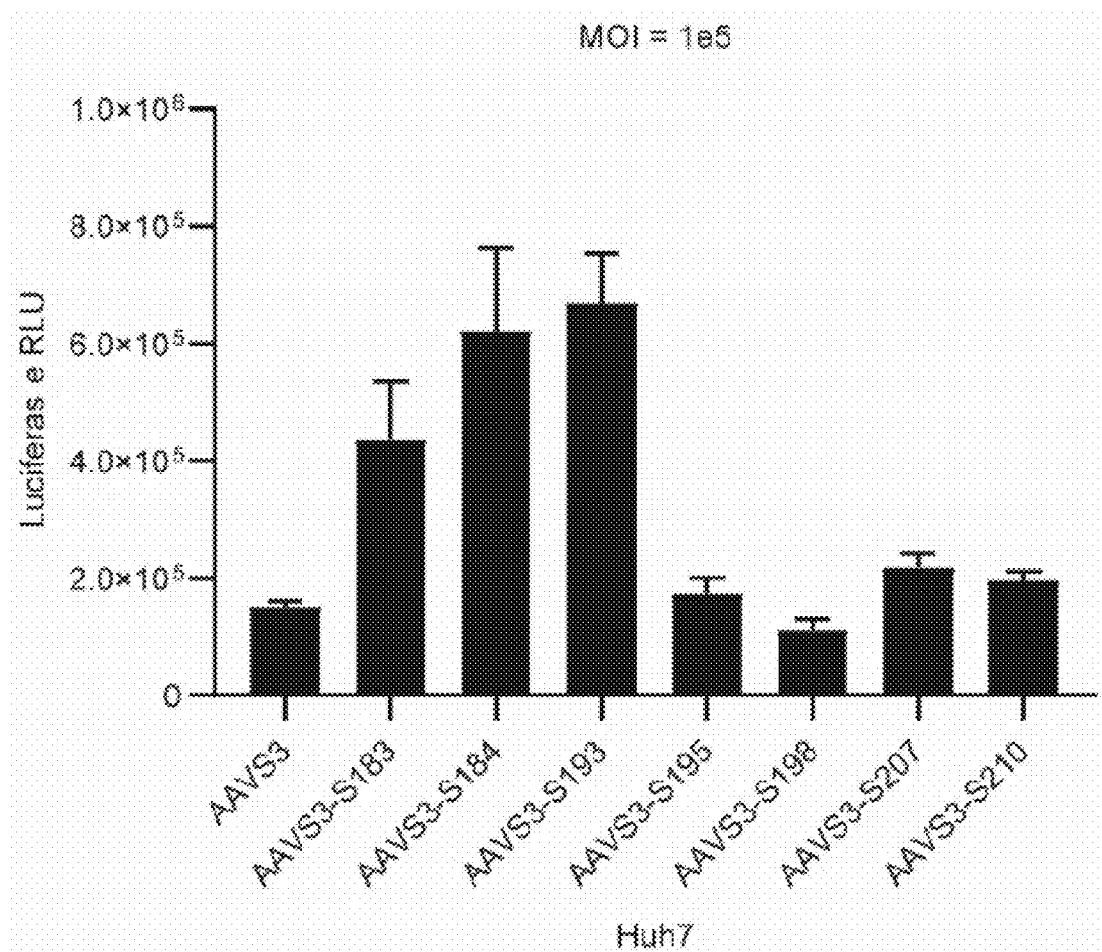
Figure 4Q:
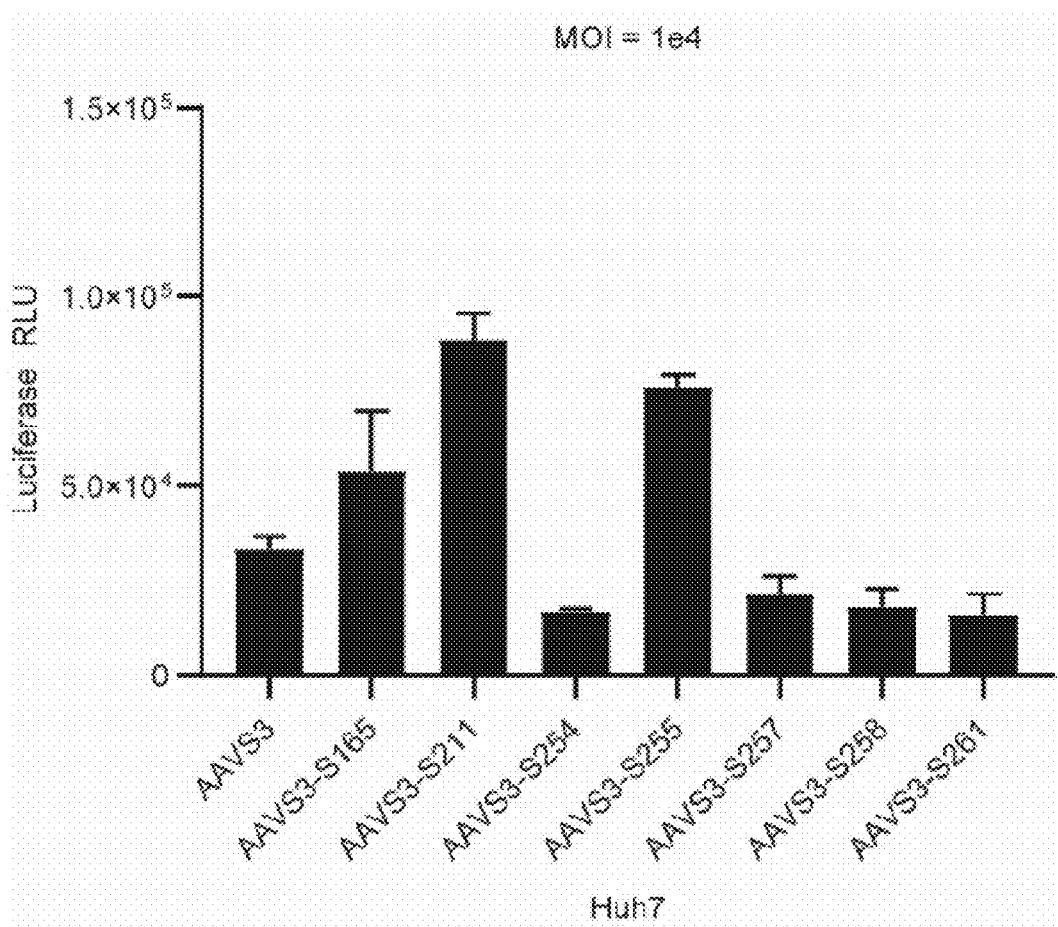
Figure 4R:
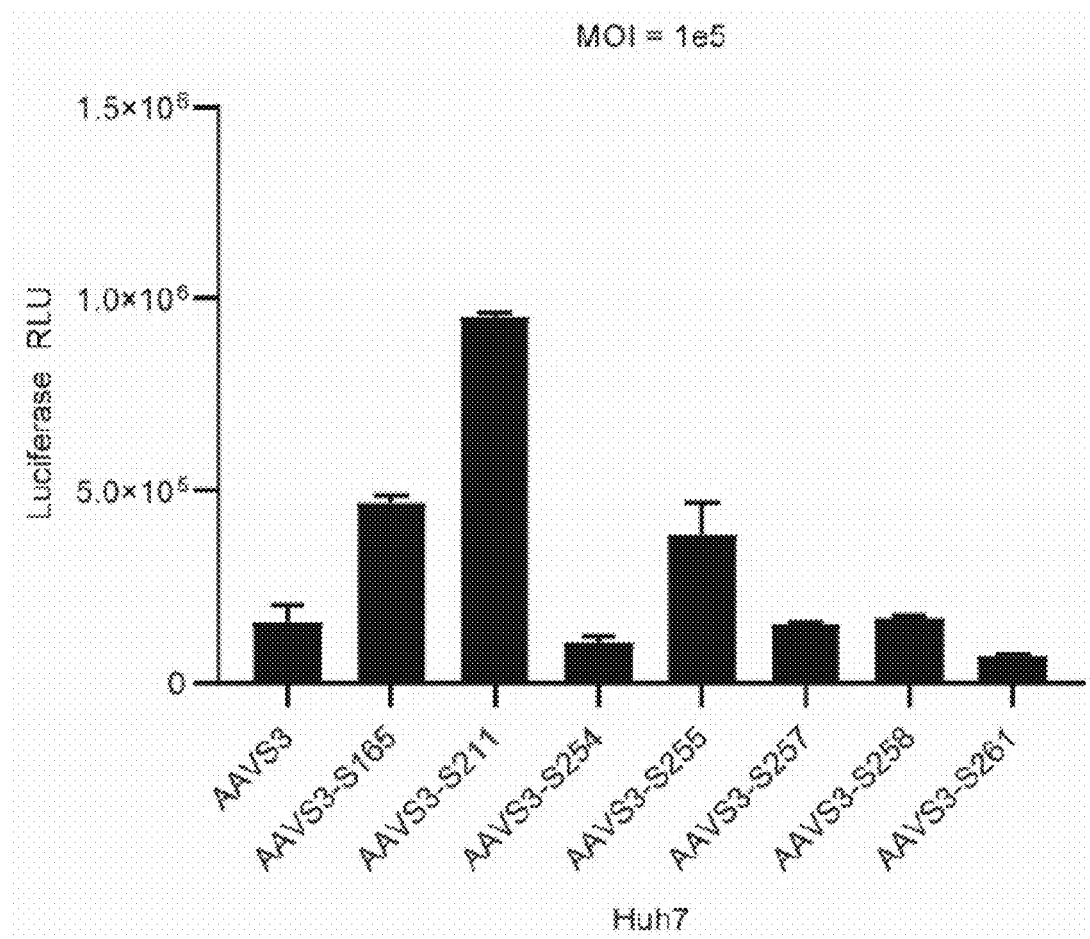
Figure 5A:
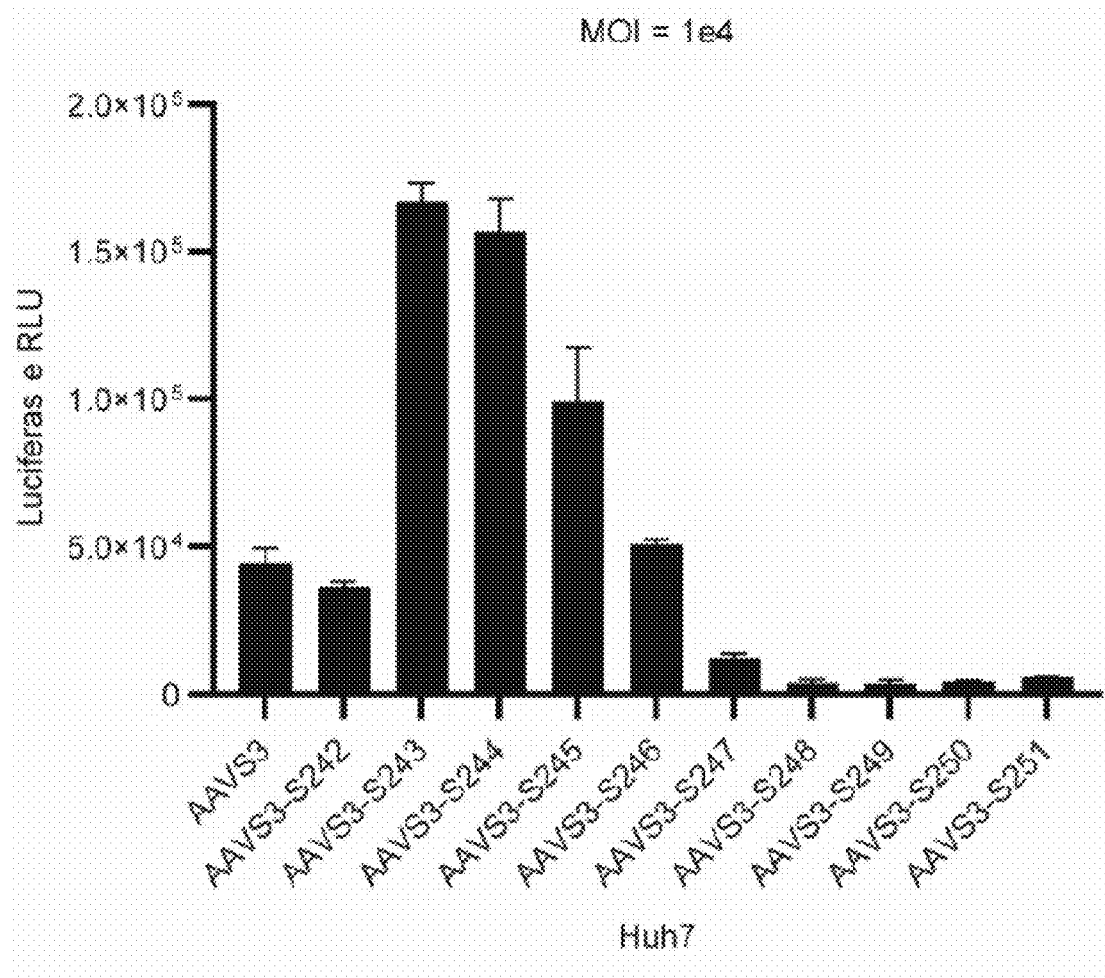
FIGS. 5A to 5D show in vitro detection of the third batch of AAVS3 mutants in Huh7 cells. (A) and (C) MOI=1E4; (B) and (D) MOI=1E5.
Figure 5B:
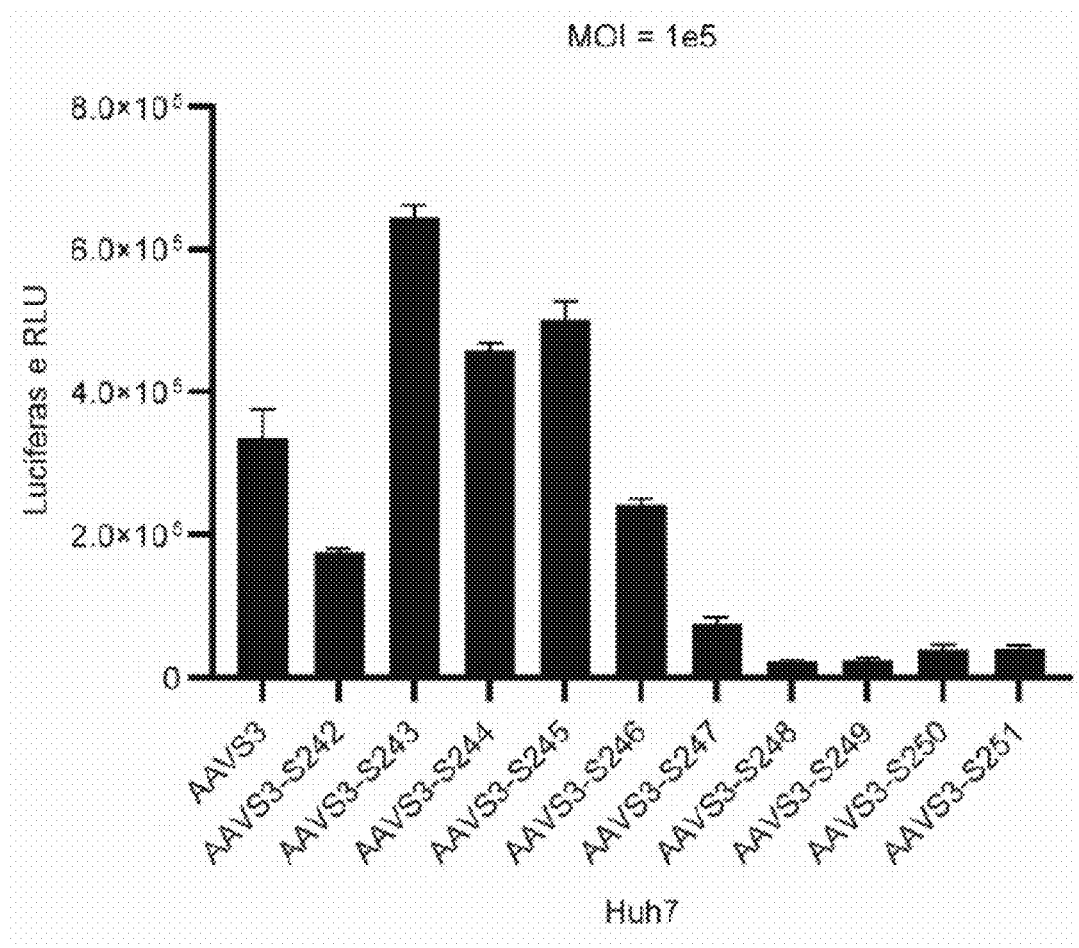
Figure 5C:
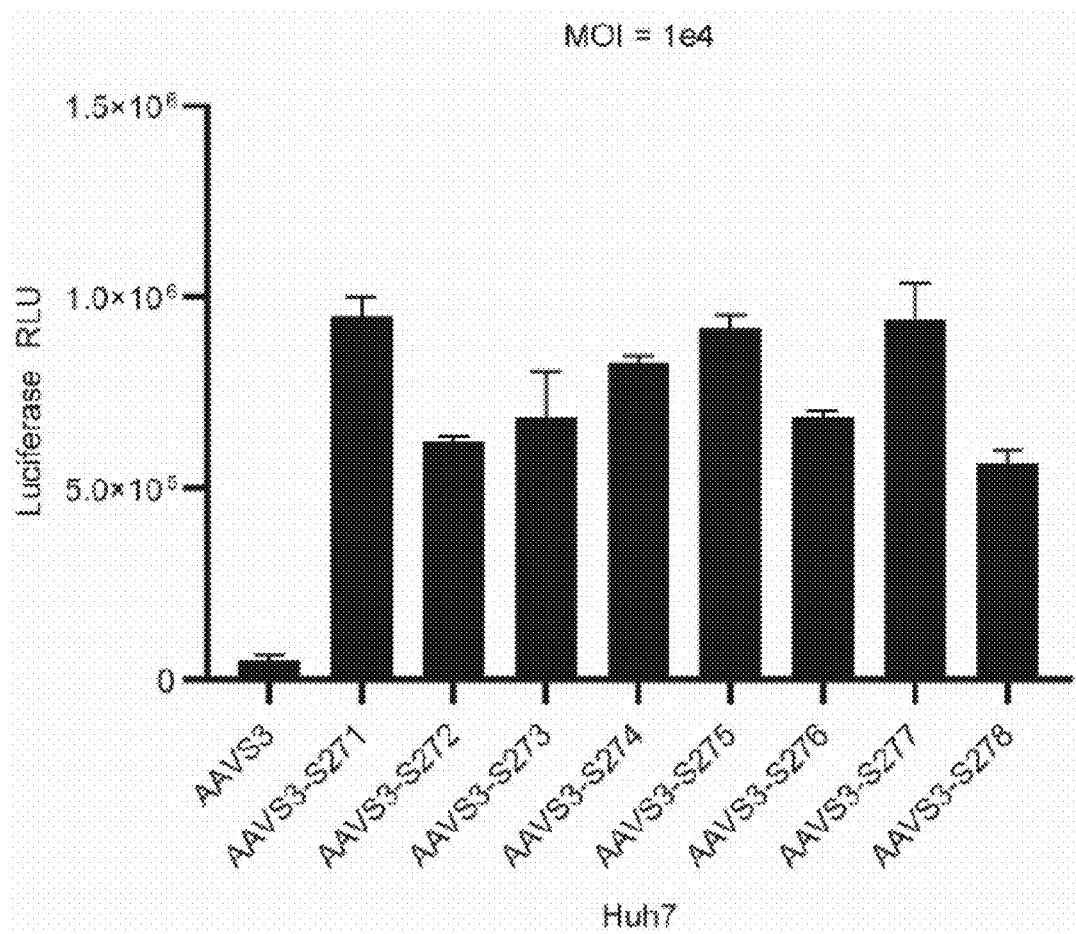
Figure 5D:
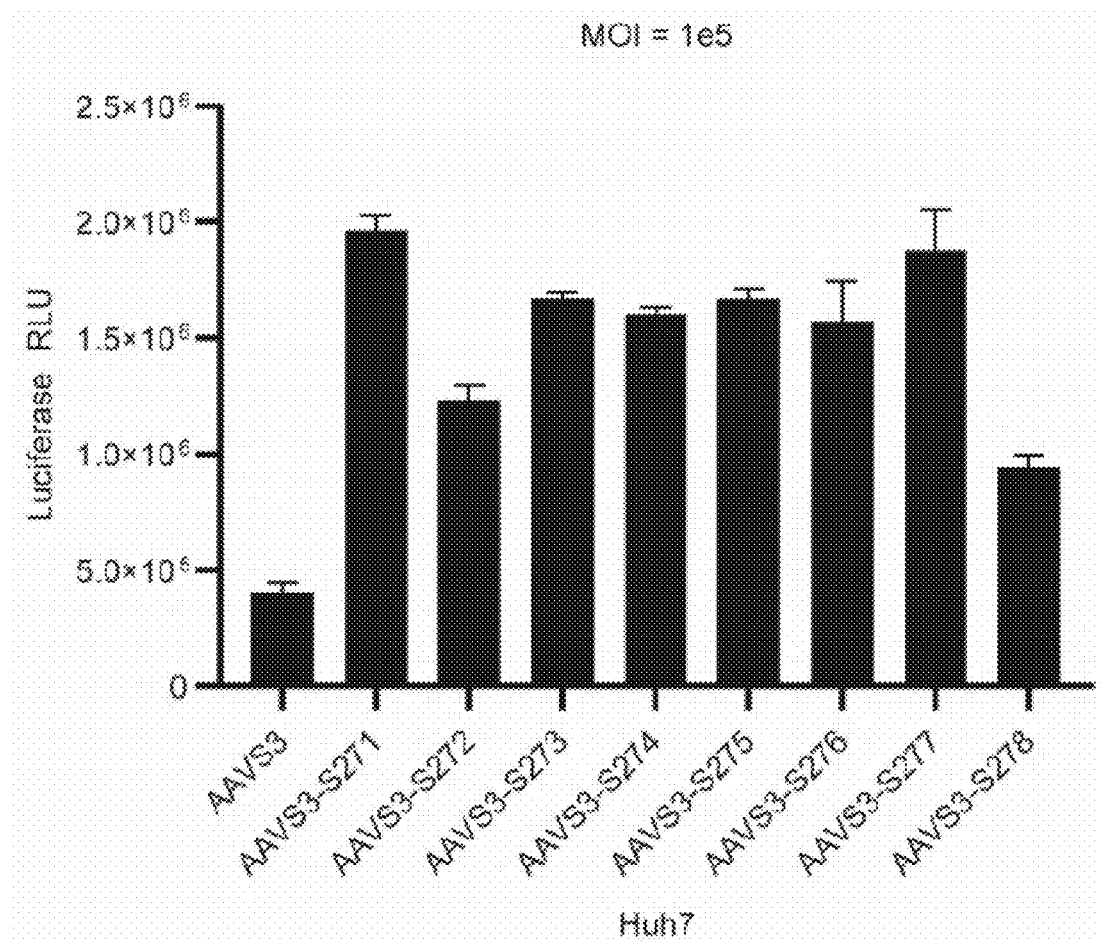

FIGS. 3-5 demonstrate that, compared with the parent AAVS3 (SEQ ID NO: 13), mutants AAVS3-1-2 (SEQ ID NO: 14), AAVS3-1-8 (SEQ ID NO: 15), AAVS3-1-14 (SEQ ID NO: 16), AAVS3-2-2 (SEQ ID NO: 17), AAVS3-S40 (SEQ ID NO: 18), AAVS3-S41 (SEQ ID NO: 19), AAVS3-S43 (SEQ ID NO: 20), AAVS3-S46 (SEQ ID NO: 21), AAVS3-S47 (SEQ ID NO: 22), AAVS3-S48 (SEQ ID NO: 23), AAVS3-S51 (SEQ ID NO: 24), AAVS3-S65 (SEQ ID NO: 25), AAVS3-S67 (SEQ ID NO: 26), AAVS3-S80 (SEQ ID NO: 27), AAVS3-S83 (SEQ ID NO: 28), AAVS3-S93 (SEQ ID NO: 29), AAVS3-S183 (SEQ ID NO: 30), AAVS3-S184 (SEQ ID NO: 31), AAVS3-S193 (SEQ ID NO: 32), AAVS3-S207 (SEQ ID NO: 33), AAVS3-S165 (SEQ ID NO: 34), AAVS3-S211 (SEQ ID NO: 35), AAVS3-S255 (SEQ ID NO: 36), AAVS3-S243 (SEQ ID NO: 37), AAVS3-S244 (SEQ ID NO: 38), AAVS3-S245 (SEQ ID NO: 39), AAVS3-S271 (SEQ ID NO: 40), AAVS3-S272 (SEQ ID NO: 41), AAVS3-S273 (SEQ ID NO: 42), AAVS3-S274 (SEQ ID NO: 43), AAVS3-S275 (SEQ ID NO: 44), AAVS3-S276 (SEQ ID NO: 45), AAVS3-S277 (SEQ ID NO: 46), and AAVS3-S278 (SEQ ID NO: 47) achieved stronger exogenous gene expression.

Example 7: Evaluation of Infection Efficiency in Additional Human Liver Cell Lines According to the results in Huh7 cells in Example 6, 5 candidate mutants from AAV8 mutagenesis (AAV8-1-2, AAV8-1-7, AAV8-1-15, AAV8-2-1, AAV8-3-9) and 4 candidate mutants from AAVS3 mutagenesis (AAVS3-1-2, AAVS3-1-8, AAVS3-1-14, AAVS3-2-2) were further evaluated in follow-up experiments. These 9 candidate viruses were validated in additional human liver cell lines to confirm their improved liver tissue tropism. HepG2 (ATCC, HB-8065) and Huh7 (Procell, CL-0120) cell lines were used for the confirmation. The infection detection method was the same as that for Huh7 cells, as described in Example 6. The detection results are showed in FIG. 6, wherein * represents P<=0.05,  represents P<=0.01, * represents P<=0.001 and **** represents P<=0.0001.

Figure 6A:
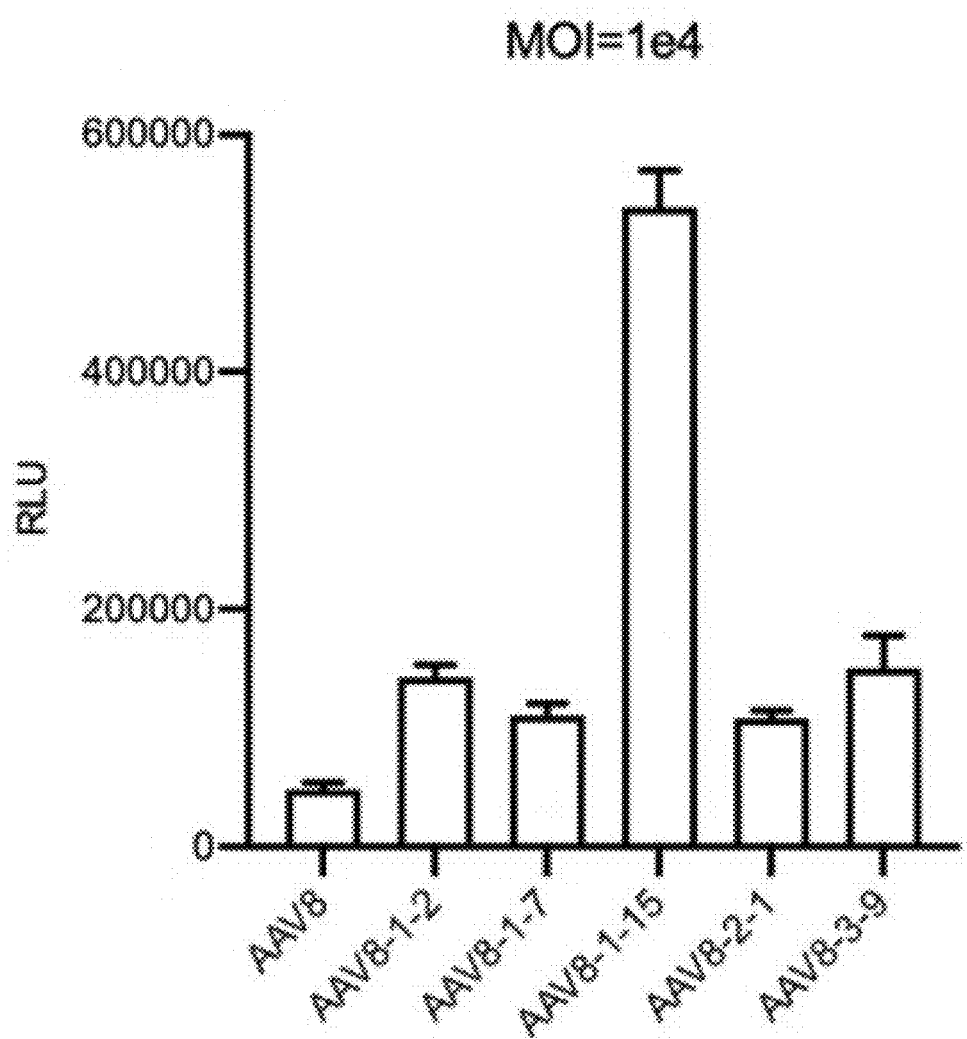
FIGS. 6A-6H show in vitro infection detection of AAV8 and AAVS3 mutants in multiple liver cell lines. (A) Detection of AAV8 mutants in Huh7 cells; (B) Detection of AAV8 mutants in HepG2 cells; (C) Detection of AAVS3 mutants in Huh7 cells; and (D) Detection of AAVS3 mutants in HepG2 cells. Left: MOI=1E4, right: MOI=1E5.
Figure 6B:
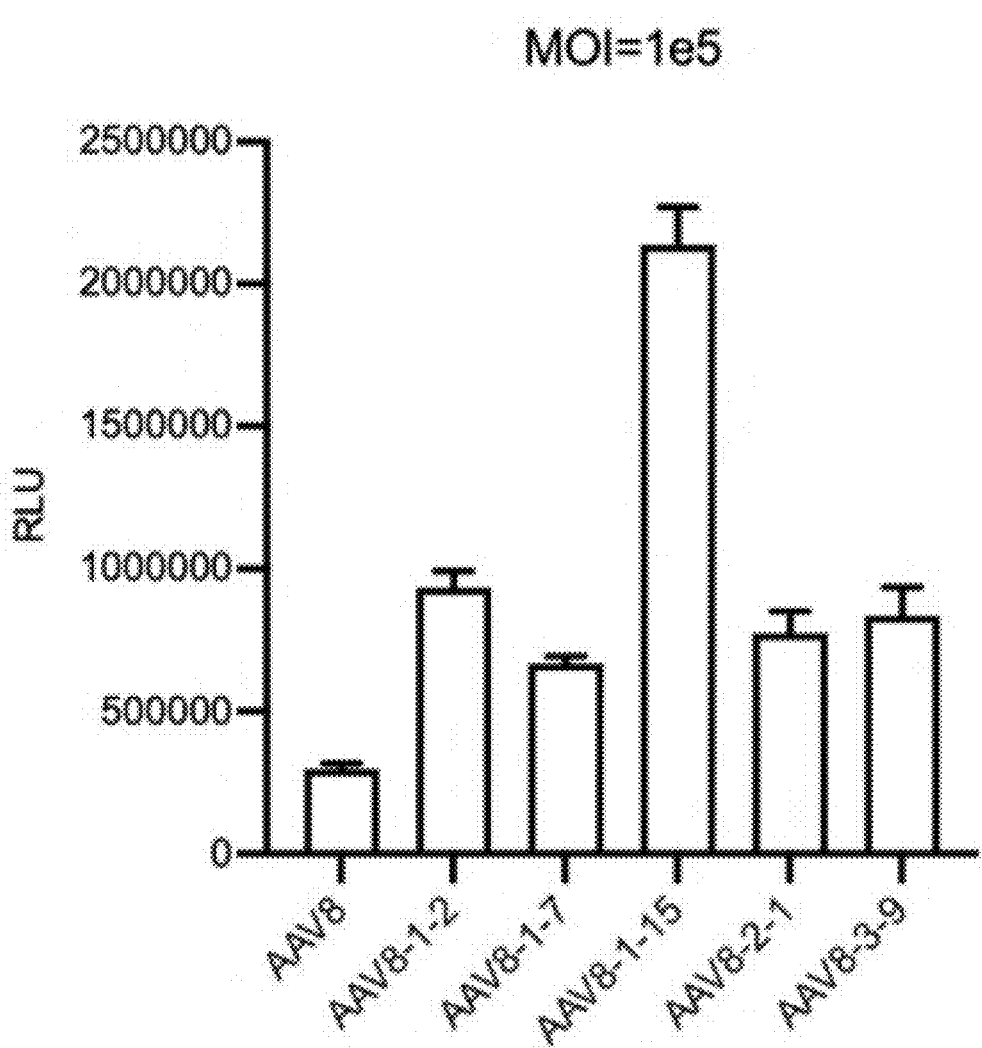
Figure 6C:
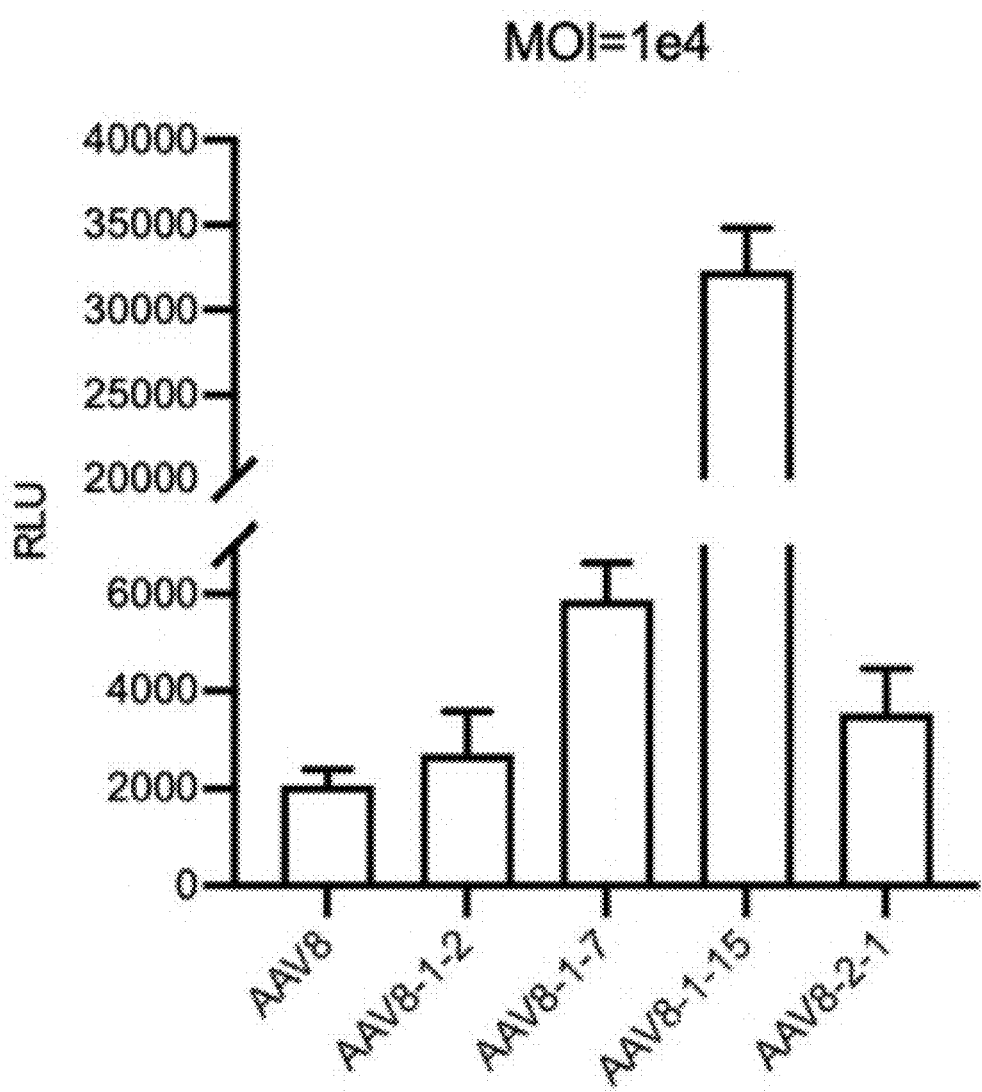
Figure 6D:
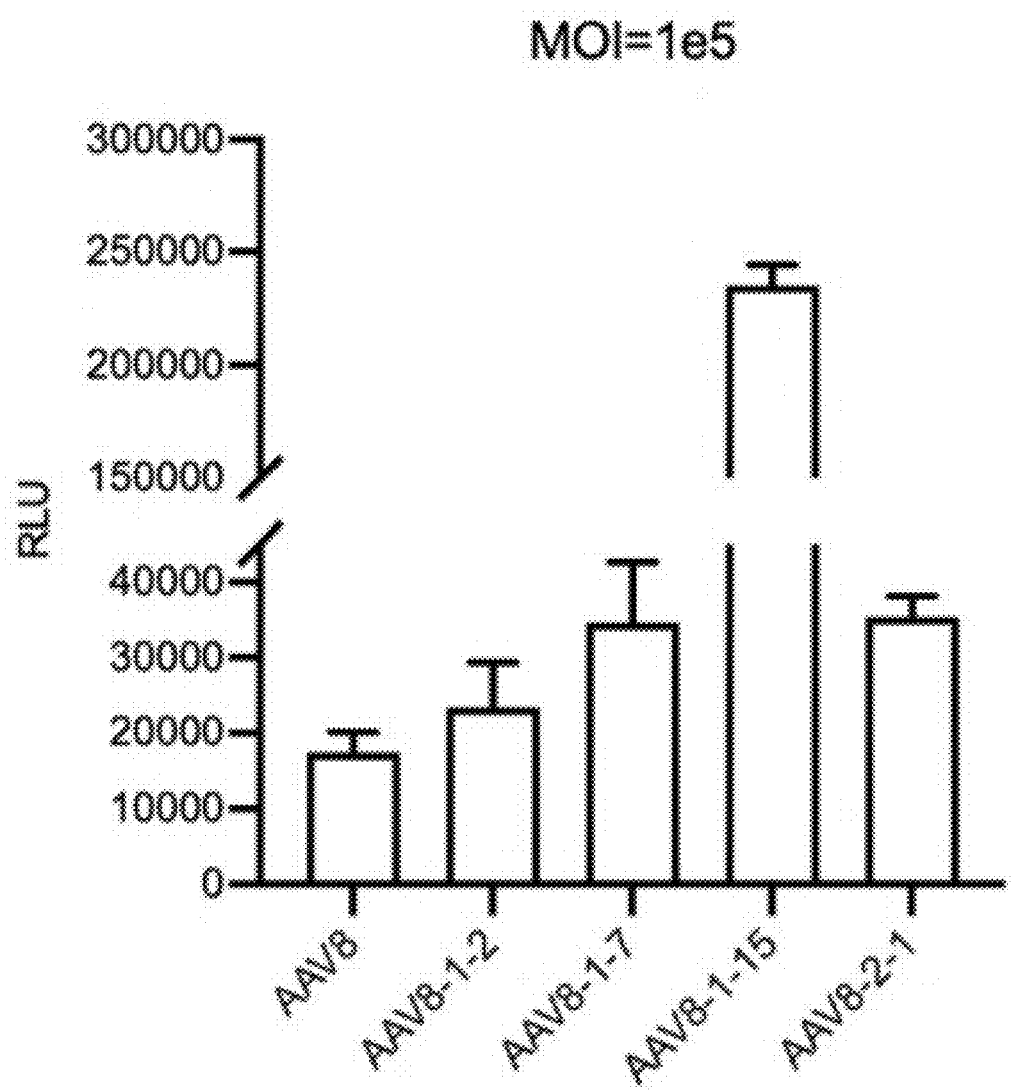
Figure 6E:
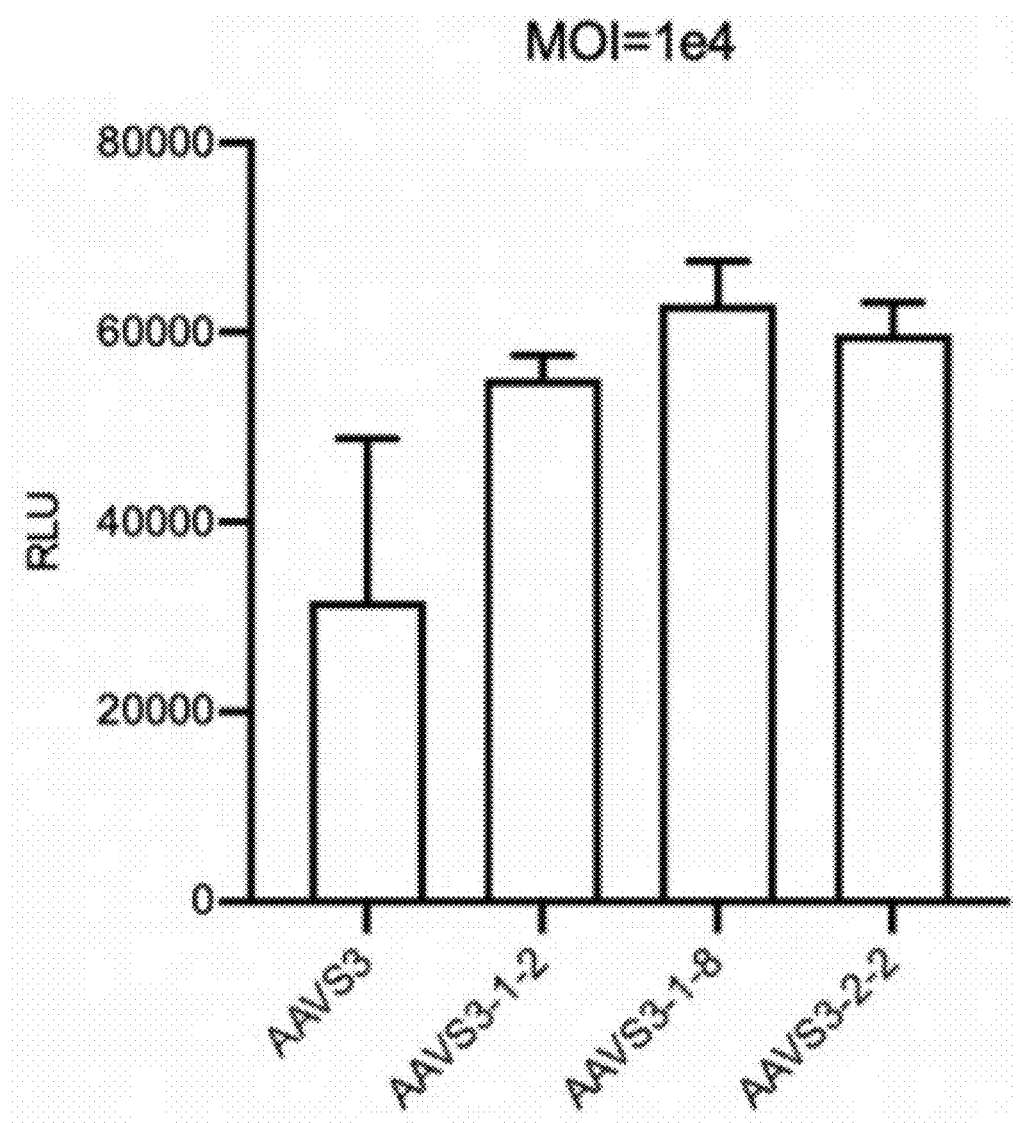
Figure 6F:
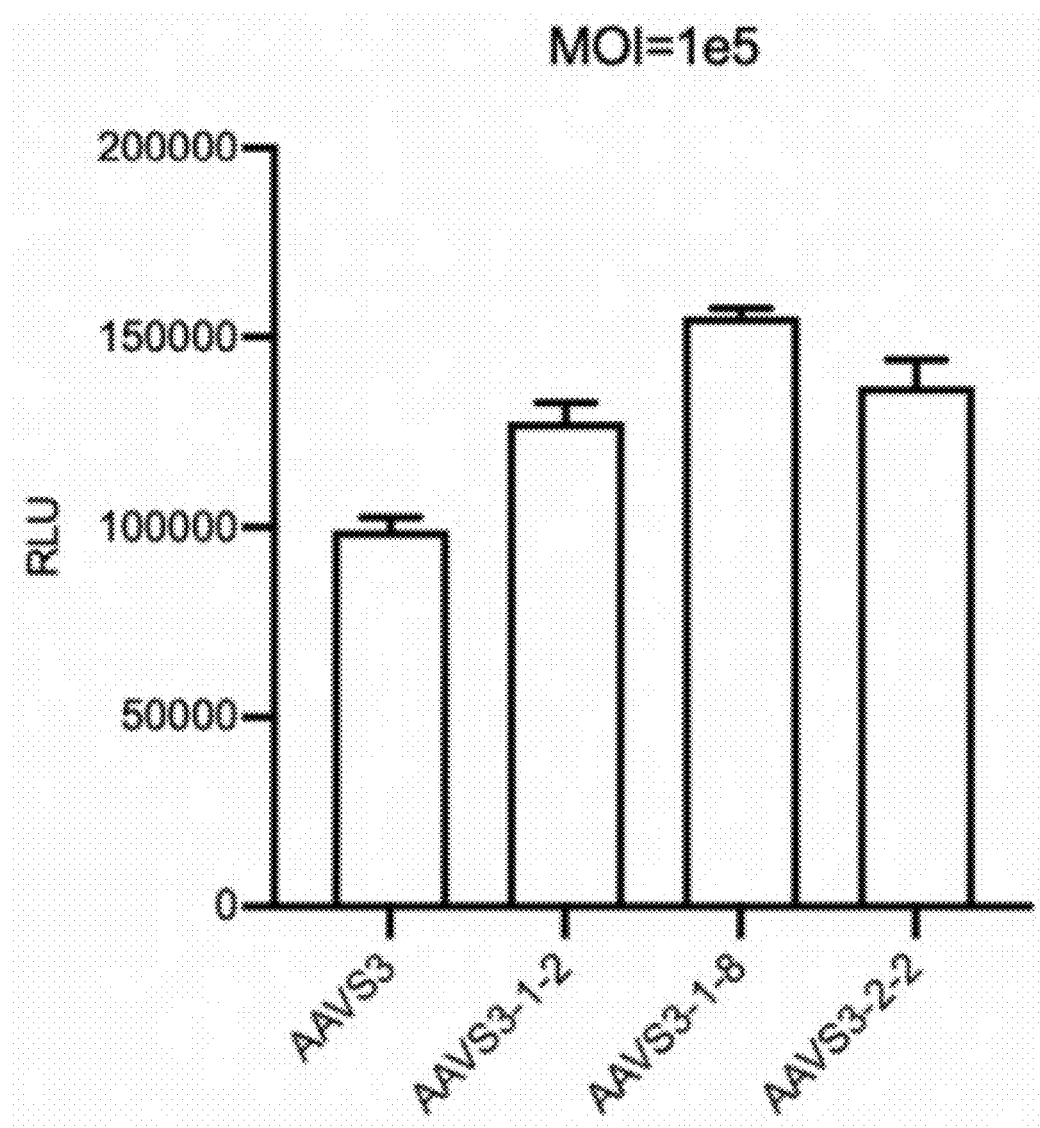
Figure 6G:
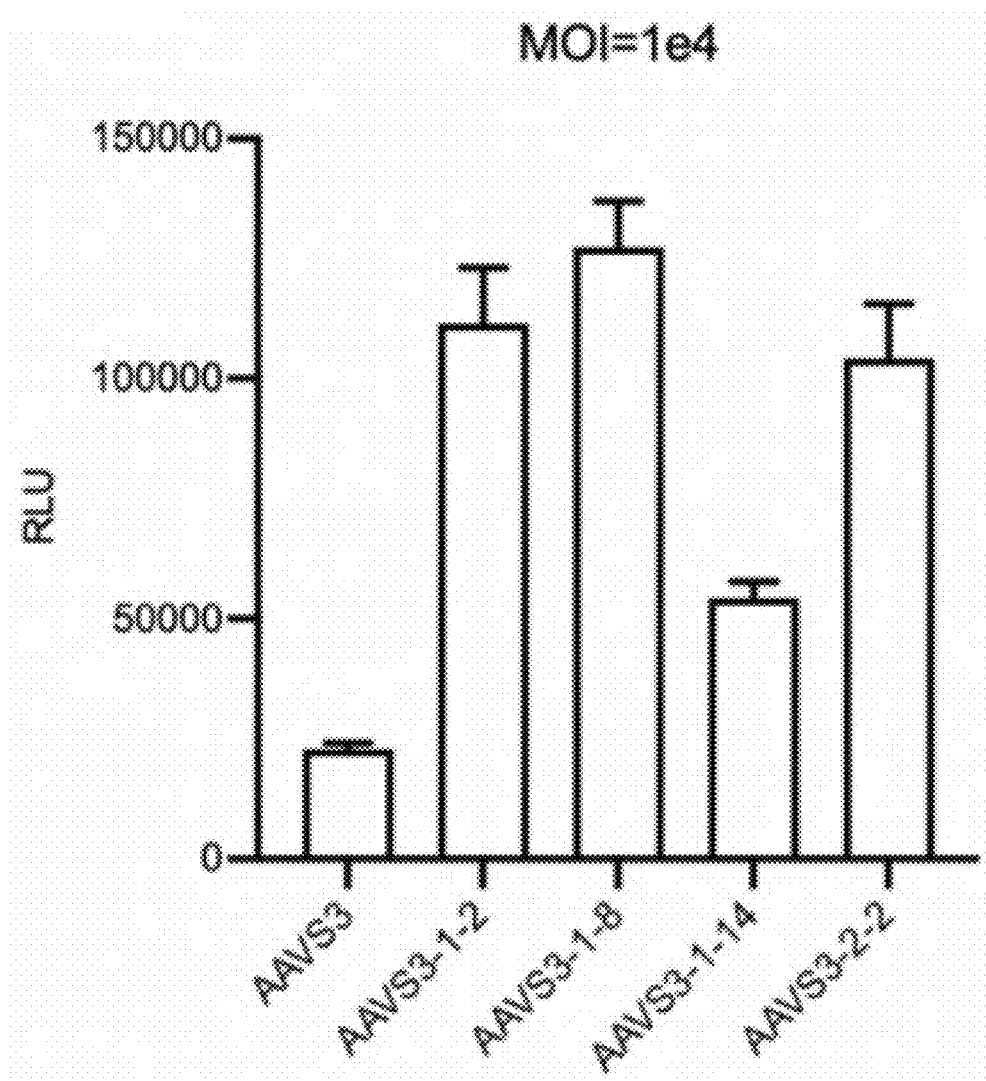
Figure 6H:
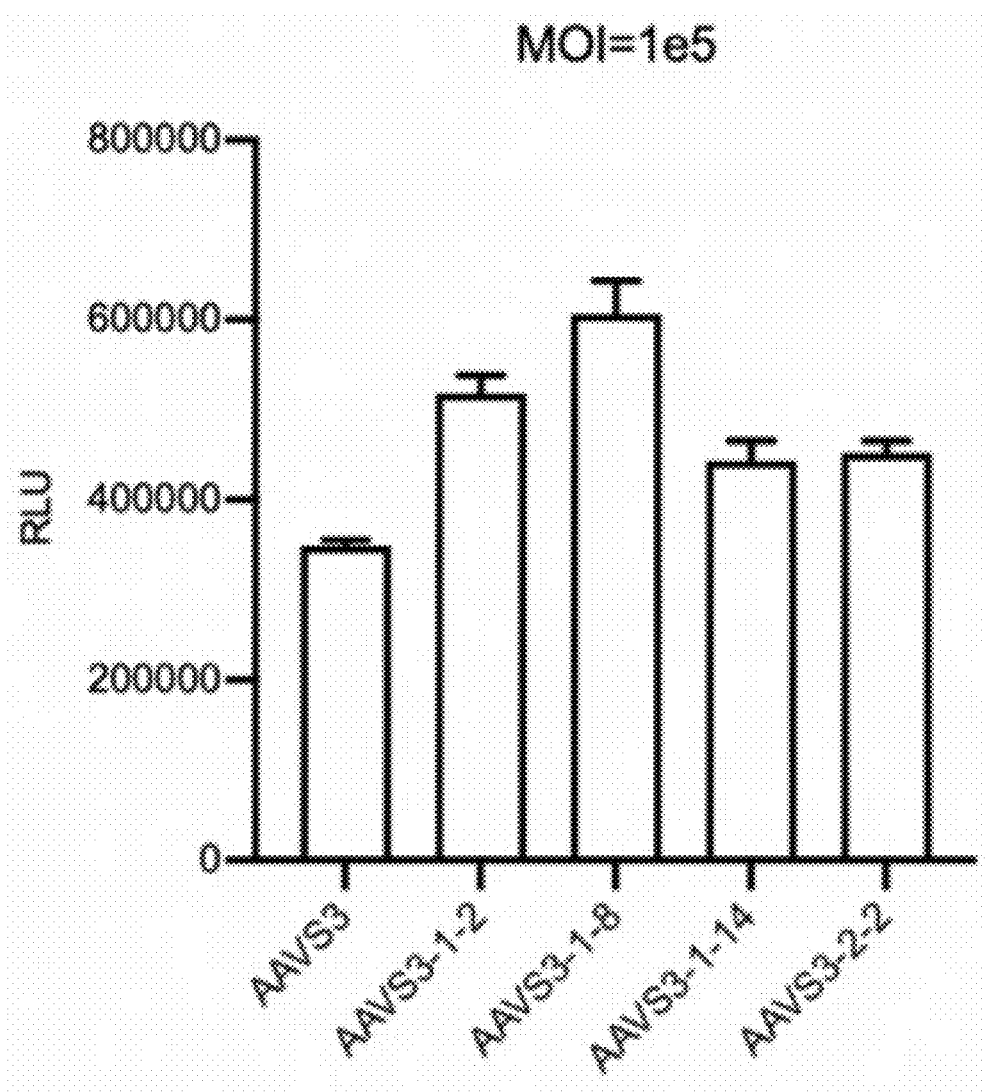

FIG. 6A demonstrates that, compared with the parent AAV8, mutants AAV8-1-2, AAV8-1-7, AAV8-1-15, AAV8-2-1, and AAV8-3-9 infected the Huh7 human liver cells more effectively, and achieved stronger exogenous gene expression. FIG. 6B demonstrates that, compared with the parent AAV8, mutants AAV8-1-2, AAV8-1-7, AAV8-1-15 and AAV8-2-1 infected the HepG2 human liver cells more effectively, and achieved stronger exogenous gene expression. FIG. 6C demonstrates that, compared with the parent AAVS3, mutants AAVS3-1-2, AAVS3-1-8 and AAVS3-2-2 infected the Huh7 human liver cells more effectively, and achieved stronger exogenous gene expression. FIG. 6D demonstrates that, compared with the parent AAVS3, mutants AAVS3-1-2, AAVS3-1-8, AAVS3-1-14 and AAVS3-2-2 infected the HepG2 human liver cells more effectively, and achieved stronger exogenous gene expression.

Example 8: Evaluation of Infection Efficiency in the Primary Human Hepatocytes

The infection detection method was the same as that for Huh7 cells, as described in Example 6. The detection results are showed in FIGS. 7 and 8.

Figure 7:
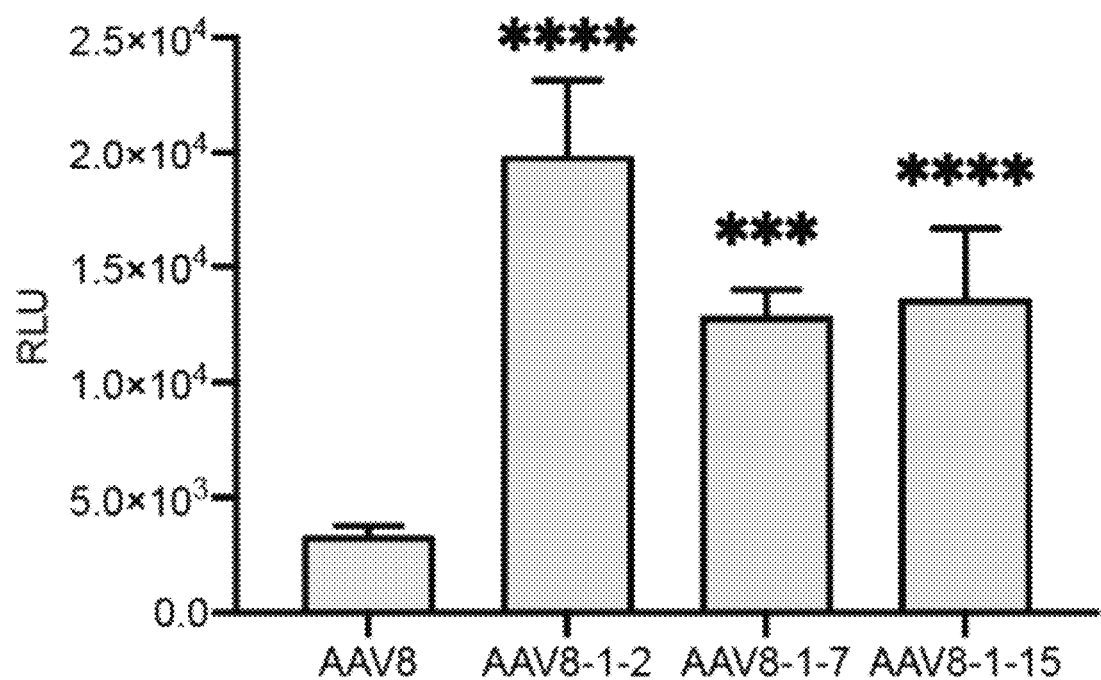
FIG. 7 shows in vitro infection detection of AAV8 mutants in primary human hepatocytes, MOI=1E5.
Figure 8:
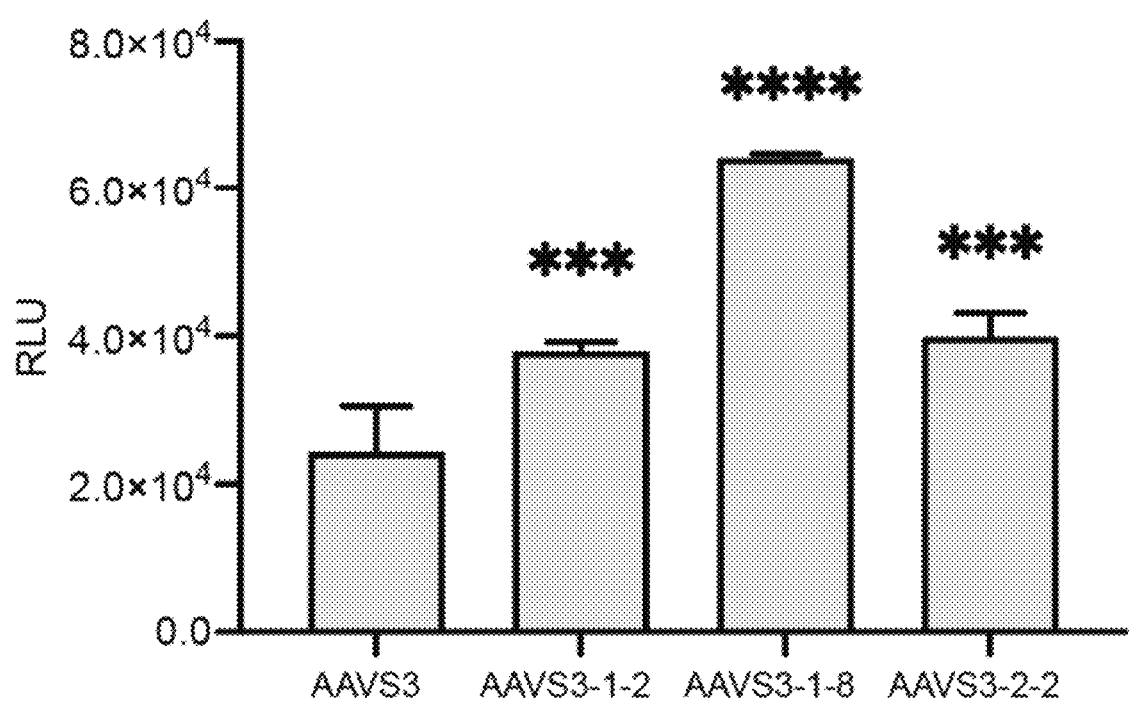
FIG. 8 shows in vitro infection detection of AAVS3 mutants in primary human hepatocytes at MOI=1E5.

FIG. 7 demonstrates that, compared with the parent AAV8, mutants AAV8-1-2, AAV8-1-7 and AAV8-1-15 infected primary human hepatocytes more effectively, and achieved stronger exogenous gene expression. FIG. 8 demonstrates that, compared with the parent AAVS3, mutants AAVS3-1-2, AAVS3-1-8 and AAVS3-2-2 infected primary human hepatocytes more effectively, and achieved stronger exogenous gene expression.

Example 9: Human Immunoglobulin Neutralizing Antibody Evasion Capacity Detection Complete cell culture medium cDMEM (DMEM (Gibco, 11995065)+10% FBS (Gibco, 10099141C)) was prepared. Huh7 cells (Procell Life Science & Technology Co., Ltd., CL-0120) were trypsinized (Trypsin-EDTA 0.05%, Gibco, 25300062) and counted. The cells were diluted to 1E5 cells/ml in cDMEM and then plated in white/clear 96-well tissue culture plate at 1E4 cells/100 ul per well. The cells were incubated overnight in a 37° C., 5% CO2 incubator. The parent AAV8, parent AAVS3 and the various mutants were diluted to a target concentration of 4.8E10 vg/mL in PBS (working stock). IVIG (Human Immunoglobulin (pH4) for Intravenous Injection, S20113011, HUALAN BIOLOGICAL ENGINEERING CHONGQING CO., LTD) was diluted with FBS as listed below:

| Name | IVIG titer | Starting Volume | Volume of FBS |
|---|---|---|---|
| Dilution 1 | 1:100 | 0.38 μL IVIG | 37.62 |
| Dilution 2 | 1:316 | 12 μL of dilution 1 | 26 |
| Dilution 3 | 1:1000 | 12 μL of dilution 2 | 26 |
| Dilution 4 | 1:3160 | 12 μL of dilution 3 | 26 |
| Dilution 5 | 1:10000 | 12 μL of dilution 4 | 26 |
| Dilution 6 | 1:31600 | 12 μL of dilution 5 | 26 |
|  |  | 12 μL of dilution 6 | discard |

Background signal control: 26 μL cDMEM+0.26 μL IVIG (0% transduction) and Maximum signal control: 26 μL cDMEM+10 μL working stock AAV virus (100% vector transduction) were prepared. 10 μL working stock AAV virus was added to dilution IVIG and maximum signal control, separately and incubated in a 37° C., 5% $CO_2$ incubator for 1 hr. 7.5 μL of each neutralized test sample and maximum and minimum controls were transferred to the assay plate with cells in triplicate, and incubated in a 37° C., 5% $CO_2$ incubator for 72 hr.

After incubation, culture medium was discarded and 100 μL PBS per well was added. Luciferase was detected referring to instruction of Bright-Lite Luciferase Assay System (DD1204, Vazyme Biotech Co. Ltd.). Anti-AAV Neutralizing Antibody Titer was calculated as follows:
1) Calculate the average luciferase signal for each sample and subtract the average minimum transduction value (no virus) from triplicates wells.
2) Percent luciferase expression=[(test sample luciferase reading−no virus luciferase signal)/(max luciferase signal−no virus luciferase signal)]*100 and the results are showed in FIGS. 9 and 10.

Figure 9:
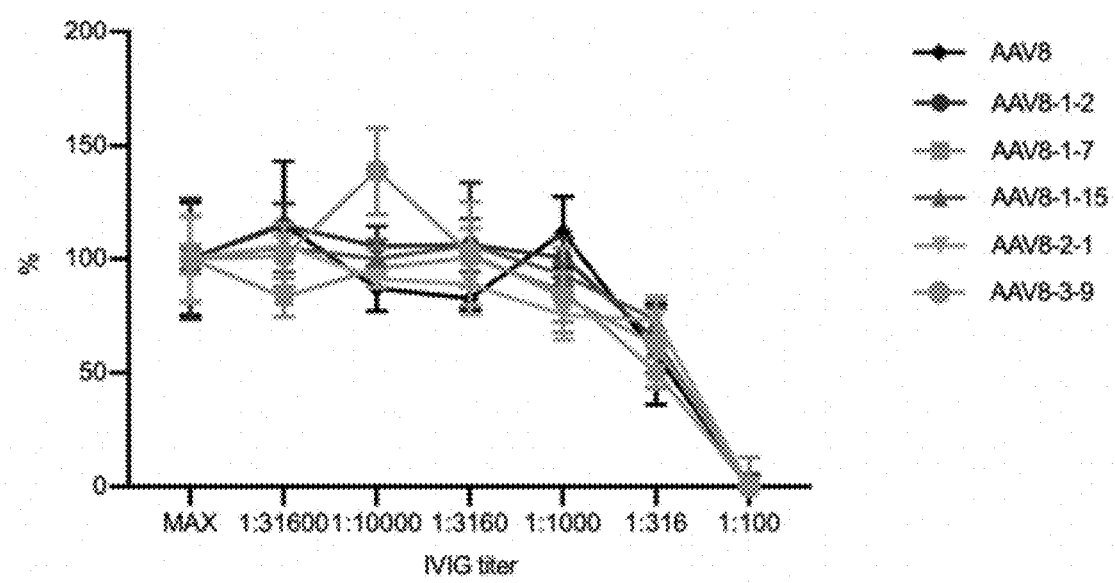
FIG. 9 shows IVIG neutralizing antibody evasion capacity of some of the AAV8 mutants.

FIG. 9 demonstrates that, compared with the parent AAV8, mutants AAV8-1-2, AAV8-1-7, AAV8-1-15, AAV8-2-1, and AAV8-3-9 were better at escaping the IVIG neutralization.

Figure 10:
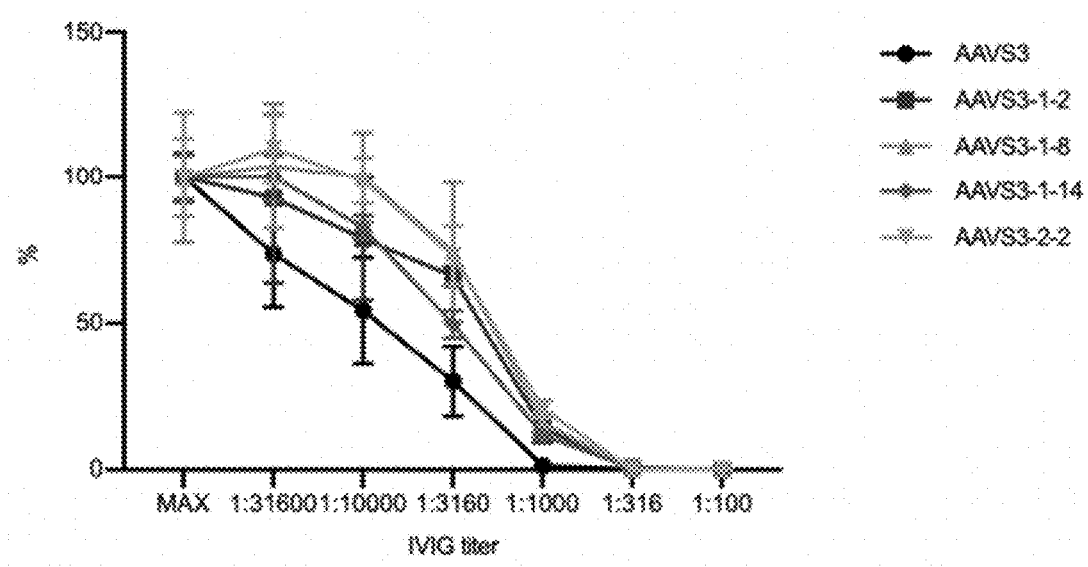
FIG. 10 shows IVIG neutralizing antibody evasion capacity of some of the AAVS3 mutants.

FIG. 10 demonstrates that, compared with the parent AAVS3, mutants AAVS3-1-2, AAVS3-1-8, AAVS3-1-14, and AAVS3-2-2 were better at escaping the IVIG neutralization, which means that more IVIG will be needed to block its transduction.

Example 10: Human Serum Neutralizing Antibody Evasion Capacity Detection

The detection method was the same as that for IVIG detection, as described in Example 9, except that human serum (9193, LABLEAD) was used instead of IVIG. The detection results are shown in FIGS. 11 and 12.

Figure 11:
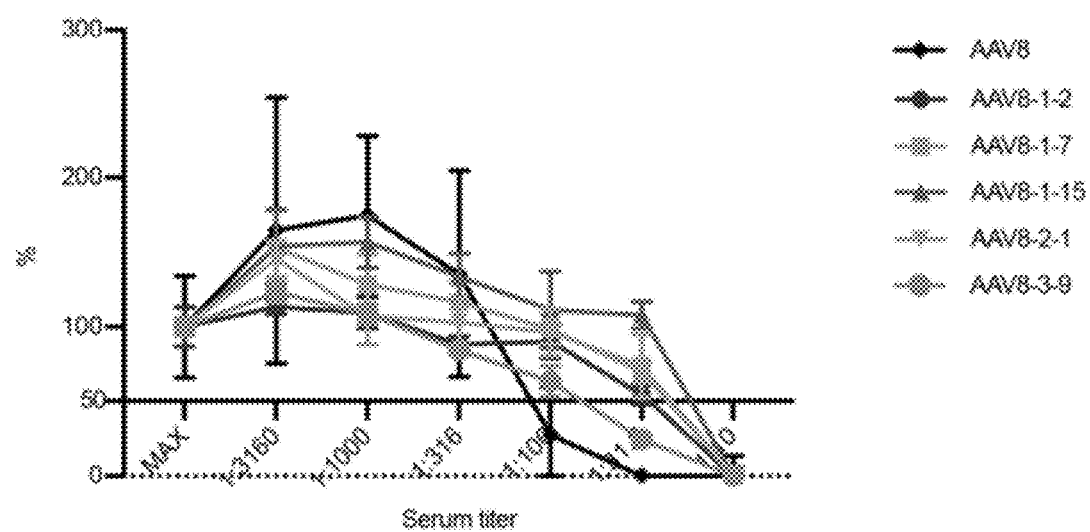
FIG. 11 shows human serum neutralizing antibody evasion capacity of some of the AAV8 mutants.

FIG. 11 demonstrates that, compared with the parent AAV8, mutants AAV8-1-2, AAV8-1-7, AAV8-1-15, AAV8-2-1, and AAV8-3-9 were better at escaping the human serum neutralization.

Figure 12:
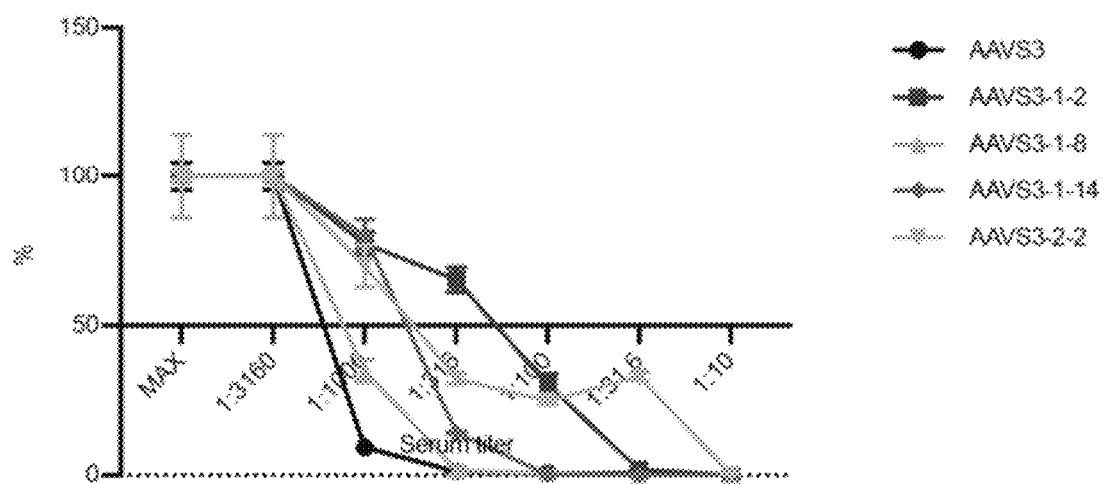
FIG. 12 shows human serum neutralizing antibody evasion capacity of some of the AAVS3 mutants.

FIG. 12 demonstrates that, compared with the parent AAVS3, mutants AAVS3-1-2, AAVS3-1-8, AAVS3-1-14, and AAVS3-2-2 were better at escaping the human serum neutralization.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. An adeno-associated virus (AAV) capsid protein, comprising one or more amino acid modifications as compared with the amino acid sequence as set forth in SEQ ID NO: 1, wherein the one or more amino acid modifications are selected from the group consisting of T332N,, N665Q, A98R, A98E and a combination thereof, wherein the positions are defined with reference to the amino acid sequence of SEQ ID NO: I, wherein the amino acid sequence of the AAV capsid comprises the amino acid sequence of SEQ ID NO: 2, SEQ ID NO: 4, SEQ ID NO: 5 or SEQ ID NO: 6.

2. The AAV capsid protein according to claim 1 covalently linked or bound to an exogenous compound selected from the group consisting of a DNA molecule, an RNA molecule, a polypeptide, a carbohydrate, a lipid, and a small organic molecule.

3. A nucleic acid, comprising a nucleotide sequence encoding the AAV capsid protein according to claim 1.

4. An AAV particle containing the AAV capsid protein according to claim 1.

5. The AAV capsid protein according to claim 1, wherein the amino acid sequence of the AAV capsid protein comprises the amino acid sequence of SEQ ID NO: 2.

6. The AAV capsid protein according to claim 1, wherein the amino acid sequence of the AAV capsid protein comprises the amino acid sequence of SEQ ID NO: 4.

7. The AAV capsid protein according to claim 1, wherein the amino acid sequence of the AAV capsid protein comprises the amino acid sequence of SEQ ID NO: 5.

8. The AAV capsid protein according to claim 1, wherein the amino acid sequence of the AAV capsid protein comprises the amino acid sequence of SEQ ID NO: 6.

9. An AAV particle containing the AAV capsid protein according to claim 5.

10. An AAV particle containing the AAV capsid protein according to claim 6.

11. An AAV particle containing the AAV capsid protein according to claim 7.

12. An AAV particle containing the AAV capsid protein according to claim 8.

* * * * *